United States Patent [19]

Katzman et al.

[11] Patent Number: 4,817,091
[45] Date of Patent: Mar. 28, 1989

[54] FAULT-TOLERANT MULTIPROCESSOR SYSTEM

[75] Inventors: James A. Katzman, San Jose; Joel F. Bartlett, Palo Alto; Richard M. Bixler, Sunnyvale; William H. Davidow, Atherton; John A. Despotakis, Pleasanton; Peter J. Graziano; Michael D. Green, both of Los Altos; David A. Greig; Steven J. Hayashi, both of Cupertino; David R. Mackie, Ben Lomond; Dennis L. McEvoy, Scotts Valley; James G. Treybig; Steven W. Wierenga, both of Sunnyvale, all of Calif.

[73] Assignee: Tandem Computers Incorporated, Cupertino, Calif.

[21] Appl. No.: 52,094

[22] Filed: May 19, 1987

Related U.S. Application Data

[60] Division of Ser. No. 713,583, Mar. 18, 1985, Pat. No. 4,672,535, which is a continuation of Ser. No. 543,809, Oct. 24, 1983, abandoned, which is a continuation of Ser. No. 147,304, Apr. 6, 1980, abandoned, which is a division of Ser. No. 721,043, Sep. 7, 1976, Pat. No. 4,228,496.

[51] Int. Cl.[4] ............................................. G06F 11/20
[52] U.S. Cl. .......................................... 371/9; 371/62; 364/200
[58] Field of Search ... 364/200 MS File, 920 MS File; 371/9, 62

[56] References Cited

U.S. PATENT DOCUMENTS

| | | | |
|---|---|---|---|
| 3,623,014 | 11/1971 | Doetz | 371/9 X |
| 3,749,897 | 7/1973 | Hirvela | 371/62 X |
| 3,786,433 | 1/1974 | Notley et al. | 371/9 X |
| 3,908,099 | 9/1975 | Boulas et al. | 371/62 X |
| 3,919,533 | 11/1975 | Einolf, Jr. et al. | 371/62 |
| 3,921,141 | 11/1975 | Wilber et al. | 371/9 X |
| 4,012,717 | 3/1977 | Censier et al. | 371/9 X |
| 4,099,241 | 7/1978 | Ossfeldt | 371/9 X |

Primary Examiner—Eddie P. Chan
Attorney, Agent, or Firm—Townsend and Townsend

[57] ABSTRACT

In a multiprocessor system interconnected by a bus structure that provides communication and information transfers between the processor modules of the system, each processor broadcasts a central message to all the other processors of the system on a periodic basis. A processor module not receiving the control message from a sending processor module will assume the sending processor module has failed, and operate to take over the task of the failed processor module.

11 Claims, 29 Drawing Sheets

BUS CONTROL STATE LOGIC DIAGRAM

BUS CONTROLLER

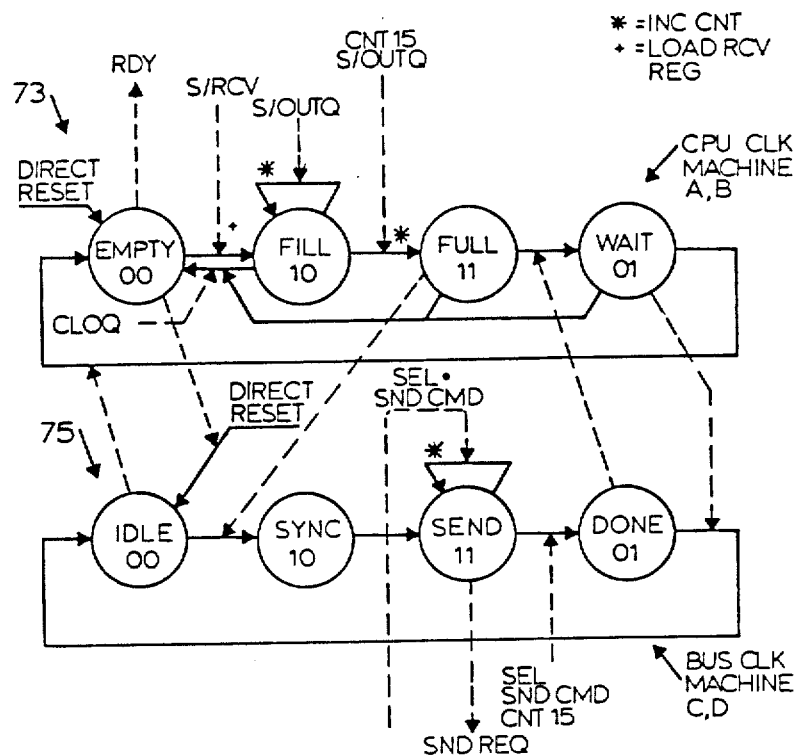
FIG.7 PROCESSOR FILL STATE LOGIC DIAGRAM
BUS EMPTY STATE LOGIC DIAGRAM
OUTQ
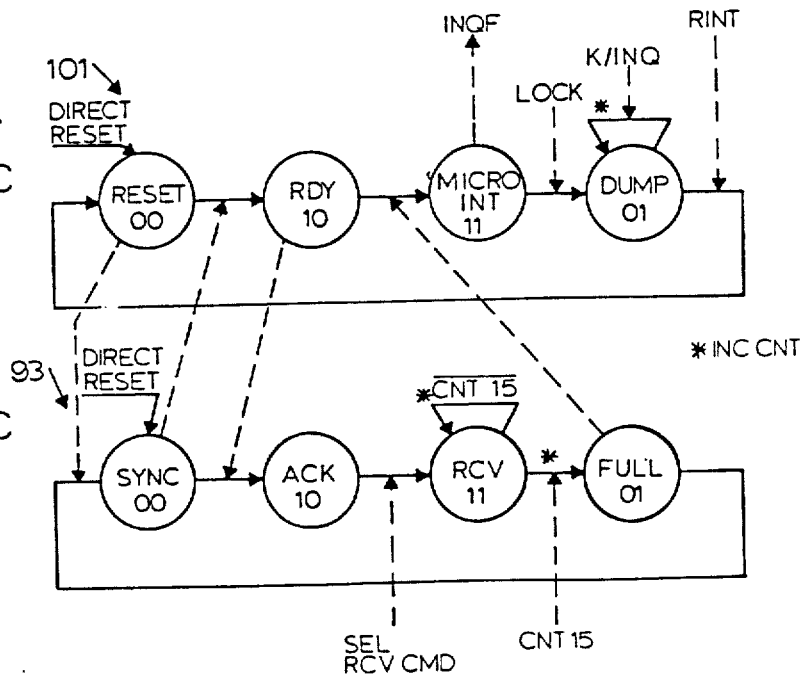
FIG.8 PROCESSOR EMPTY STATE LOGIC DIAGRAM
BUS FILL STATE LOGIC DIAGRAM
INQ

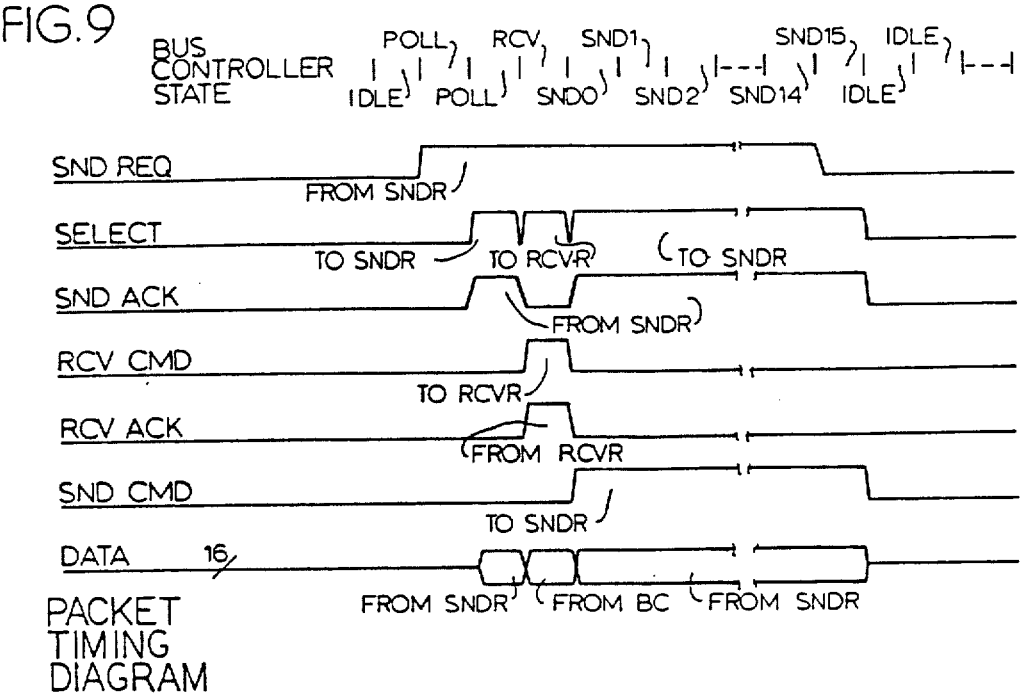
FIG. 9 PACKET TIMING DIAGRAM
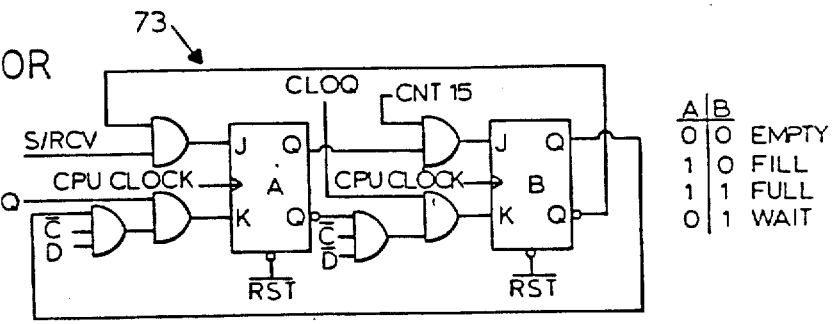
FIG. 10 PROCESSOR FILL STATE LOGIC
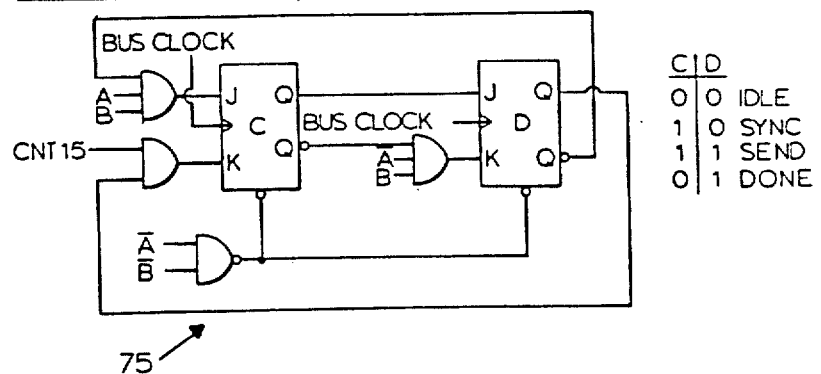
BUS EMPTY STATE LOGIC

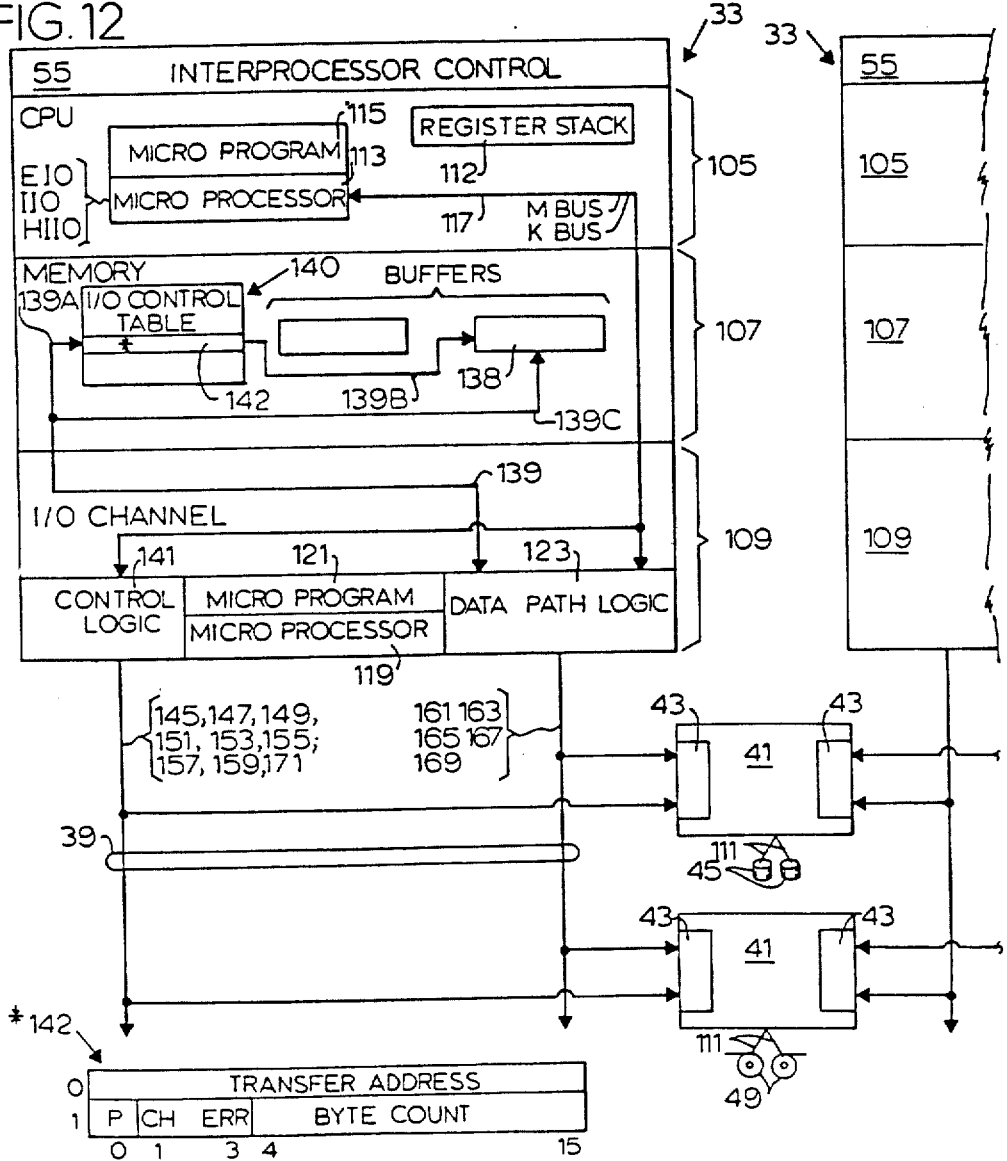

FIG. 14 I/O BUS LINE DESCRIPTION
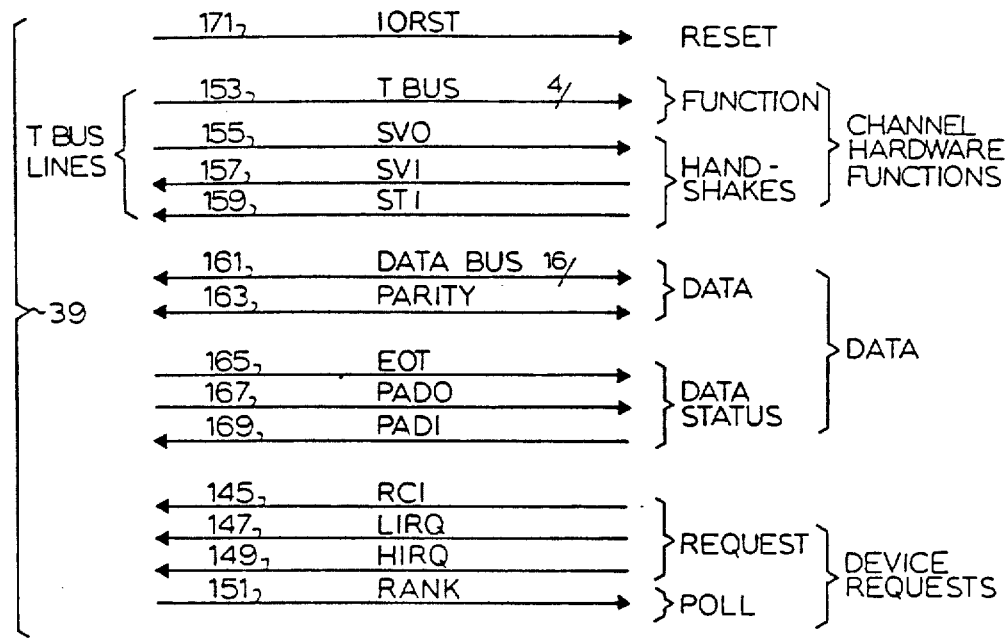
FIG. 15
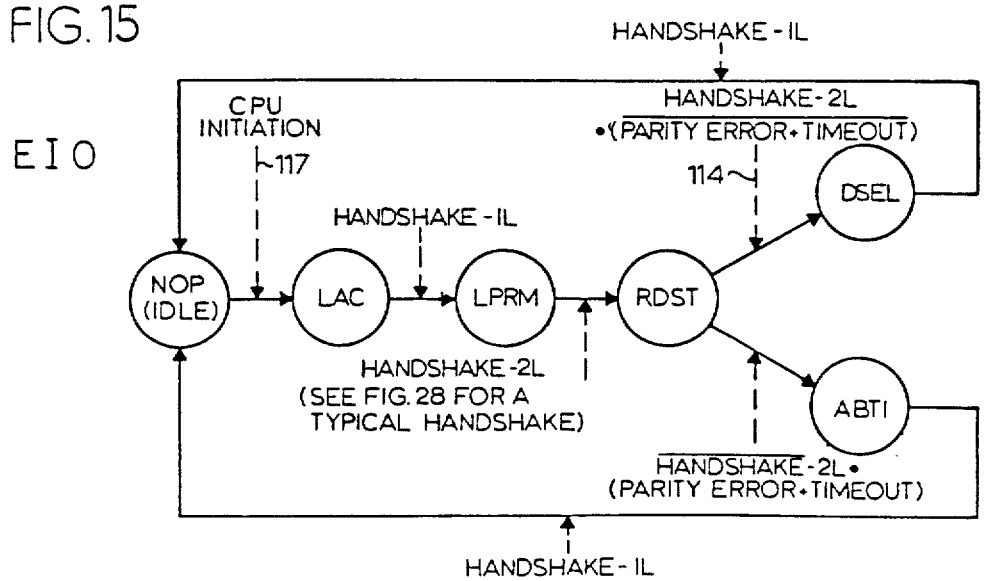

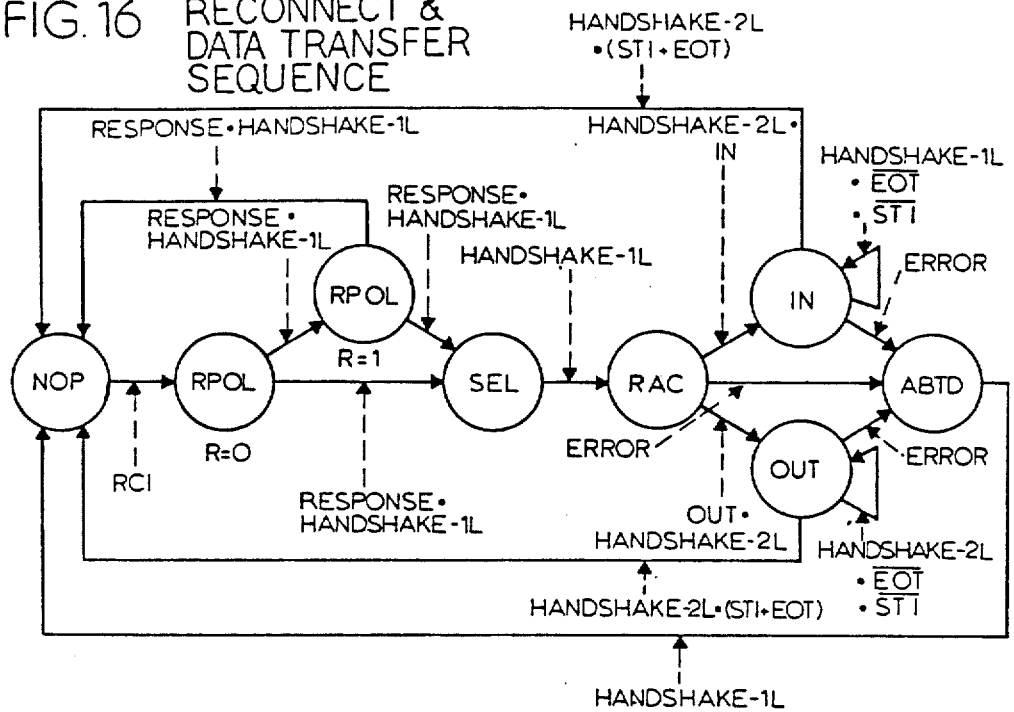
FIG. 16 RECONNECT & DATA TRANSFER SEQUENCE
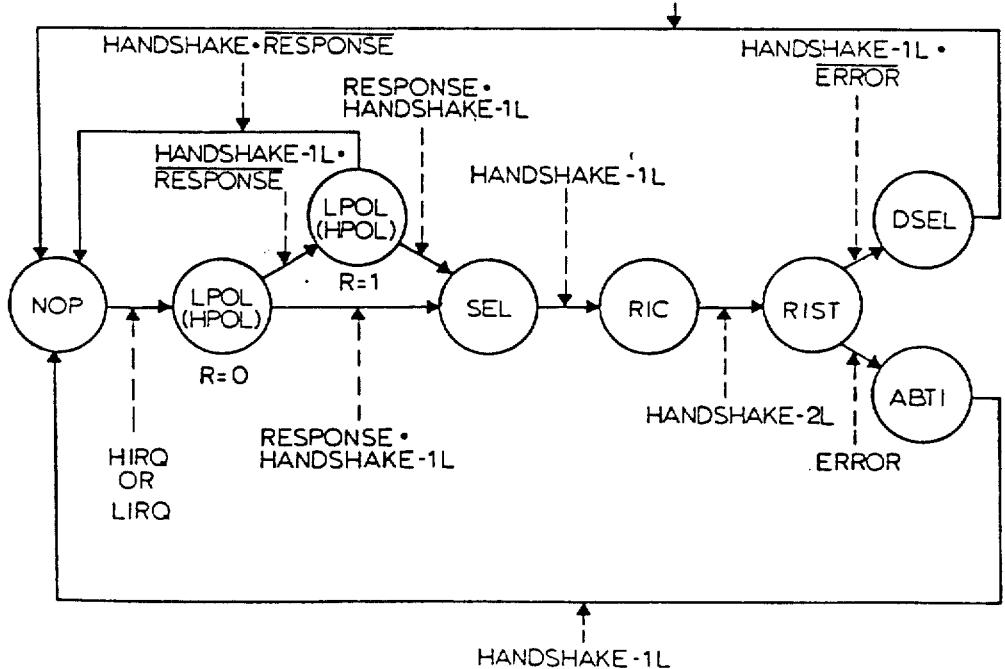
FIG. 17 IIO (HIIO)

FIG.18

| T-BUS COMMANDS | |
|---|---|
| FUNCTIONS | MNEMONIC |
| NO OPERATION | NOP |
| SELECT OUT | SEL |
| DESELECT | DSEL |
| ABORT INSTRUCTION | ABTI |
| LOAD ADDRESS & COMMAND | LAC |
| LOAD PARAMETER | LPRM |
| ABORT DATA TRANSFER | ABTD |
| DATA OUT | OUT |
| HIGH PRIORITY INTERRUPT POLL | HPOL |
| LOW PRIORITY INTERRUPT POLL | LPOL |
| RECONNECT POLL | RPOL |
| READ DEVICES ADDRESS & COMMAND | RAC |
| READ DEVICE STATUS | RDST |
| READ INTERRUPT STATUS | RIST |
| READ INTERRUPT CAUSE | RIC |
| DATA IN | IN |

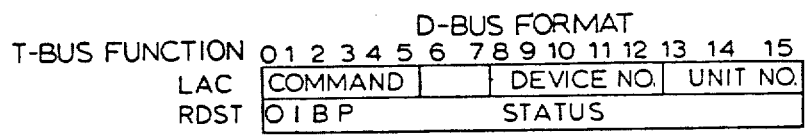

FIG.19

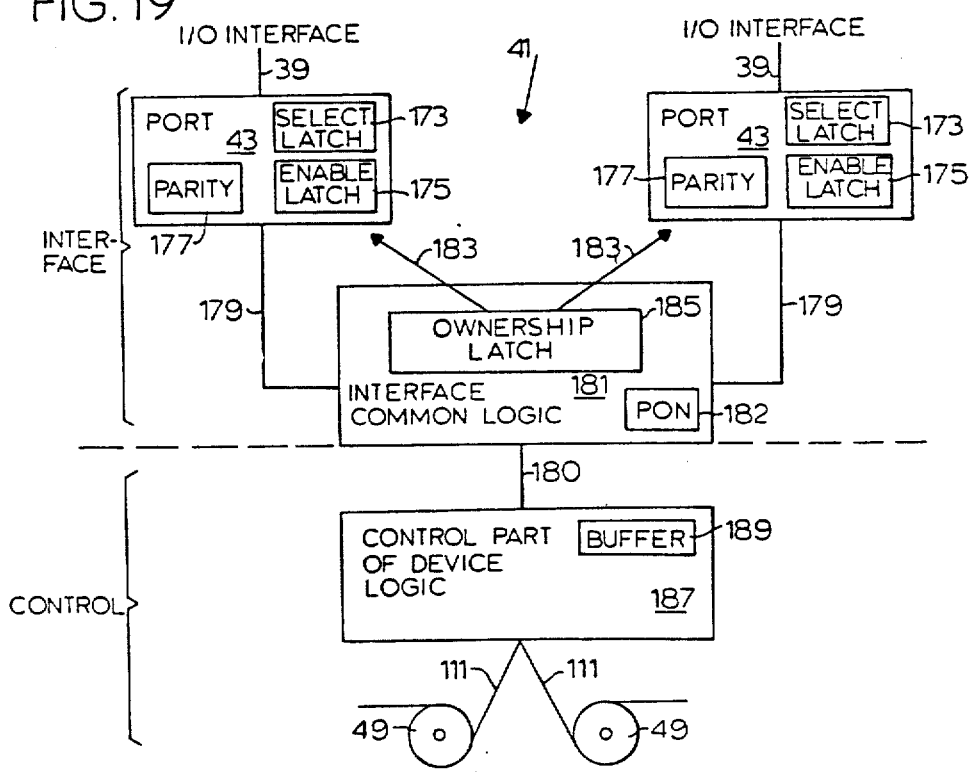

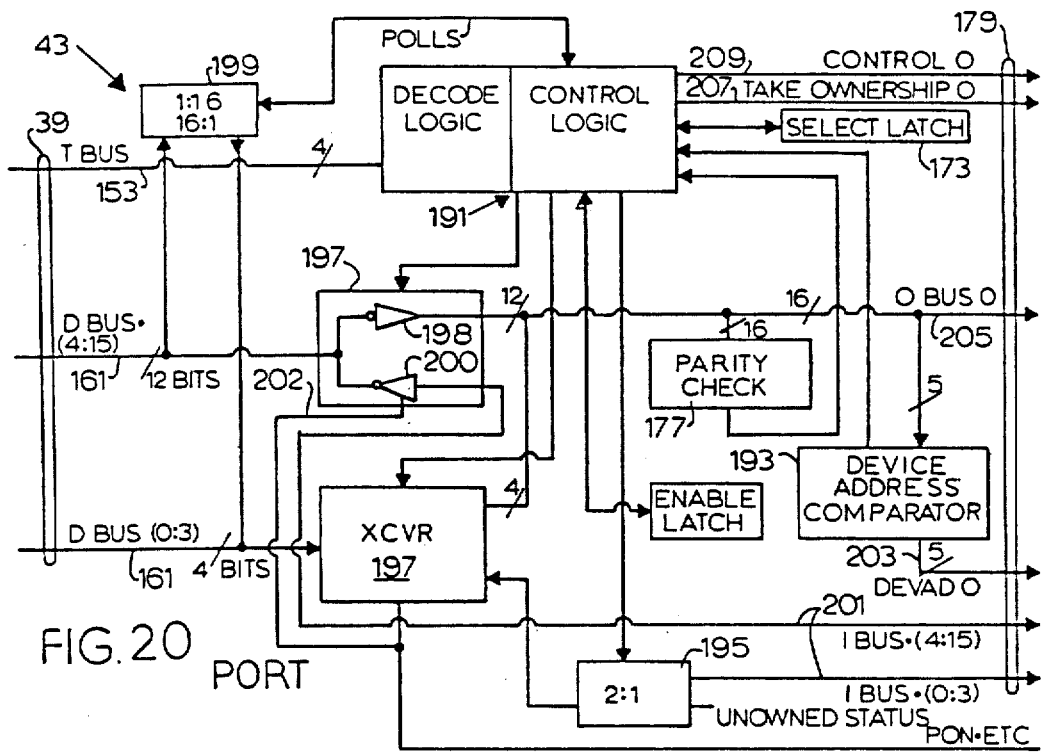
FIG. 20
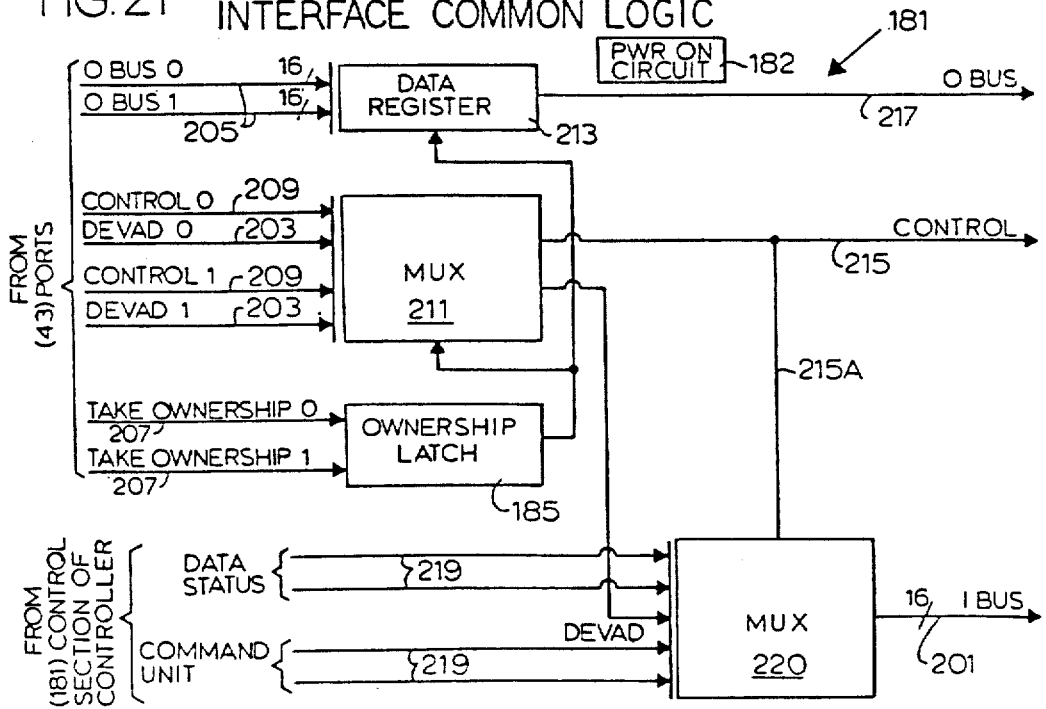
FIG. 21 INTERFACE COMMON LOGIC

FIG. 23 BUFFER ACTION ON AN OUTPUT OPERATION

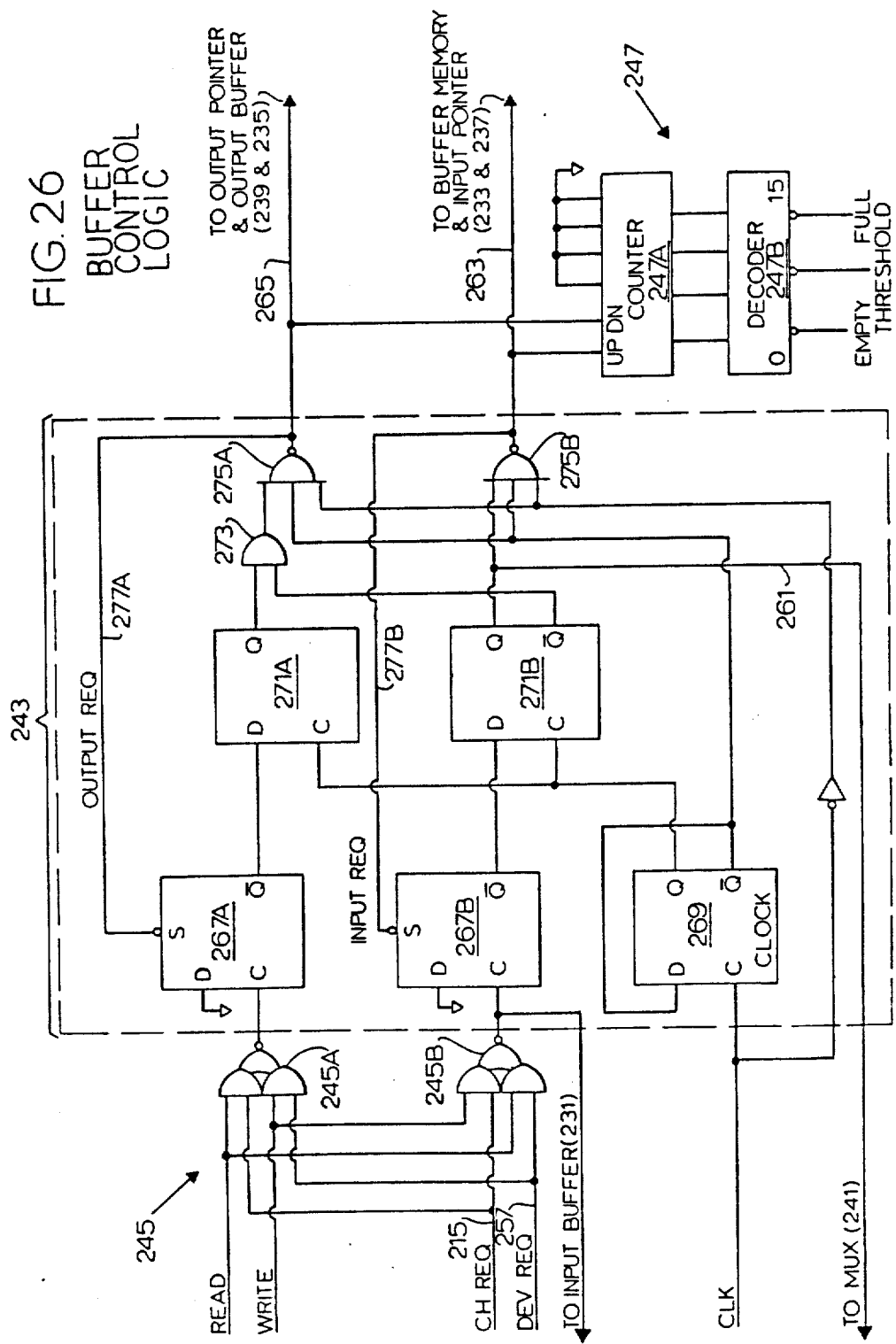
FIG. 26 BUFFER CONTROL LOGIC

FIG. 27  SELECT J = (LAC·ADD COMP·PAROK FF)+(SEL·OWN·ENABLE·
RANK·PAROK FF·SELBIT)
K = ENSTOPIN·(DATA IN + DATA OUT)+ABTD+ABTI+DSEL+
LAC·$\overline{\text{ADD COMP}}$·PAROK+SEL·$\overline{\text{RANK}}$·SELBIT·PAROK
CLK = SVO TE

FIG.35 MAP SECTION BLOCK DIAGRAM

FIG. 36 LOGICAL MEMORY

SEMICONDUCTOR MEMORY
MODULE BLOCK DIAGRAM

FIG. 38 CHECK BIT GENERATOR

THUS $S0 = C0 \oplus D8 \oplus D9 \oplus D10 \oplus D11 \oplus D12 \oplus D13 \oplus D14 \oplus D15$

FIG. 39  CHECK BIT COMPARATOR

FIG. 40 SYNDROME DECODER

ODD=$\overline{EVEN}$=S0 ⊕ S1 ⊕ S2 ⊕ S3 ⊕ S4 ⊕ S5
MULTIPLE ERROR=MULTIPLE+EVEN·$\overline{S1}$·$\overline{S2}$·$\overline{S3}$·$\overline{S4}$·$\overline{S5}$
SINGLE ERROR=ODD·$\overline{MULTIPLE}$

FAULT-TOLERANT MULTIPROCESSOR SYSTEM

This is a division of application Ser. No. 713,583, filed Mar. 18, 1985, now U.S. Pat. No. 4,672,535, which was a continuation of Ser. No. 543,809, filed Oct. 24, 1983 (abandoned), which is a continuation of Ser. No. 147,304, filed Apr. 6, 1980 (abandoned), which is a division of Ser. No. 721,043, filed Sept. 7, 1976, now U.S. Pat. No. 4,228,496.

BACKGROUND OF THE INVENTION

This invention relates to a multiprocessor computer system in which interconnected processor modules provide multiprocessing (parallel processing in separate processor modules) and multiprogramming (interleaved processing in one processor module).

This invention relates particularly to a system which can support high transaction rates to large on-line data bases and in which no single component failure can stop or contaminate the operation of the system.

There are many applications which require on-line processing of large volumes of data at high transaction rates. For example, such processing is required in retail applications for automated point of sale, inventory and credit transactions and in financial institutions for automated funds transfer and credit transactions.

In computing applications of this kind it is important, and often critical, that the data processing not be interrupted. A failure of an on-line computer system can shut down a portion of the related business and can cause considerable loss of data and money.

Thus, an on-line system of this kind must provide not only sufficient computing power to permit multiple computations to be done simultaneously, but it must also provide a mode of operation which permits data processing to be continued without interruption in the event some component of the system fails.

The system should operate either in a fail-safe mode (in which no loss of throughput occurs as a result of failure) or in a fail-soft mode (in which some slowdown occurs but full processing capabilities are maintained) in the event of a failure.

Furthermore, the system should also operate in a way such that a failure of a single component cannot contaminate the operation of the system. The system should provide fault-tolerant computing. For fault-tolerant computing all errors and failures in the system should either be corrected automatically, or if the failure or error cannot be corrected automatically, it should be detected, or if it cannot be detected, it should be contained and should not be permitted to contaminate the rest of the system.

Since a single processor module can fail, it is obvious that a system which will operate without interruption in an on-line application must have more than one processor module.

Systems which have more than one processor module can therefore meet one of the necessary conditions for non-interruptible operation. However, the use of more than one processor module in a system does not by itself provide all the sufficient conditions for maintaining the required processing capabilities in the event of component failure, as will become more apparent from the description to follow.

Computing systems for on-line, high volume, transaction oriented, computing applications which must operate without interruption therefore require multiprocessors as a starting point. But the use of multiprocessors does not guarantee that all of the sufficient conditions will be met, and fulfilling the additional sufficient conditions for on-line systems of this kind has presented a number of problems in the prior art.

The prior art approach to uninterrupted data processing has proceeded generally along two lines—either adapting two or more large, monolithic, general purpose computers for joint operation or interconnecting a plurality of minicomputers to provide multiprocessing capabilities.

In the first case, adapting two large monolithic general purpose computers for joint operation, one conventional prior art approach has been to have the two computers share a common memory. Now in this type of multiprocessing system a failure in the shared memory can stop the entire system. Shared memory also presents a number of other problems including sequencing accesses to the common memory. This system, while meeting some of the necessary conditions for uninterruptible processing, does not meet all of the sufficient conditions.

Furthermore, multiprocessing systems using large general purpose computers are quite expensive because each computer is constructed as a monolithic unit in which all components (including the packaging, the cooling system, etc.) must be duplicated each time another processor is added to the system even though many of the duplicated components are not required.

The other prior art approach of using a plurality of minicomputers has (in common with the approach of using large general purpose computers) suffered from the drawback of having to adapt a communications link between computers that were never originally constructed to provide such a link. The required links were, as a result, usually made through the input/output channel. Connections through the input/output channel are necessarily slower than internal transfers within the processor itself, and such interprocessor links have therefore provided relatively slow interprocessor communication.

Furthermore, the interprocessor connections required special adapter cards that added substantially to the cost of the overall system and that introduced the possibility of single component failures which could stop the system. Adding dual interprocessor links and adapter cards to avoid problems of critical single components failures increased the overall system cost even more substantially.

Providing dual links and adapter cards between all processors generally became very cumbersome and quite complex from the standpoint of operation.

Another problem of the prior art arose out of the way in which connections were made to peripheral devices.

If a number of peripheral devices are connected to a single input/output bus of one processor in a multiprocessor system and that processor fails, then the peripheral devices will be unavailable to the system even though the failed processor is linked through an interprocessor connection to another processor or processors in the system.

To avoid this problem, the prior art has provided an input/output bus switch for interconnecting input/output busses for continued access to peripheral devices when a processor associated with the peripheral devices on a particular input/output bus fails. The bus switches have been expensive and also have presented the possibility of single component failure which could down a substantial part of the overall system.

Providing software for the prior art multiprocessor systems has also been a major problem.

Operating systems software for such multiprocessing systems has tended to be nonexistent. Where software had been developed for such multiprocessor systems, it quite often was restricted to a small number of processors and was not adapted for the inclusion of additional processors. In many cases it was necessary either to modify the operating system or to put some of the operating system functions into the user's own program – an expensive, time-consuming operation.

The prior art lacked a satisfactory standard operating system for linking processors. It also did not provide an operating system for automatically accommodating additional processors in a multiprocessing system constructed to accommodate the modular addition of processors as increased computering power was required.

A primary object of the present invention is to construct a multiprocessor system for on-line, transaction-oriented applications which overcomes the problems of the prior art.

A basic objective of the present invention is to insure that no single failure can stop the system or significantly affect system operation. In this regard, the system of the present invention is constructed so that there is no single component that attaches to everything in the system, either mechanically or electrically.

It is a closely related objective of the present invention to guaranee that every error that happens can be either corrected, detected or prevented from contaminating the system It is another important objective of the present invention to provide a system architecture and basic mode of operation which free the user from the need to get involved with the system hardware and the protocol of interprocessor communication. In the present invention every major component is modularized so that any major component can be removed or replaced without stopping the system. In addition, the system can be expanded in place (either horizontally by the addition of standard processor modules or in most cases vertically by the addition of peripheral devices) without system interruption or modification to hardware or software.

SUMMARY OF THE INVENTION

According to the present invention, therefore, a multiprocessor system comprises a plurality of independent processor modules interconnected by a bus structure for permitting information transfers therebetween. Each of the processor modules periodically sends to the other processor modules a control message to each of the other processor modules of the system, via the bus structure. Failure to receive the control message within an allotted time operates as an indication of failure of the sending processor module, and another of the processor modules will function to take over the task of the failed processor module.

The processor modules function principally to actively execute application programs, and secondarily as backups for other of the processor modules. Information transfers from the processor modules to their backup processor modules will take place periodically. If the backup processor module fails to receive the control message within an allotted time, it assumes that the active processor module is no longer functioning, and takes over execution of the application program of the failed processor module.

In an additional aspect of the invention, each of the processor modules is provided with an input/output path structure that is independent and separate from the bus structure. Multiported device controllers are configured to be accessed by two separate processor modules via their respective input/output path structure, thereby providing each processor module with at least two paths to any device.

Multiprocessor system apparatus and methods which incorporate the structure and technique described above and which are effective to function as described above constitute further, specific objects of this invention.

Other and further objects of the present invention will be apparent from the following description and claims and are illustrated in the accompanying drawings which, by way of illustration, show preferred embodiments of the present invention and the principles thereof and what are now considered to be the best mode contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 shows several processor modules 33 connected by two interprocessor buses 35 (an X bus and a Y bus) with each bus controlled by a bus controller 37. FIG. 1 also shows several dual-port device controllers 41 with each device controller connected to the input/output (I/O buses 39 of two processor modules.

FIG. 2 shows, in diagrammatic form, the connections between each bus controller and the interprocessor control 55 of an individual processor module.

FIG. 6 is a state diagram of the logic 81 for a bus controller 37 and illustrates how the logic responds to the protocol lines going into the bus controller and generates the protocol lines going out of the bus controller to the processor modules.

FIG. 7 is a state diagram like FIG. 6 but showing the logic 73 and 75 for the shared outqueue buffer and control 67 of FIG. 4.

FIG. 8 is a state diagram like FIGS. 6 and 7 but showing the logic 93 and 101 for the inqueue buffer and control 65 of FIG. 5.

FIG. 9 is a diagrammatic view showing the time sequence for the transmission of a given packet between a sender processor module and a receiver processor module.

FIG. 10 is a logic diagram of the bus empty state logic section 75 and the processor fill state logic section 73 of the outqueue buffer and the control 67 shown in FIG. 4.

FIG. 11 is a listing of logic equations for the logic diagram shown in FIG. 10.

FIG. 12 is a block diagram of the input/output (I/O) system of the microprocessor system shown in FIG. 1.

FIG. 13 shows the major components of the I/O channel and the data path relating those component parts.

FIG. 14 is a detailed view showing the individual lines in the I/O bus 39 of FIG. 1.

FIG. 15 is an I/O channel protocol diagram showing the state changes of the T bus 153 for an execute input-/output (EIO) caused by the microprogram 115 in the CPU 105. The sequence illustrated is initiated by the CPU 105 and is transmitted through the I/O channel 109 of the processor module 33 and on the T bus 153 to a device controller 41 as shown in FIG. 1.

FIG. 16 is an I/O channel protocol diagram showing the state changes of the T bus 153 for a reconnect and data transfer sequence initiated by the I/O channel microprograms 121 in response to a request signal from a device controller 41.

FIG. 17 is an I/O channel protocol diagram showing the state changes of the T bus 153 for an interrogate I/O (IIO) instruction or an interrogate high priority I/O (HIIO) instruction initiated by the CPU microprogram 115. The sequence illustrated is transmitted over the T bus 153 to a device controller 41.

FIG. 18 is a table identifying the functions referred to by the mnemonics in FIGS. 15 through 17.

FIG. 19 is a block diagram showing the general structure of the ports 43 and a device controller 41 as illustrated in FIG. 1.

FIG. 20 is a block diagram of a port 43 shown in FIG. 19. This FIG. 20 shows primarily the data paths within a port 43.

FIG. 21 is a block diagram showing the data path details of the interface common logic 181 of the device controller 41 shown in FIG. 19.

FIG. 26 is a logic diagram of the buffer control logic 243 of the data buffer 189 (shown in FIG. 22) of a device controller 41. FIG. 26 shows how the buffer control logic 243 controls the handshakes on the data bus and controls the input and output pointers.

FIG. 27 is a listing of the logic equations for the select register 173 shown in FIG. 20. These logic equations are implemented by the port control logic 191 shown in FIG. 20.

FIG. 30 shows how a plurality of independent and separate power supplies 303 are distributed and associated with the dual port device controllers 41 for insuring that each device controller has both a primary and an alternate power supply.

FIG. 36 also shows details of the bits and fields in a single map entry of a map section.

FIG. 38 also lists logic equations for two of the eight bit parity trees used in the check bit register.

FIG. 39 includes the logic equation for nine bit parity tree for syndrome bit zero.

FIG. 37 also lists the logic equations for the operation of the logic section 511 of the syndrome decoder.

DESCRIPTION OF THE PREFERRED EMBODIMENTS

THE MULTIPROCESSOR SYSTEM

Figure 1:
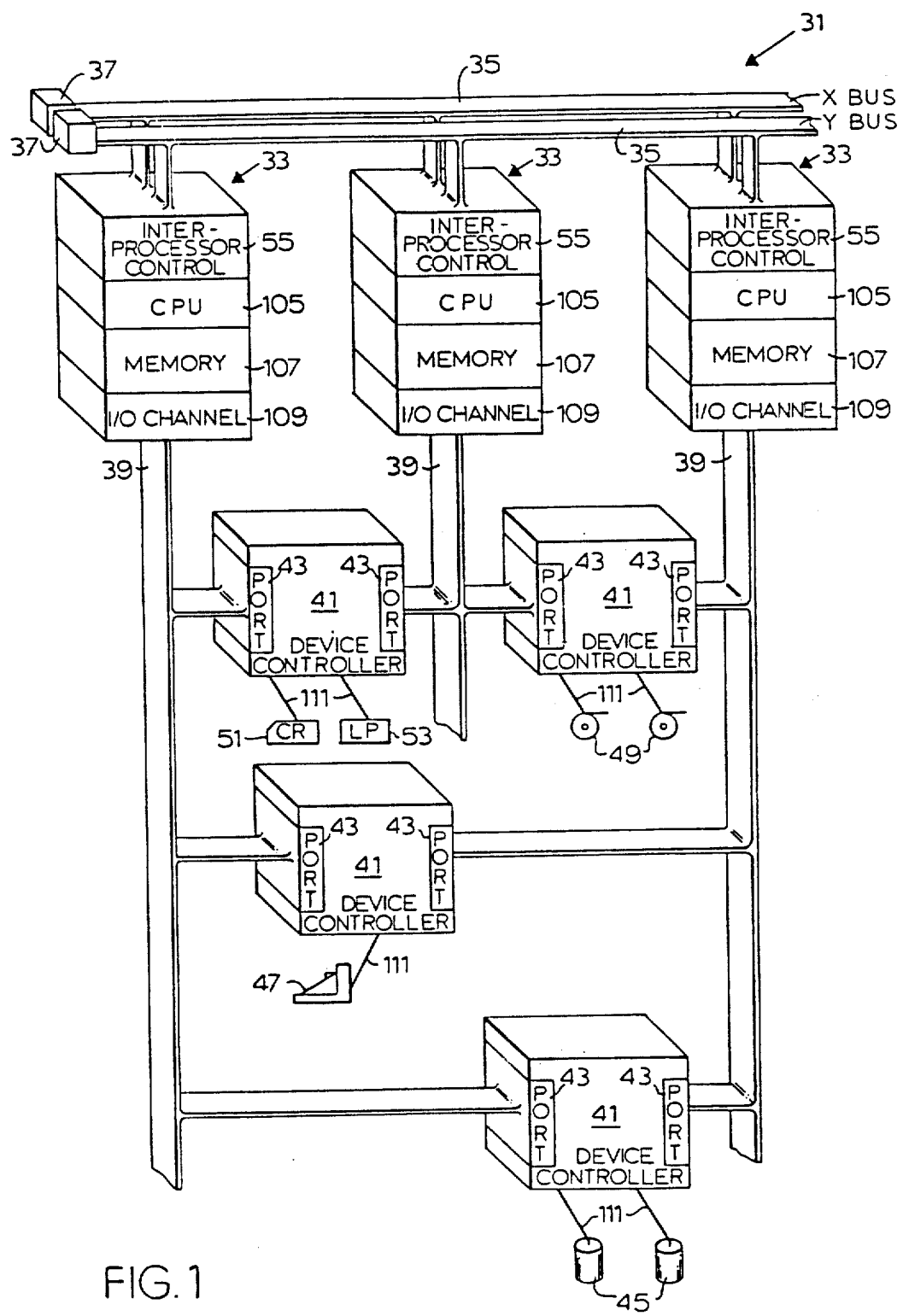
FIG. 1 is an isometric, block diagram view of a multiprocessor system constructed in accordance with one embodiment of the present invention.

FIG. 1 is an isometric diagrammatic view of a part of a multiprocessor system constructed in accordance with one embodiment of the present invention. In FIG. 1 the multiprocessor system is indicated generally by the reference numeral 31.

The multiprocessor system 31 includes individual processor modules 33. Each processor module 33 comprises a central processing unit 105, a memory 107, an input/output channel 109 and an interprocessor control 55.

The individual processor modules are interconnected by interprocessor buses 35 for interprocessor communications.

In a specific embodiment of the multiprocessor system 31, up to sixteen processor modules 33 are interconnected by two interprocessor buses 35 (indicated as the X bus and the Y bus in FIG. 1).

Each interprocessor bus has a bus controller 37 associated with that bus.

The bus controllers 37, interprocessor buses 35 and interprocessor controls 55 (FIG. 1), together with associated microprocessors 113, microprograms 115 and bus receive tables 150 (FIG. 2) provide an interprocessor bus system. The construction and operation of this interprocessor bus system are illustrated in FIGS. 2-11 and 42 and are described in more detail below under the subtitle The Interprocessor Bus System.

The multiprocessor system 31 has an input/output (I/O) system for transferring data between the processor modules 33 and peripheral devices, such as the discs 45, terminals 47, magnetic tape drives 49, card readers 51, and line printers 53 shown in FIG. 1.

The I/O system includes one I/O bus 39 associated with each I/O channel 109 of a processor module and one or more multi-port device controllers 41 may be connected to each I/O bus 39.

In the specific embodiment illustrated, each device controller 41 has two ports 43 for connection to two different processor modules 33 so that each device controller is connected for access by two processor modules.

The I/O system includes a microprocessor 119 and a microprogram 121 in the I/O channel 109 (See FIG. 12.) which are dedicated to input/output transfers.

As also diagrammatically illustrated in FIG. 12, the microprocessor 113 and microprogram 115 of the central processing unit 105 and an input/output control table 140 in the main memory 107 of each processor module 33 are operatively associated with the I/O channel 109.

The construction and operation of these and other components of the I/O system are illustrated in FIGS. 12-29 and are described in detail below under the subtitle The Input/Output System and Dual Port Device Controller.

The multiprocessor system includes a power distribution system 301 which distributes power from separate power supplies to the processor modules 33 and to the device controllers 41 in a way that permits on-line maintenance and also provides redundancy of power on each device controller.

Figure 30:
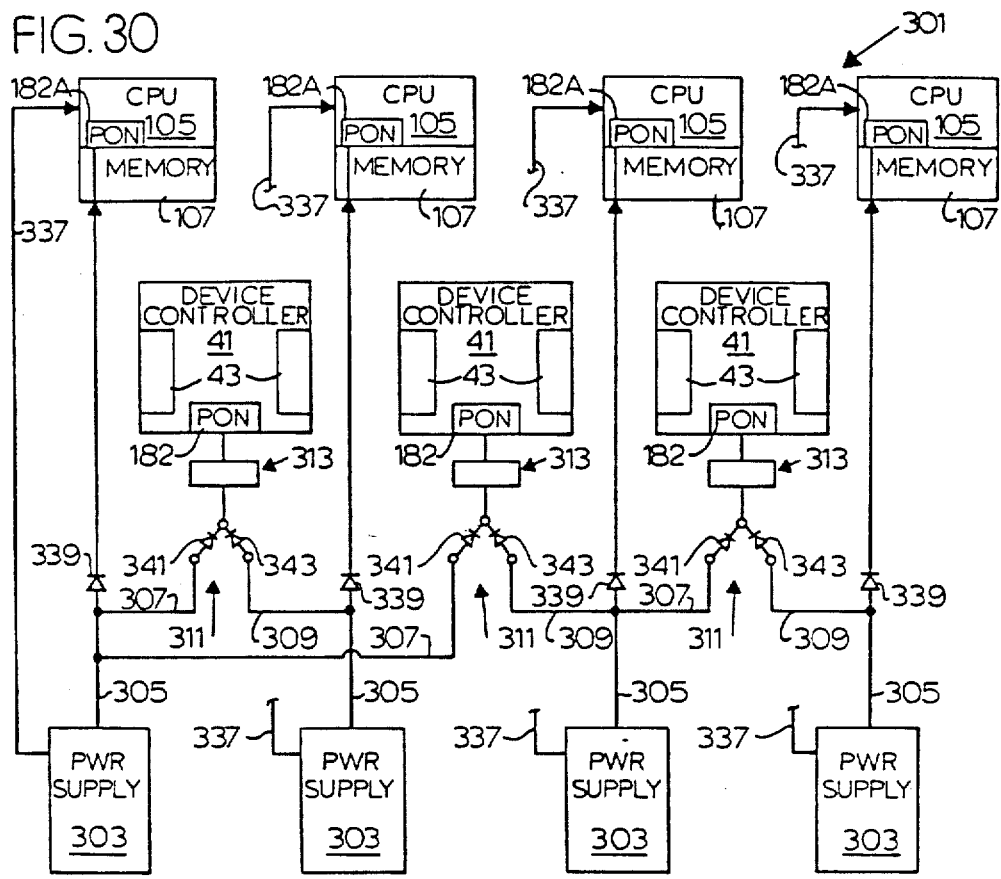
FIG. 30 is a block diagram of a power distribution system.

As illustrated in FIG. 30, the power distribution system includes separate and independent power supplies 303.

A separate power supply 303 is provided for each processor module 33, and a bus 305 supplies the power from the power supply 303 to the central processing unit 105 and memory 105 of a related processor module 33.

As also illustrated in FIG. 30, each device controller 41 is connected for supply of power from two separate power supplies 303 through an automatic switch 311. It one power supply 303 for a particular device controller 41 fails, that device controller is supplied with power from the other power supply 303; and the changeover is accomplished smoothly and without any interruption or pulsation in the power supplied to the device controller.

The power distribution system coacts with the dual port system of the device controller to provide nonstop operation and access to the peripheral devices in the event of a failure of either a single port 43 or a single power supply 303.

Figure 25:
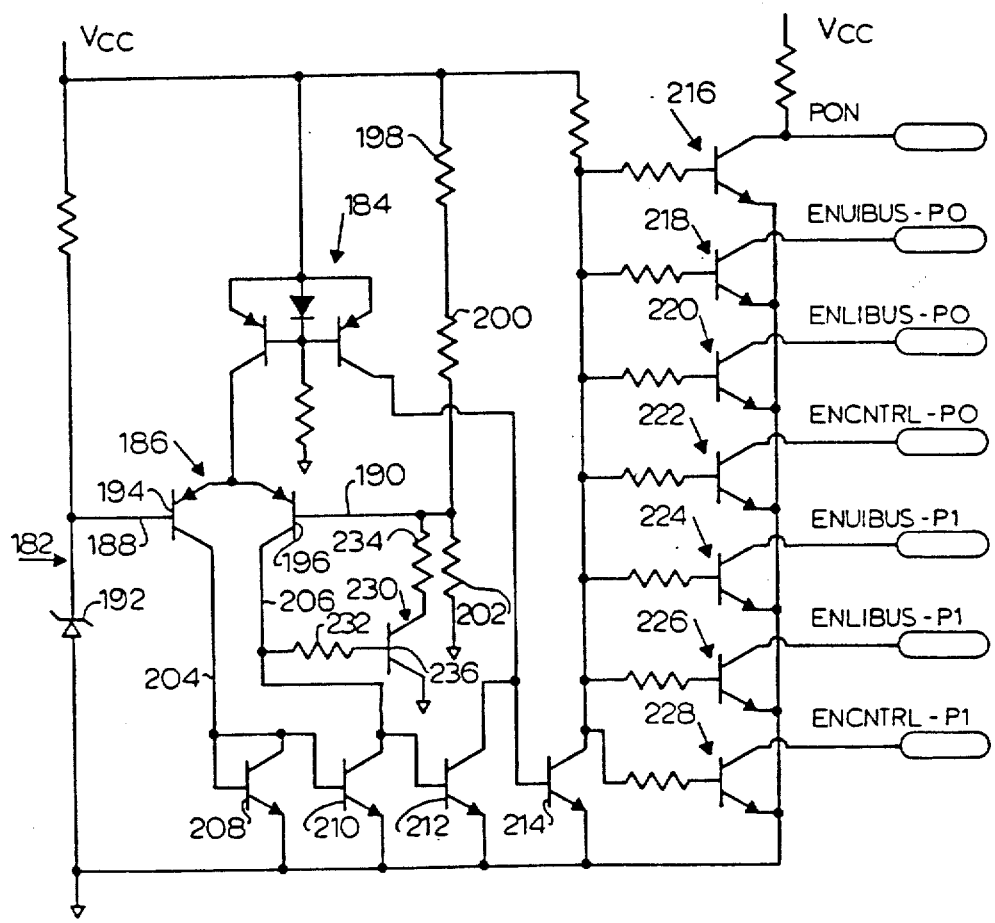
FIG. 25 is a schematic view showing details of the power on circuit (PON) shown in FIGS. 19 and 21.

The multiprocessor system includes a power on (PON) circuit 182 (the details of which are shown in FIG. 25) in several components of the system to establish that the power to that particular component is within certain acceptable limits.

For example, the PON circuit 182 is located in each CPU 105, in each device controller 41, and in each bus controller 37.

The purpose of the PON circuit is to present a signal establishing the level of power applied to that particular component; and if the power is not within certain predetermined acceptable limits, then the signal output is used to directly disable the appropriate bus signal of the component in which the PON is located.

The power-on circuit functions in four states—power off; power going from off to on; power on; and power going from on to off.

The power-on circuit initializes all of the logic states of the system as the power is brought up; and in the present invention, the power-on circuit provides an additional and very important function of providing for a fail-safe system with on line maintenance. To do this, the power-on circuit in the present invention is used in a unique way to control the interface circuits which drive all of the intercommunication buses in the system.

The construction and operation of the power distribution system are illustrated in FIGS. 30-33 and are described in detail below under the subtitle Power Distribution System.

Figure 36:
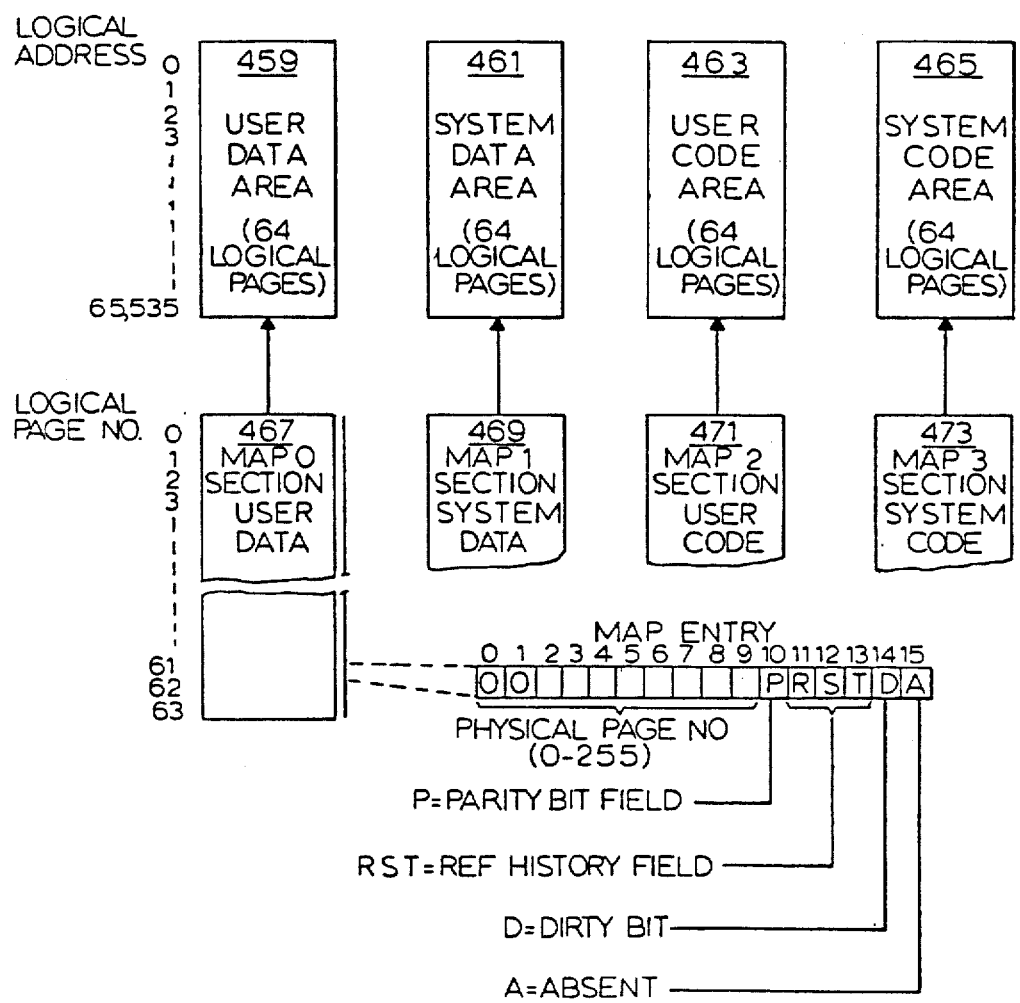
FIG. 36 is a block diagram showing the organization of logical memory into four logical address areas and four separate map sections corresponding to the four logical address areas.

The multiprocessor system includes a memory system in which the physical memory is divided into four logical address areas—user data, system data, user code and system code (See. FIG. 36.).

The memory system includes a map 407 and control logic 401 (See FIG. 34.) for translating all logical addresses to physical addresses and for indicating pages absent from primary storage bit present in secondary storage as required to implement a virtual memory system in which the physical page addresses are invisible to users.

The memory system incorporates a dual port access to the memory by the central processing unit 105 and the I/O channel 109. The I/O channel 109 can therefore access the memory 107 directly (without having to go through the central processing unit 105) for data transfers to and from a device controller 41.

The construction and operation of the memory system are illustrated in FIGS. 34-41 and are described in detail below under the subtitle Memory System.

Figure 37:
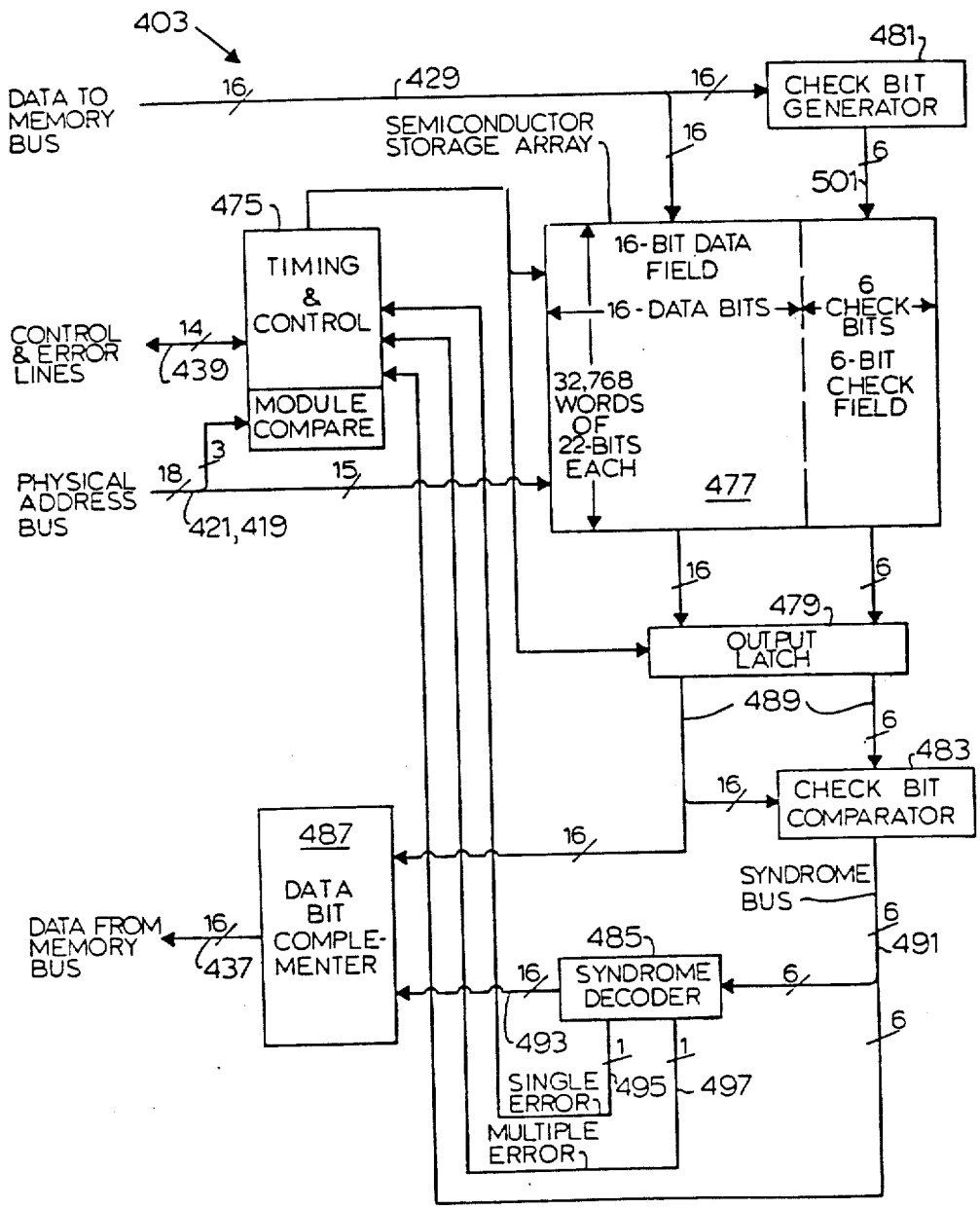
FIG. 37 is a block diagram showing details of one of the memory modules 403 illustrated in FIG. 34. The memory module 403 shown in FIG. 37 is a semiconductor memory module.

An error detection system is incorporated in the memory system for correcting all single bit and detecting all double bit errors when semiconductor memory is used in the memory system. This error detection system utilizes a 16 bit data field and a 6 bit check field as shown in FIG. 37 and includes a data bit complementer 487 as also shown in FIG. 37 for correcting single bit errors.

FIG. 37 through 41 and the related disclosure illustrate and describe details of the error detection system.

Before going into the detailed description of the systems and components noted generally above, it should be noted that certain terminology will have the following meanings as used in this application.

The term "software" will refer to an operating system or a user program instructions; the term "firmware" will refer to a microprogram in read only memory; and the term "hardware" will refer to actual electronic logic and data storage.

The operating system is a master control program executing in each processor module which has primary control of the allocation of all system resources accessible to that processor module. The operating system provides a scheduling function and determines what process has use of that processor module. The operating system also allocates the use of primary memory (memory management), and it operates the file system for secondary memory management. The operating system also manages the message system. This provides a facility for information transfer over the interprocessor bus.

The operating system arrangement parallels the modular arrangement of the multiprocessor system components described above, in that there are no "global" components.

At the lowest level of the software system, two fundamental entities are implemented--processes and messages.

A process is the fundamental entity of control within a system.

Each process consists of a private data space and register values, and a possibly shared code set. A process may also access a common data space.

A number of processes coexist in a processor module 33.

The processes may be user written programs, or the processes may have dedicated functions, such as, for example, control of an I/O device or the creation and deletion of other processes.

A process may request services from another process, and this other process may be located in the same processor module 33 as a process making the request, or the other process may be located in some other processor module 33.

The process work in an asynchronous manner, and the processor therefore need a method of communication that will allow a request for services to be queued without "races" (a condition in which the outcome depends upon the sequence of which process started first)—thus the need for "messages" (an orderly system of interprocessor module communication described in more detail below).

Also, all interprocessor module communication should appear the same to the processes, regardless of whether the processes are in the same or in different processor modules.

As will become more clear from the description to follow, the software structure parallels the hardware; and different processes can be considered equivalent to certain components of the hardware in arrangement and function.

For example, just as the I/O channel 109 communicates over the I/O bus 39 to the device controller 41, a user process can make a request (using the message system) to the process associated with that device controller 41; and then the device process returns status back similar to the way the device controller 41 returns information back to the I/O channel 109 over the I/O bus 39.

The other fundamental entity of the software system, the message, consists of a request for service as well as any required data. When the request is completed, any required values will be returned to the requesting process.

When a message is to be sent between processes in two different processor modules 33, the interprocessor buses 35 are used. However, as noted above, all communication between processes appears the same to the processes, regardless of whether they are in the same or in different processor modules 33.

This software organization provides a number of benefits.

This method of structuring the software also provides for significantly more reliable software. By being able to compartmentalize the software structure, smaller module sizes can be obtained, and the interfaces between modules are well defined.

The system is also more maintainable because of the compartmentalization of function.

The well defined modules and the well defined interfaces in the software system also provide advantages in being able to make it easily expandible—as in the case of adding additional processor modules 33 or device controllers 41 to the multiprocessor system.

Furthermore, there is a benefit to the user of the multiprocessor system and software system in that the user, writing his program, need not be aware of either the actual machine configuration or the physical location of other processes.

Just as the hardware provides multiple functionally equivalent modules with redundant interconnects, so does the software.

For example, messages going between processes in different processor modules 33 may use either interprocessor bus 35. Also, device controllers 41 may be operated by processes in either of the processor modules 33 connected to the device controller 14.

The multiprocessor hardware system and software system described above enable the user to develop a fault tolerant application system by virtue of its replicated modules with redundant interconnects.

THE INTERPROCESSOR BUS SYSTEM

As pointed out above, the individual processor modules 33 are interconnected by two interprocessor buses 35 (an X bus and a Y bus) with each bus controlled by a related bus controller 37. Each interprocessor bus 35, in combination with its bus controller 37 and a related interprocessor control 55 in each processor module 33, provides a multi-module communication path from any one processor module to any other processor module in the system. The use of two buses assures that two independent paths exist between all processor modules in the system. Therefore, a failure in one path (one bus)

does not prevent communication between the processor modules.

The bus controller 37 for each interprocessor bus 35 is a controller which is, in a preferred form of the invention, separate and distinct from the processor modules 33.

Each interprocessor bus 35 is a synchronous bus with the time synchronization provided by a bus clock generator in the bus controllers 37. The interprocessor control portions 55 of all of the modules associated with the bus make state changes in synchronism with that bus clock during transfers over the bus.

As will be described in more detail below, the CPU 105 operates on a different clock from the interprocessor bus clock. During the filling of an outqueue or the emptying of an inqueue in the interprocessor control 55 by the CPU, the operation takes place at the CPU clock rate. However, transmission of packets over the interprocessor bus always takes place at the bus clock rate.

It is an important feature of the present invention that the information transmitted over the interprocessor bus is transferred at high transmission rates without any required correspondence to the clock rates of the various CPUs 105. The information transfer rate over the interprocessor bus is also substantially faster than would be permitted by direct memory accesses into and out of the memory sections 107 at memory speed. This ensures that there is adequate bus bandwidth even when a large number of processor modules is connected in a multi-processor system.

A benefit of using separate clocks for each CPU 105 is that a master system clock is not required, and this eliminates a potential source of single component failure which could stop the entire system.

The interprocessor control 55 incorporates logic interlocks which make it possible to operate the interprocessor buses 35 at one clock rate and each CPU 105 at its own independent clock rate without loss of data.

The information transmitted over the bus is transmitted in multiword packets. In a preferred form of the present invention each packet is a sixteen word packet in which fifteen of the words are data words and one word is a check word.

The control logic within the bus controller 37 and the interprocessor controls 55 of the individual modules 33 follows a detailed protocol. The protocol provides for establishing a sender-receiver pair and a time frame for the data packet transfer. At the end of the time frame for the transmission of the data packet, the bus controller 37 is released for another such sequence. The specific manner in which these functions are carried out will become more apparent after a description of the structural features of FIGS. 3-9 below.

X bus 35 is identical in structure to the Y bus 35, so the structure of only one bus will be described in detail.

Figure 2:
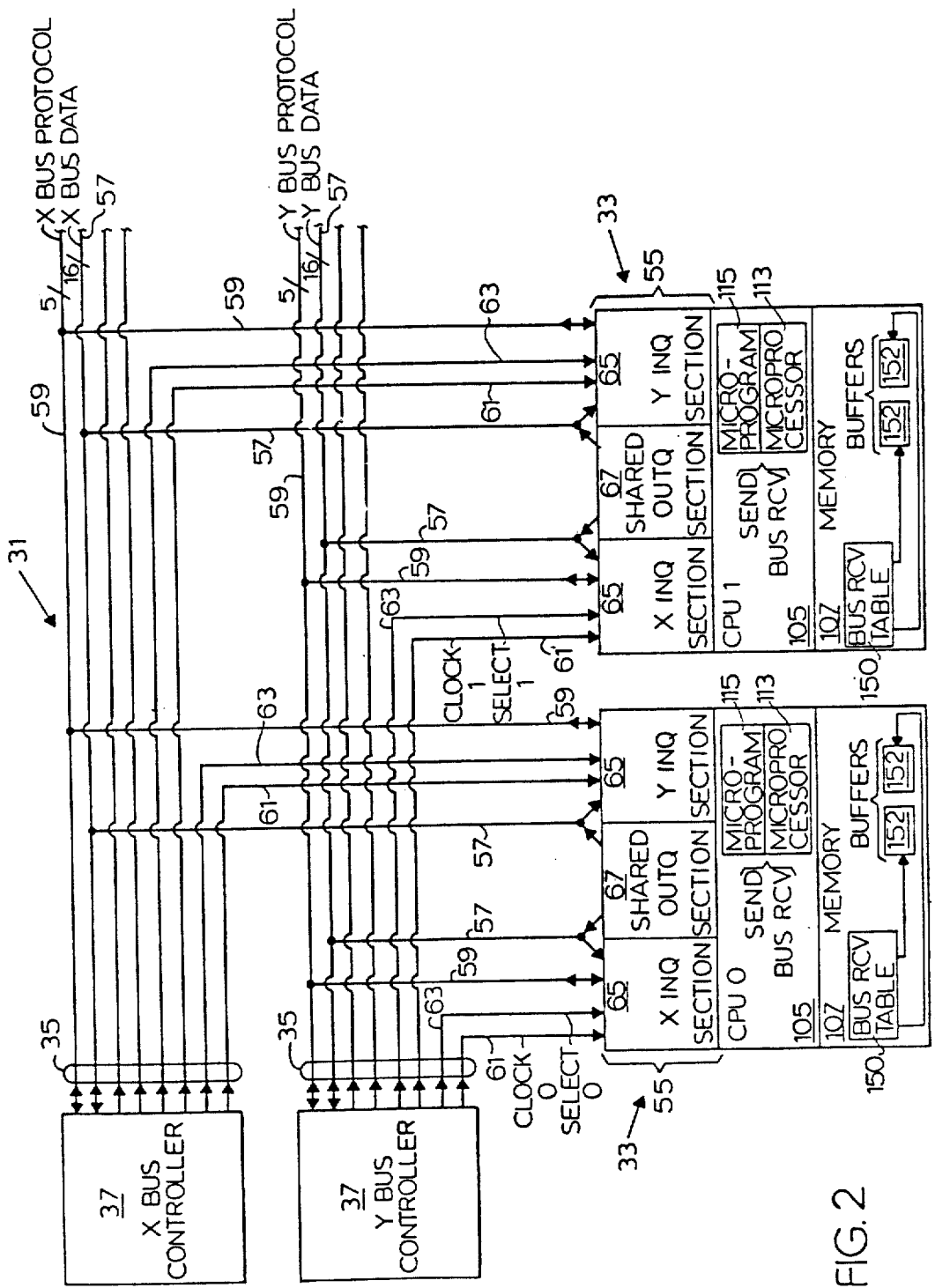
FIG. 2 is a block diagram view showing details of the connections of the X bus controller and the Y bus controller to the individual processor modules.

As illustrated in FIG. 2, each bus 35 comprises sixteen individual bus data lines 57, five individual bus protocol lines 59, and one clock line 61, and one select line 63 for each processor module 33.

As also illustrated in FIG. 2, the interprocessor control 55 of each processor module 33 includes two inqueue sections 65 (shown as an X inqueue section and a Y inqueue section in FIG. 2) and a shared outqueue section 67.

Figure 4:
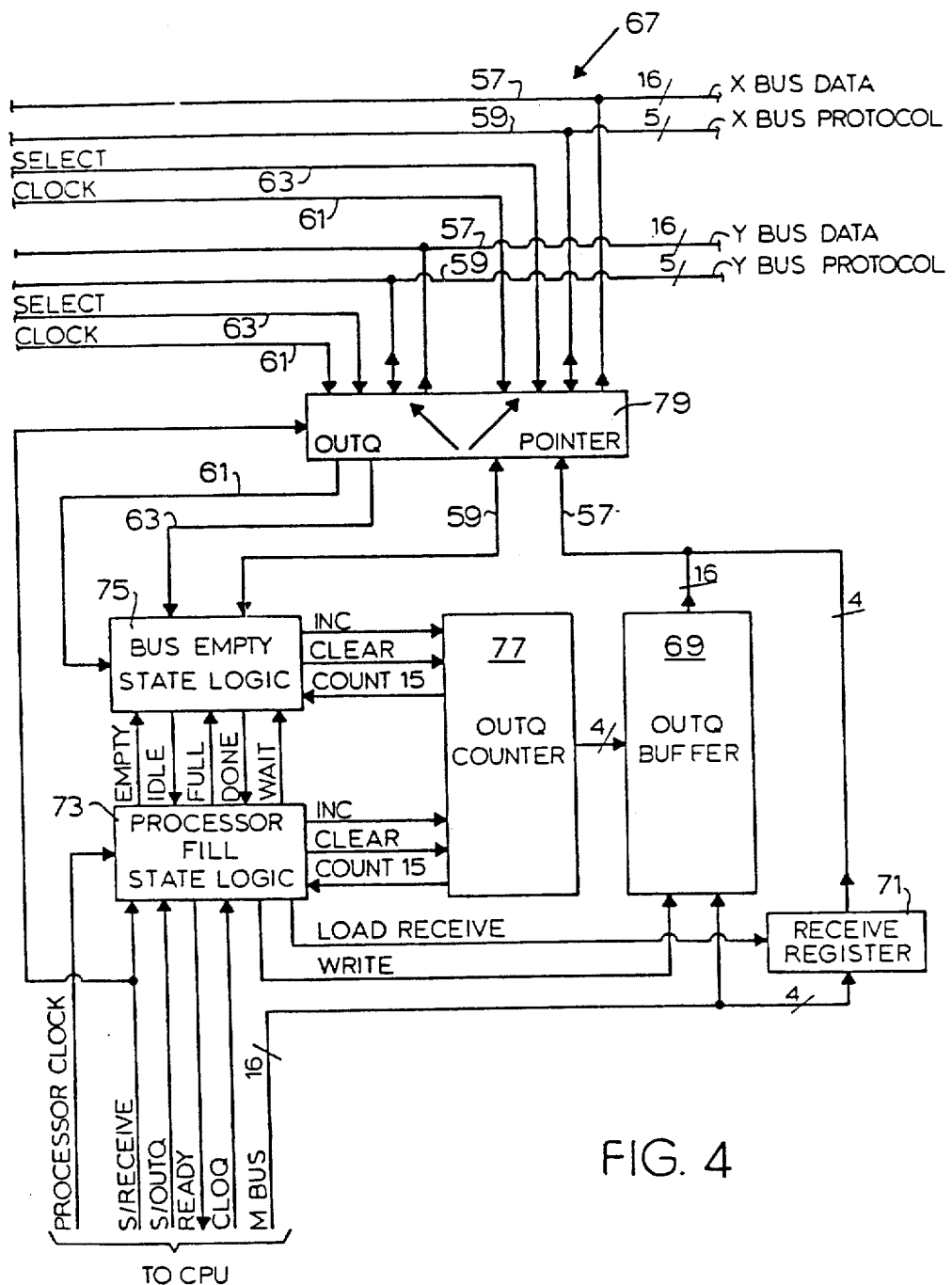
FIG. 4 is a detailed diagrammatic view of the logic for the shared output buffer and control 67 in the interprocessor control 55 of a processor module as illustrated in FIG. 2.

With the specific reference to FIG. 4, the shared outqueue section 67 includes an outqueue buffer 69 which performs a storage function. In a preferred form the buffer 69 has sixteen words of sixteen bits each. The buffer 69 is loaded by the CPU and holds the data until the packet transmission time, at which time the data is gated out to the bus, as will be described in more detail below.

The outqueue section 67 also includes a receive register 71, which in a preferred form of the invention is a four bit register. This register is loaded by the CPU with the number of the processor module to which the data will be sent.

The control part of the outqueue section 67 includes a processor fill state logic section 73 which operates in synchronism with the CPU clock, a bus empty state logic section 75 which operates in synchronism with the X or Y bus clock, and an outqueue counter 77. During filling of the outqueue buffer 69 by the CPU, the outqueue counter 77 scans the buffer 69 to direct the data input into each of the sixteen words of the buffer; and as the sixteenth word is stored into the outqueue buffer 69, the outqueue counter 77 terminates the fill state.

The outqueue section 67 also includes an out-queue pointer 79 which connects the entire outqueue section to either the X bus or the Y bus 35. The outqueue pointer 79 allows the logic sections 73 and 75 and the buffer 69 to be shared by the X and Y interprocessor buses 35.

Figure 3:
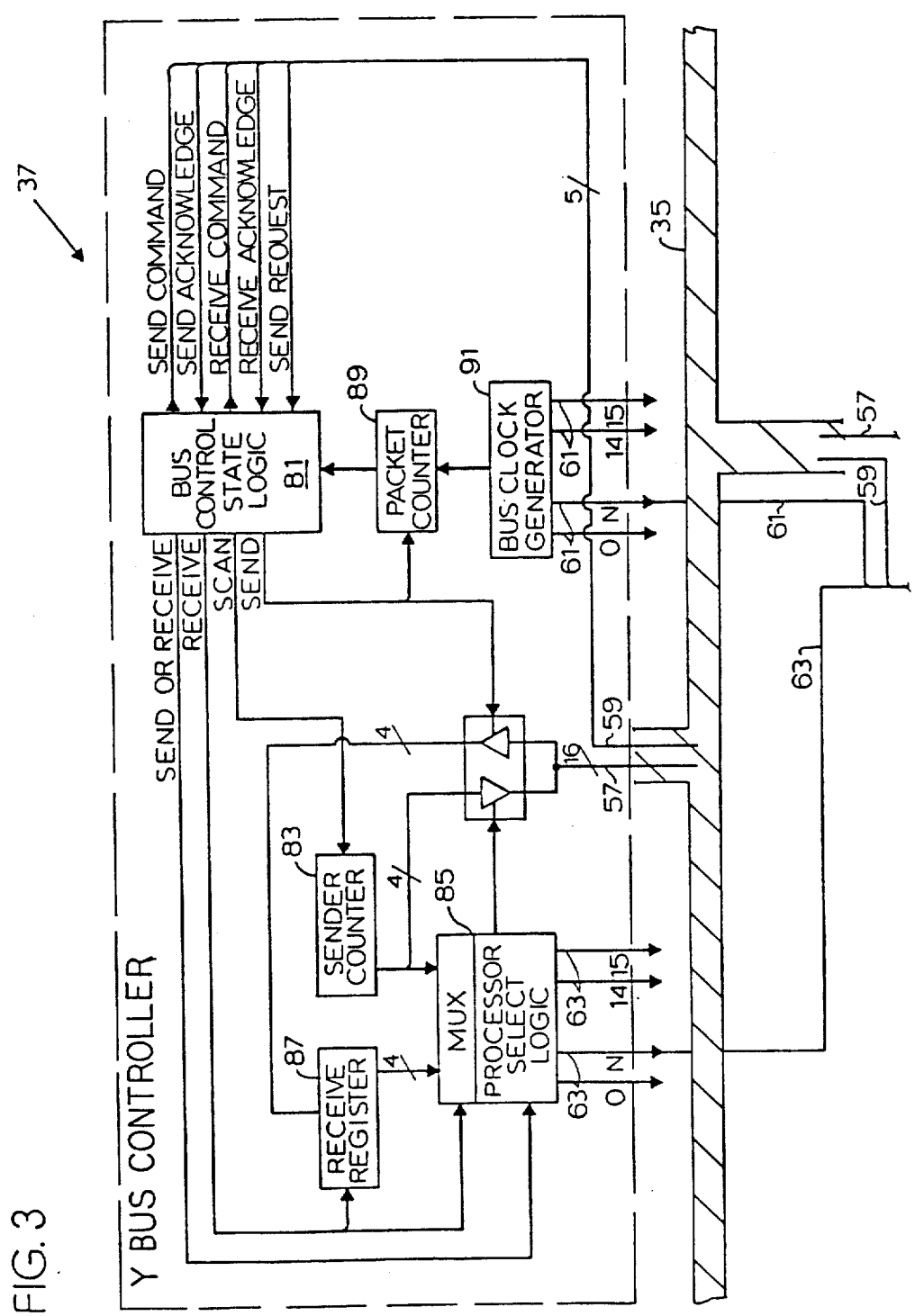

As illustrated in FIG. 3, the bus controller 37 comprises a bus control state logic section 81, a sender counter 83, a processor select logic section 85, a receive register 87, a packet counter 89 and a bus clock generator 91.

Figure 5:
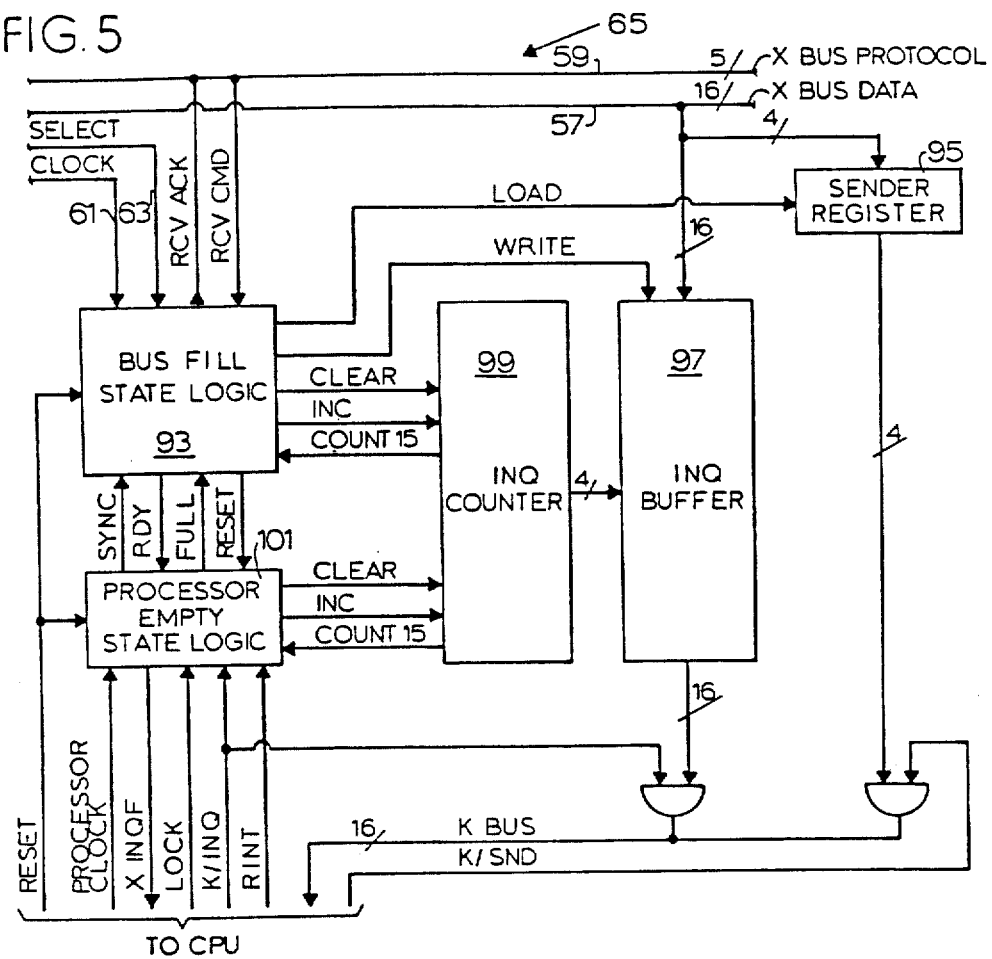
FIG. 5 is a view like FIG. 4 but showing the logic for an inqueue buffer and control 65 of the interprocessor control 55 for a processor module.

With reference to FIG. 5, each inqueue section 65 comprises a bus fill state logic section 93 which operates in synchronism with the bus clock, a sender register 95, an inqueue buffer 97, an inqueue counter 99, and a processor empty state logic section 101 which operates in synchronism with the CPU clock.

Figure 6:
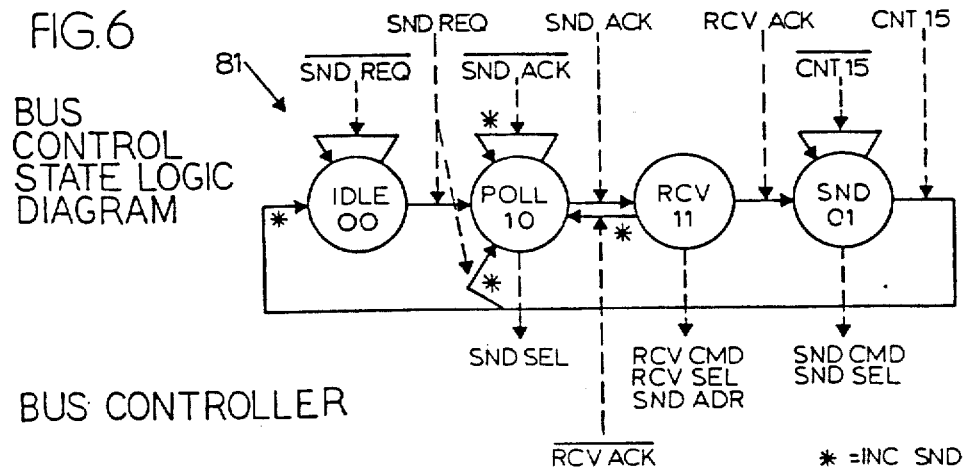
FIG. 6 is a detailed diagrammatic view of the logic of one of the bus controllers 37 shown in FIG. 2.

FIG. 6 is a state diagram of the bus control logic 81 of the bus controller 37.

FIG. 7 is a state diagram of the logic sections 73 and 75 of the outqueue section 67.

FIG. 8 is a state diagram of the logic sections 93 and 101 of the inqueue sections 65.

With reference to FIG. 7, the processor fill state logic section 73 has basically four states—EMPTY, FILL, FULL and WAIT—as indicated by the respective legends. The bus empty state logic section 75 has basically four states—IDLE, SYNC, SEND and DONE—as illustrated by the legends.

Continuing with a description of the notation in FIG. 7, the solid lines with arrows indicate transitions from the present state to the next state. Dashed arrows ending on the solid arrows indicate conditions which must be satisfied for the indicated transition to take place.

The synchronization of state machines running off relatively asynchronous clocks require a careful construction of an interlock system. These important interlocks are noted by the dashed arrows in the state diagrams. These interlocks perform a synchronization of two relatively asynchronous state machines. The dashed arrows in FIG. 7 and FIG. 8 running between the state machines thus indicate signals which synchronize (qualify) the indicated transitions of the state machines.

With reference to the FILL state for the logic section 73, it should be noted that the store outqueue condition will not cause an exit from the FILL state until the outqueue counter 77 has advanced to count 15 (on a count which starts with zero) at which time the FILL state will advance to the FULL state.

Similarly, it should be noted that the SEND state of the logic section 75 will not terminate on the select and send command condition until the outqueue counter 77 reaches count 15, at which time the SEND state advances to the DONE state.

The asterisk in the notation of FIG. 7 indicates an increment of the outqueue counter 77.

FIG. 6 shows the state diagram for logic 81 of the bus controller and illustrates that the logic has basically four states—IDLE, POLL, RECEIVE and SEND.

The notation in FIG. 6 is the same as that described above for FIG. 7. A solid arrow line indicates a state transition from one state to another and a dotted arrow line to that solid arrow line indicates a condition which must occur to allow the indicated (solid line arrow) transition to occur. An asterisk on a state transition in this case indicates that simultaneously with the indicated transition the sender counter 83 is incremented by one.

The dashed arrow output lines in FIG. 6 indicate protocol commands issued from the bus controller to the interprocessor bus.

In both FIG. 7 and FIG. 6 a dashed arrow leaving a state indicates a logic output from that state such as a logic output signal to a protocol line (in the case of the bus empty state logic 75) or to a status line of the processor module (in the case of the processor fill state logic 73).

FIG. 8 shows the state diagrams for the bus fill state logic section 93 and the processor empty state logic section 101.

The state diagram for the logic section 93 includes four states—SYNC, ACKNOWLEDGE, RECEIVE and FULL.

The state diagram for the logic section 101 includes four states—RESET, READY, INTERRUPT and DUMP.

The notation (solid line arrows and dashed line arrows) is the same as described above for FIG. 7 and FIG. 6.

The asterisk in FIG. 8 indicates an increment in the inqueue counter 99.

FIG. 9 is a timing diagram showing the time sequence in which the state changes given in FIGS. 6, 7 and 8 occur.

The sequence shown in FIG. 9 accomplishes the transmission of a packet from one processor module to another processor module at the bus clock rate (assuming that the intended receiver module is ready to receive the packet).

FIG. 9 shows the time sequences for a successful packet transfer with individual signal representations listed from top-to-bottom in FIG. 9 and with time periods of one bus clock each shown from left-to-right in the order of increasing time in FIG. 9.

The top line in FIG. 9 indicates the state of the bus controller, and each division mark represents a clock period or cycle of the bus clock generator 91 shown in FIG. 3. Each time division of the top line carries down vertically through the various signal representations listed by the legends at the left side of the figure.

Taking the signals in the sequence presented from top-to-bottom in FIG. 9, the first signal (below the bus controller state line) is the SEND REQUEST signal (one of the protocol group indicated by the reference numeral 59 in FIG. 3) and specifically is the signal which may be asserted by the outqueue control logic section 67 of any processor module 33. The signal is transmitted to the bus control state logic section 81 of the bus controller 37 (see FIG. 3).

The next signal shown in FIG. 9 (the SELECT signal) represents a signal which originates from the processor select logic section 85 of the bus controller 37 and which is transmitted on only one at a time of the select lines 63 to a related processor module 33.

The next signal represented in FIG. 9, the SEND ACKNOWLEDGE signal, may be asserted only by a particular processor 33 when that processor is selected and when its bus empty state logic section 75 is in the SEND state (as illustrated in the third state of FIG. 7). This SEND ACKNOWLEDGE signal is used by the bus controller 37 to establish the identity of a processor module 33 wishing to send a packet.

The next signal, the RECEIVE COMMAND signal, represents a signal from the bus controller 37 transmitted on one of the protocol lines 59. This signal does two things.

First of all, this signal in combination with receiver SELECT interrogates the receiver processor module 33 to find out whether this receiver module is ready to receive (as indicated by the ACKNOWLEDGE state in FIG. 8).

Secondly, this signal has a secondary function of disabling the bus empty state logic section 75 of the receiving module so that the receiving module cannot gate an intended receiver number to the data bus should the outqueue section of the intended receiver module 33 also have a data packet of its own ready to send.

In this regard, during the time that the sender processor is asserting the SEND ACKNOWLEDGE signal it is also gating the receiver number to the bus for use by the bus controller 37. The bus 35 itself is, of course, a non-directional bus so that the information can be gated to the data bus 57 by any module for use by either the bus controller 37 for a control function or for use by another processor for an information transfer function. It should be noted that a module 33 may gate data to the bus only when its SELECT line is asserted and the RECEIVE COMMAND signal is not asserted.

DUring the time that the RECEIVE COMMAND signal is asserted the bus controller 37 is gating the sender number to the data bus 57 for capture by the selected receiver processor module.

The next signal line (the RECEIVE ACKNOWLEDGE line in FIG. 9) represents a signal which is transmitted from the selected receiving module's bus fill state logic section 93 to the bus control state logic section 81 of the bus controller 37 (over one of the protocol lines 59) to indicate that the selected receiver module is in the ACKNOWLEDGE state (as indicated by the legend in FIG. 8) and thus ready to receive the packet which the sender module has ready to transmit.

If the RECEIVE ACKNOWLEDGE signal is not asserted by the receiver module, the sender SELECT, the SEND COMMAND and the time frame transmission of the data packet itself will not occur.

If the RECEIVE ACKNOWLEDGE signal is asserted, then the sequence indicated by the SEND COMMAND line will occur.

The SEND COMMAND line represents a signal which originates from the bus control state logic section 81 of the bus controller 37 and which is transmitted to the bus empty state logic section 75 of the sender processor module 33 over one of the protocol lines 59.

In combination with a SELECT of the sender processor module the SEND COMMAND signal enables the sender processor module to send a packet to the receiver module during the sixteen clock cycles bracketed by the SEND COMMAND signal.

The final line (the data/16 line) represents the information present on the data lines 57 during the above-described sequence.

The data is gated to the bus by the selected sender processor module and is transmitted to the receiver processor module into the inqueue buffer 97 (see FIG. 5) during this sixteen clock cycle time frame. This assumes that the RECEIVE ACKNOWLEDGE signal was received by the bus controller in response to the RECEIVE COMMAND signal.

If the RECEIVE ACKNOWLEDGE signal had not been received by the bus controller, then the SEND COMMAND signal would not have been asserted and the bus controller 37 would have resumed the POLL state as shown in FIG. 6.

With reference to FIGS. 2, 7, 10 and 11, a typical operation of the outqueue buffer and control 67 of one processor module 33 will now be described.

As illustrated in FIG. 10, the processor fill state logic section 73 includes two flip-flops A and B, and the bus empty state logic section 75 includes two flip-flops C and D.

Summarizing the state assignments as shown by the AB and CD tables in FIG. 10, the EMPTY state is defined as A=0, B=0. The FILL state is defined as A=1, B=0. The FULL state is defined as A=1, B=1; and the WAIT state is defined as A=0, B=1.

Similarly, the corresponding combinations of the C and D state variables are defined to be the IDLE, SYNC, SEND and DONE states respectively. State assignments previously listed could also be given in form of logic equations. For example, EMPTY=$\overline{A} \cdot \overline{B}$, and this notation is utilized in the FIG. 11 logic equation listings.

In operation and with specific reference to FIG. 7, the initial state reached through power on initialization or manual reset is the EMPTY state shown in the top left part of FIG. 7.

The EMPTY state of the processor fill state logic 73 provides a ready signal to the central processor unit (CPU) 105 to indicate the presence of that state, as indicated by the dashed arrow RDY shown as leaving the empty state in FIG. 7.

The CPU firmware (microprogram) in response to that ready signal, when a transmission over the interprocessor bus is required; will provide a store receive signal (shown by the dashed arrow incoming to the diagram in FIG. 7). This store receive signal qualifies (synchronizes) the transition which advances the EMPTY state to the FILL state.

The CPU firmware, to transfer data into the outqueue buffer 69, will provide a store outqueue signal (the dashed arrow entering the diagram in FIG. 7) for each word to be stored in the buffer 69.

Each occurrence of this store outqueue signal will advance the outqueue counter 77, commencing with a count of zero, until a count of 15 is reached.

On the sixteenth occurrence of the store outqueue signal a transition from the FILL to the FULL state, as illustrated by the solid line arrow in FIG. 7, is allowed.

The FULL state of the processor FILL state logic provides a synchronization condition to the bus empty state logic denoted by the dashed arrow leaving the FULL state of logic 73 and going down to the logic 75 in FIG. 7.

The processor fill state logic 73 will remain in the FULL state until the bus empty state logic 75 has subsequently reached the DONE state.

Now, referring specifically to the bus empty state logic denoted by 75 in FIG. 7, the initial state, IDLE, for the logic section 75 in FIG. 7 is again provided by power on initialization or manual reset.

The bus empty state logic 75 will remain in the IDLE state until the transition to the SYNC state is allowed as shown by the dashed arrow from the FULL state of the processor fill 73.

The empty state logic 75 will proceed with no qualification required from the SYNC state to the SEND state.

It is in the SEND state that the SEND REQUEST signal to the bus and to the bus controller is asserted (as indicated by the dashed arrow going down and leaving the diagram 75 from the SEND state).

In response to this SEND REQUEST signal, the bus controller logic 81 (FIG. 6) will poll processor modules successively until the sender is identified (as discussed earlier with reference to FIG. 9).

The bus controller will issue a RECEIVE COMMAND and SELECT to the intended receiver processor module; and upon receipt of the RECEIVE ACKNOWLEDGE signal will proceed to the packet time frame (also identified in FIG. 9).

During the packet time frame the bus controller asserts SELECT of the sender processor module and also asserts the SEND COMMAND signal to the sender processor module.

This SELECT signal and SEND COMMAND signal is shown as entering the diagram and qualifying (synchronizing) transitions leaving and entering the SEND state as noted in FIG. 7.

Each bus clock while SELECT and SEND COMMAND are asserted will advance the outqueue counter 77 commencing with a count of zero.

On the sixteenth clock period of SELECT and SEND COMMAND the transition terminating the SEND state and advancing to the DONE state is qualified (synchronized as shown by the dashed arrow allowing that transition).

When the empty state logic 75 has reached the DONE state, a transition of the processor fill state logic 73 from FULL to WAIT is qualified (as denoted by the dashed arrow leaving the done state).

Next, the WAIT state of the processor fill state logic 73 qualifies a transition of the bus empty state logic 75 from the DONE state to the IDLE state (as denoted by a dashed arrow leaving the WAIT state and qualifying the indicated transition).

Finally, the bus empty state logic 75, being in the IDLE state, qualifies the transition of the processor fill state logic 73 from the WAIT state to the EMPTY state (as denoted by the dashed arrow leaving the IDLE state).

At this point a packet has been loaded into the outqueue buffer 69 by the processor module and transmitted over the bus 35 to the receiver processor module, and the outqueue control processor fill state logic 73 and bus empty state logic 75 have returned to their initial states.

The above description relates to the transitions and qualifications indicated in FIG. 7. The action of the logic sections 73 and 75 involved in the above description of operation of FIG. 7 will now be noted with reference to the logic diagram of FIG. 10 and the logic equation listing of FIG. 11.

With reference to FIG. 10, as noted above, the flip-flops A and B are JK flip-flops and are edge triggered flip-flops in that state changes occur only on clock transitions (as indicated by the small triangular symbols and legends on the lefthand sides of the flip-flops A and B in FIG. 10).

The primary significance of the logic diagram in FIG. 10 is to illustrate the transition from one state to another in the state machines shown in FIG. 7. Thus, to illustrate the transition from IDLE to SYNC in the empty state logic 75, the operation proceeds as follows.

To implement a change from the IDLE state to the SYNC state, the state variable C must be set.

The logic equation for the J input of state variable C is as shown in FIG. 11 and is indicated by the reference numeral 103. In this equation the interlock (shown by the dashed arrow from the full state of the fill state logic 73 in FIG. 7 to the transition) corresponds to the quantity (A·B) or (FULL) in the equation indicated by the reference number 103. The $\overline{D}$ or (IDLE) in the equation indicated by reference numeral 103 in FIG. 11 corresponds to the IDLE state shown by the legend in FIG. 7. The J in the equation corresponds to the J input of the C flip-flop in FIG. 10. And the (C) corresponds to the true output of the C flip-flop in FIG. 10.

Other state transitions of the FIG. 7 diagram will not be described in further detail with reference to FIGS. 10 and 11 since it is believed that these transitions as carried out by the logic diagram in FIG. 10 and the logic equations in FIG. 11 are clear from the above examples of the transition from IDLE state to SYNC state as described in detail above.

FIGS. 10 and 11 show the logic diagram and logic equations for the state diagram of the outqueue buffer and control 67. Corresponding logic diagrams and logic equations have not been illustrated for the inqueue buffer and control 65 or the bus controller 37 because such logic diagrams and equations are similar to those shown in FIG. 10 and FIG. 11 and are easily obtainable from the state diagrams shown in FIGS. 6 and 8.

Each processor module 33 (FIG. 1) in the multiprocessor system is connected to both interprocessor buses 35 (FIG. 1) and is capable of communicating with any processor module including itself over either bus. For each block data transfer, one processor module is the source or sender and another is the destination or receiver.

Transmission of data by a processor module over one of the interprocessor buses is initiated and accomplished under software control by means of the SEND instruction.

In the SEND instruction the microprogram 115 (FIG. 2) and the CPU microprocessor 113 (FIG. 2) interacts with the shared outqueue section 67 of the interprocessor control 55 to read a data block from memory 101 to break it up into packets, to calculate packet check sum words, and to transmit the block one packet at a time over a bus to the receiving processor module. Parameters supplied to the SEND instruction specify the number of words in the block, the starting address of the block, which bus to use, the destination processor, and a maximum initial timeout value to wait for the outqueue 67 (FIG. 2) to become available.

The SEND instruction terminates only after the entire block has been transmitted; thus sending a block is a single event from the software viewpoint. However, the SEND instruction is interruptable and resumable, so that response of the operating system to other events is not impaired by the length of the time required to complete a SEND instruction.

Receiving of data by a processor module over the interprocessor buses is not done by means of a software instruction, since the arrival times and sources of data packets cannot be predicted. The receiving of data is enabled but cannot be initiated by the receiver.

The CPU microprocessor 113 takes time out from software instruction processing as required to execute the BUS RECEIVE microprogram 115. This microprogram takes the received data packet from one of the inqueue sections 65 (FIG. 2) of the interprocessor control 55, stores the data into a memory buffer, and verifies correct packet check sum.

Reassembly of received packets into blocks is accomplished using the Bus Receive Table 150 (BRT) in memory. The BRT contains 32 two-word entries, corresponding to the two buses from each of the sixteen processor modules possible in one specific implementation of the multiprocessor system. Each BRT entry corresponding to a bus and a sender contains an address word and a count word. The address word specifies into which buffer in the System Data area incoming data from that sender is to be stored. The count word specifies how many data words remain to complete the block transfer from that sender.

As each data packet is received, the CPU microprocessor 113 suspends processing of software instructions, and the bus receive microprogram 115 is activated. This microprogram reads the address and count words from the sender's BRT entry, stores the data packet into the specified area, verifies correct packet check sum, and restores adjusted values of the address and count words into the BRT entry. If the packet caused the count to reach zero or if the packet contained incorrect check sum, the bus receive microprogram sets a completion interrupt flag to signal termination of the data block to the software. The CPU microprogram then resumes software instruction process at the point where it left off with no disturbance except delay to the currently executing program.

It is an important feature that data blocks from several senders can all be assembled concurrently by a receiving processor module from data packets received in any sequence. This interleaved assembly of blocks from packets is carried on transparently to the software executing in the receiver processor. Only successful block completions or erroneous transmissions cause the software to be interrupted.

It is also important that a time-sharing or time-slicing of the interprocessor bus hardware has been achieved in two areas.

First, each interprocessor bus and associated bus controller allow packets to be transmitted between any sender and receiver as required. The circular polling by a bus controller to identify a requesting sender ensures that all processor modules have an equal opportunity to send over that bus. Each bus provides a communication path which is shared in time in an unbiased way by all processor modules.

Secondly, each inqueue section 65 of the interprocessor control 55 of a processor module is shared in time by incoming packets from several senders. That is, the inqueue logic and storage of a processor is not dedicated to a single sender for the duration of a block transfer. Instead, each packet received is correctly directed into memory by the BRT entry corresponding to its sender and bus. Data blocks from several senders are assembled correctly in the receiver's memory independently of the order in which the senders make use of the bus.

A processor module has two ways of controlling its ability to receive packets over the X bus or the Y bus.

First, there is a bit in the CPU's interrupt MASK register corresponding to each interprocessor bus. When the MASK bit is on, micro-interrupts for that bus are allowed. Micro-interrupts (activation of the BUS RECEIVE microprogram) occur when the Processor Empty state logic 101 (FIG. 5) of an inqueue section 65 reaches the MICRO-INT state after a packet has been received into an inqueue buffer. If the MASK bit is off when a packet is received, the micro-interrupt and subsequent processing of the packet into memory will be deferred until the MASK bit is set on by a software instruction.

Software operations such as changing a BRT entry are performed with micro-interrupts disabled to avoid unpredictable results. No packets are lost while microinterrupts are disabled. The first packet received will be held in the inqueue buffer until the micro-interrupt is enabled. Subsequent packet transfers while the inqueue buffer is full are rejected since the bus Fill state 93 logic will be in the FULL state and thus unable to assert RECEIVE ACKNOWLEDGE in response to SELECT.

A second means of controlling its ability to receive packets over the bus is the action taken by a processor module after an X bus or Y bus receive completion interrupt (activation of an operating system interrupt handler).

When a check sum error is detected in a received packet or when the BRT sum count remaining in a data block reaches zero as a packet is stored into memory, the BUS RECEIVE microprogram sets the X bus or Y bus completion interrupt flag. Otherwise, the microprogram issues the RINT signal (see FIG. 8) to the inqueue Processor Empty state logic 101 to allow another packet to be received. When the completion flag is set, however, the RINT Signal is not issued.

It is thus the responsibility of the bus receive completion software interrupt handler to issue the RINT signal (by means of an RIR software instruction) to reenable the inqueue 65. Until this occurs, the inqueue Bus Fill state logic 93 remains in the FULL state and no additional packets will be received.

The completion interrupt signal can therefore designate either a block data transfer that has been sent and received without error, or it can designate a partial transfer in which a check sum error is detected, and in which partial transfer of the completion interrupt is generated as a result of the check sum error detected. In the latter case, the sender continues to send the data block but the receiver discards the data block after the check sum error has been detected. This error shows up in the bus receive table (BRT) count word as a negative value. This will become more apparent from the description of the operation which follows.

The SEND instruction is an instruction that requires four parameter words in the CPU register stack.

The first of the four parameter words is a count of the number of words to be transferred. This value must match the number expected by the BRT in the receiver processor module if the transfer is to complete successfully.

The second parameter word is the address, minus one, in the System Data area in the sender processor's memory where the data to be transferred is located.

The third parameter word is a timeout value allotted to completing a single packet (fifteen data word) transfer. The timeout period is restarted for each packet transferred by the SEND instruction.

The fourth parameter word specifies the bus (whether the X bus or the Y bus) to be used and specifies the receiver processor module. The high order bit of the parameter specifies the bus and the low order four bits, in one specific implementation of the invention, specify the number of the receiver processor module.

At the completion of a SEND instruction, there are two possible conditions.

The first condition is that a packet timeout occurred and the remaining packets were not transmitted and the instruction was terminated at that point. In this event the remaining packets of the block are not transmitted.

The second condition is an indication that a successful data block transfer has been completed.

Thus, in initial summary of the SEND operation, the SEND instruction fills the outqueue buffer 69 (FIG. 4) with fifteen data words, appends an odd-parity check sum, and signals the bus controller 37 that it has a packet ready for transmission. After each sixteen word packet is transmitted, execution of the SEND instruction resumes at the point where it left off. If the last packet of the block has less than fifteen words, the remaining words are filled in with zeros. The instruction terminates when the last packet is transmitted.

FIG. 5 shows the logic diagram and FIG. 7 shows the state diagram for the send hardware.

The first action of the SEND instruction sequence is to issue the S/RECEIVE signal to the processor fill state logic 73 (FIG. 4) and to supply on the M Bus (FIG. 4) the receiver processor number to the receive register 71. Simultaneously, the pointer of the outqueue point 79 is set in accordance with the high order bit of the M Bus to connect the outqueue 67 to either the X bus or the Y bus.

The store receive (S/RECEIVE) signal causes the processor fill state logic 73 (which is initially in the empty state as shown in FIG. 7) to advance to the FILL state as shown in FIG. 7. This state transition causes the receive register 71 (FIG. 4) to be loaded with the receiver processor number.

At this point the outqueue section 67 is ready for the data packet to be loaded into the outqueue buffer 69. Now, up to fifteen words are read from memory and are stored, by means of the M bus (FIG. 4), into the outqueue buffer 69. The store outqueue signal causes each word on the M bus to be written into the outqueue buffer 69 in a location specified by the outqueue counter 77. Each store outqueue signal also causes the outqueue counter 77 to be advanced by one.

As the words are being read from memory, the address word is being incremented by one, and the count of the words to be sent is being decremented by one. If the count reaches zero before fifteen words are read from memory, the remainder of the outqueue buffer is filled with zeros to pad out the data packet.

In addition, as the words are being loaded into the outqueue buffer 69, the microprogram 115 (FIG. 2) is calculating a modulo-two sum of the data words. After the fifteenth data word has been loaded, this odd check-sum word is loaded into the sixteenth location of the outqueue buffer 69.

At this time the outqueue counter 77 has a value of count 15 and this value, in combination with the store outqueue signal, causes the processor fill state logic 73 to advance from the FILL state to the FULL state as shown in FIG. 7.

At this point the microprogram 115 has completed loading of the data into the outqueue 69. The microprogram now waits for the packet to be transmitted by testing for occurrence of the ready (RDY) signal shown in FIG. 7.

While waiting for the packet to be transmitted, the microprogram 115 increments a timer; and if the timer runs out or expires before the ready (RDY) signal is asserted, the microprogram issues the clear outqueue (CLOQ) signal to the processor fill state logic 73 (see FIG. 4). This causes the processor fill state logic 73 to return to the empty state as shown in FIG. 7, and the microprogram then terminates the SEND instruction with the time out indication.

In normal operation, the FULL state of the processor fill state logic 73 qualifies the bus empty state logic 75 to advance from the IDLE state to the SYNC state shown in FIG. 7. Next, the SYNC state automatically advances to the SEND state, and this state causes the SEND REQUEST signal to be issued to the bus controller 37. The SEND REQUEST signal initiates a packet transfer sequence described earlier.

As described earlier, when the sender processor module has been identified by the bus controller 37 by polling, and when the receiver processor module has accepted the packet transfer by means of the RECEIVE ACKNOWLEDGE signal, the data packet is gated from the outqueue buffer 69 through the outqueue pointer 79 to one of the data buses 57 for loading into the inqueue of the receiver processor module.

As the sixteenth word is gated to the bus, the value of the outqueue counter count 15, in combination with the SEND COMMAND signal and the SENDER SELECT signal causes the SEND state of the bus empty state logic 75 to advance to the DONE state.

The DONe state qualifies the FULL state of the processor fill state logic 73 (as shown by the dashed line arrow going from the DONE state to the indicated transition from the FULL state in FIG. 7) to advance to the WAIT state.

Next, the WAIT state qualifies the DONE state to advance to the IDLE state as illustrated by the state diagram in FIG. 7.

Finally, the IDLE state qualifies the WAIT state to advance to the EMPTY state as also indicated in the state diagram of FIG. 7.

The empty state, of the processor fill state logic 73, provides the READY indication to the microprogram 115.

If the packet just transmitted was the last packet in the specified data block, the SEND instruction is terminated and the successful block transfer indication is given.

If the packet transmitted is not the last packet in a data block, then the sequence described above is repeated until all words in the block have been transmitted, or until a timeout error has occurred.

The SEND instruction is interruptable and resumable; however, the SEND instruction is only interruptable between packets; and the interruption of the SEND instruction has no effect on the data transmitted.

Thus, by means of a single software instruction (the SEND instruction) a data block of up to 32,767 words is transmittable from a sender processor module to a receiver processor module, and accuracy of the transmission is checked by the packet check-sum. Also, the transmission occurs at a high data transfer rate, because the buffering provided by the outqueue buffer 69 of the sender processor module enables the transfer to be made at interprocessor bus speed independent of the memory speed of the sender processor module. This allows efficient use of this communication path between a number of processor modules on a time slicing basis.

As noted above, there is no instruction for receive.

For a processor module to receive data over an interprocessor bus, the operating system in that processor module must first configure an entry in the bus receive table (BRT). Each BRT entry contains the address where the incoming data is stored and the number of words expected.

While the sender processor module is executing the send instruction and sending data over the bus, the bus receive hardware and the microprogram 115 in the receive processor module are storing the data away according to the appropriate BRT entry (this occurs interleaved with software program execution).

When the receiver processor module receives the expected number of words from a given sender, the currently executing program is interrupted, and that particular bus transfer is completed.

FIG. 5 shows the logic diagram and FIG. 8 shows the state diagram for the bus receive hardware.

As previously pointed out, there are identical X and Y inqueue sections 65 in each processor module for the X bus and the Y bus. Only one of the inqueue sections will therefore be referred to the description which follows.

After initial reset of a processor module, or after a previous receive operation, the RESET state of the processor empty state logic 101 advances to the READY state. The READY state qualifies the SYNC state of the bus fill state logic 93 to advance the logic to the ACKNOWLEDGE state.

In this ACKNOWLEDGE state the inqueue section 65 returns RECEIVE ACKNOWLEDGE to the bus controller 37 in response to a SELECT 63 (see FIG. 2) of that processor module 33. This indicates the readiness of the X inqueue section 65 to receive the data packet.

In the packet transfer sequence (described in detail above) the combination oft he SELECT of that processor module and the RECEIVE COMMAND signal qualify the ACKNOWLEDGE state of the bus fill state logic 93 and to advance to the RECEIVE state.

At this state transition the sender register 95 (FIG. 5) is loaded with the number of the sending processor module.

In the RECEIVE state the data packet is loaded from the data bus to the inqueue buffer 97 under control of the inqueue counter 99.

As the sixteenth word of the packet is loaded, it causes the RECEIVE state to advance to the FULL state (see FIG. 8).

Now the FULL state qualifies the READY state of the processor empty state logic 101 to advance to the MICROINTERRUPT state as shown in FIG. 8. The MICROINTERRUPT state presents an INQUEUE FULL state to the CPU interrupt logic. This INQUEUE FULL signal causes a microinterrupt to occur at the end of the next software instruction if the MASK bit corresponding to that bus is on.

The bus receive microprogram 115 activated by the interrupt first of all issues a LOCK signal (see FIG. 5) to the processor empty state logic 101. This causes the MICROINTERRUPT state of the processor empty state logic 101 to advance to the DUMP state.

The LOCK signal also selects either the X inqueue or the Y inqueue; subject, however, to the condition if both inqueues are full and enabled, the X inqueue is selected.

Next, the microprogram 115 issues the K/SEND signal which causes the sender register 95 contents to be gated to the K bus (as shown in FIG. 5) to obtain the packet sender's processor number.

Using this processor number, the microprogram 115 reads the sender processor's BRT entry to obtain the address and count words.

If the count word is zero or negative, the packet is discarded; and in this case, the microprogram 115 issues a RINT signal which causes the processor empty state logic 101 to advance from the DUMP state to the RESET state as shown in FIG. 8. In this event there is no further action. The microinterrupt is terminated, and software instruction processing is resumed.

If the count is positive, the microprogram 115 reads words from the inqueue buffer 97 to the K bus by means of the K/INQUEUE signal as shown in FIG. 5.

With each occurrence of the K/INQUEUE signal, the inqueue counter 99 is incremented to scan through the inqueue buffer 97.

As each data word is read from the inqueue buffer 97, the count word is decremented, the memory address word is incremented, and the data word is stored into memory.

If the count word reaches zero, no more words are stored in memory, a completion interrupt flag is set, and the sender processor number is saved in a memory location. In that event the fill state bus logic 93 stays in the FULL state until cleared by a software RIR instruction.

Thus, when a data block has been completely received, the count word will contain a value between minus 14 and zero. After the completion interrupt occurs, no further transfer to the processor over the bus which cause the interrupt are permitted until the inqueue is cleared with an RIR instruction.

As the data words are stored into the memory, a modulo-two sum of packet data is calculated.

If the check sum is bad, the word count in the BRT entry is set to minus 256, a completion interruprupt flag is set, and the sender processor number is saved in memory. As above, the bus fill state logic 93 stays in the FULL state until cleared by an RIR instruction.

If the count word does not reach zero, and the check sum is good, the bus receive microprogram 115 issues the RINT signal to the processor empty state logic as shown in FIG. 5 which causes the DUMP state of the processor empty state logic 101 to advance to the RESET state as shown in FIG. 8.

The RESET state of the logic 101 qualifies the bus fill state logic 93 to advance from the FULL state to the SYNC state as also shown in FIG. 8.

At this point, the logic has been returned to the state it was in before the packet was received, thus enabling the receipt of more packets.

These packets may be from the same sender, completing that data block, or the packets may be from some other sender.

This completes the action of the bus receive microprogram 115 and the microprocessor 113 resumes processing of software instructions.

When a bus receive completion interrupt has occurred, the software interrupt handler obtains the sender processor number from the memory location where that number was saved, and the software interrupt handler can then detect is a check sum error occurred by examining that sender processor's bus receive table count word.

In the case of a transmission error, the count word has been set to minus 256. Otherwise, the count word will contain a value between minus fourteen and zero.

As mentioned above, it is thus the responsibility of the bus receive completion software interrupt handler to issue the RINt signal (by means of an RIR software instruction) to reenable the inqueue 65.

In summary on the receive operation, just as the sending of a data block by a sender processor module is viewed by software as a single event, the receiving of data by a receiver processor does not cause a software interrupt of the receiver processor module until the entire data block has been received or until an error has occurred. Also, the inqueue 65 serve as buffers to allow the transmission of data to occur at bus transmission rates while allowing the storing of data into memory and the checking of the data to occur at memory speed. This ability to use the high transmission rate on the bus insures adequate bus bandwidth to service a number of processor modules on a time slicing basis. Finally, the provision of a check sum word in each data packet provides a means in the receiver processor module for checking the accuracy of the data received over the multiprocessor communication path.

Information sent over the interprocessor bus is sent under the control of the operating system and is sent from one process in one processor module 33 to another processor in another processor module 33. A process (as described in detail above in the description of the Multiprocessor System) is a fundamental entity of control in the software system; and a number of processes coexist in a processor module 33. The information sent over the interprocessor bus between processes in different processor modules consists of two types of elements, control packets and data.

The control packets are used to inform the receiving processor module 33 about message initiations, cancellations, and data transfers.

In this regard it should be noted that, while the interprocessor buses 35 interconnect the processor modules 33, a process within a particular processor module 33 communicates with another process or with other processes within another processor module 33 through bus traffic between two processor modules 33 will therefore contain pieces of interprocess communications that are in various states of completion. Many interprocess communications are therefore being interleaved on an apparently simultaneous basis.

The hardware is time slicing the use of the interprocessor bus 35 on a packet level, and multiple processes are intercommunicating both within the processor modules 33 and to the extent necessary over the interprocessor buses 35 in message transactions which occur interleaved with each other. Under no circumstances is an interprocessor bus 35 allocated to any specific process-to-process communication.

Data information is sent over the interprocessor bus in one or more packets and is always preceded by a control packet and is always follwed by a trailer packet.

The control packet preceding the data packets is needed because a bus is never dedicated to a specific message, and the control packet is therefore needed to correctly identify the message and to indicate how much data is to be received in the message.

This information transfer (control packet, data information, trailer packet) is made as an indivisible unit once it is started. The sender processor module sends the data block as an individual transmission (consisting of some number of data packets) and sends the trailer packet as an individual transmission; and only then is the sender processor module able to send information relating to another message.

The trailer packet serves two purposes.

First of all, if there is an error during a data transmission (and therefore the rest of the data block must be discarded), the trailer packet indicates the end of the block.

Secondly, if the sender attempts to send too much data (and against the block must be discarded), the trailer packet provides a means for recognizing data has been transmitted and the data transmission has completed.

The information transmitted is either duplicated over different paths (so that it is insured that the information will get to the receiver) or a receiver acknowledgment is required (so that the information is repeated if necessary). Any single bus error therefore cannot cause information to be lost, and any single bus error will not be seen by the two processes involved.

The bus receives software interlocks with the bus receive hardware (the inqueue section 65 shown in FIG. 2) by controlling the transfer of information from the inqueue into the memory 107.

This allows such operations as changing the bus receive table information to be done without race conditions (synchronization problems).

Once the bus receive table information has been updated, the interlock is removed by clearing the previous completion interrupt and by reenabling the bus receive microinterrupts by setting on the bus makes bit in the mask register.

This does two things. It allows the inqueue hardware to accept a packet into the inqueue, and it also enables the bus receive microprogram to transfer the information from the inqueue into memory.

The hardware/software system is so constructed that no information is lost on a system power failure (such as a complete failure of AC power from the mains) or on a line transient that causes a momentary power failure for part of the system.

This hardware/software system coaction includes a power warn signal (see line 337 of FIG. 3) supplied to the inqueue section 65 (see FIG. 2) so that, at most, one further packet of information can be loaded into the inqueue after the receipt of the power warn signal.

The software action in this even includes a SEND instruction to force the inqueues to be full. The after the process or module 33 has received its power warn signal, so that the state of every transfer is known when logic power is removed.

The interprocessor buses 35 are used by the operating system to ascertain that other processor modules in the system are operating. Every N seconds, each of the processor modules 33 sends a control packet to each processor module 33 in the system on each interprocessor bus 35. Every two N seconds, each processor module 33 must have received such a packet from each processor module 33 in the system. A processor module that does not respond is considered down. If a processor module does not get its own message, then that processor module 33 known that something is wrong with it, and it will not longer take over I/O device controllers 41.

Figure 42:
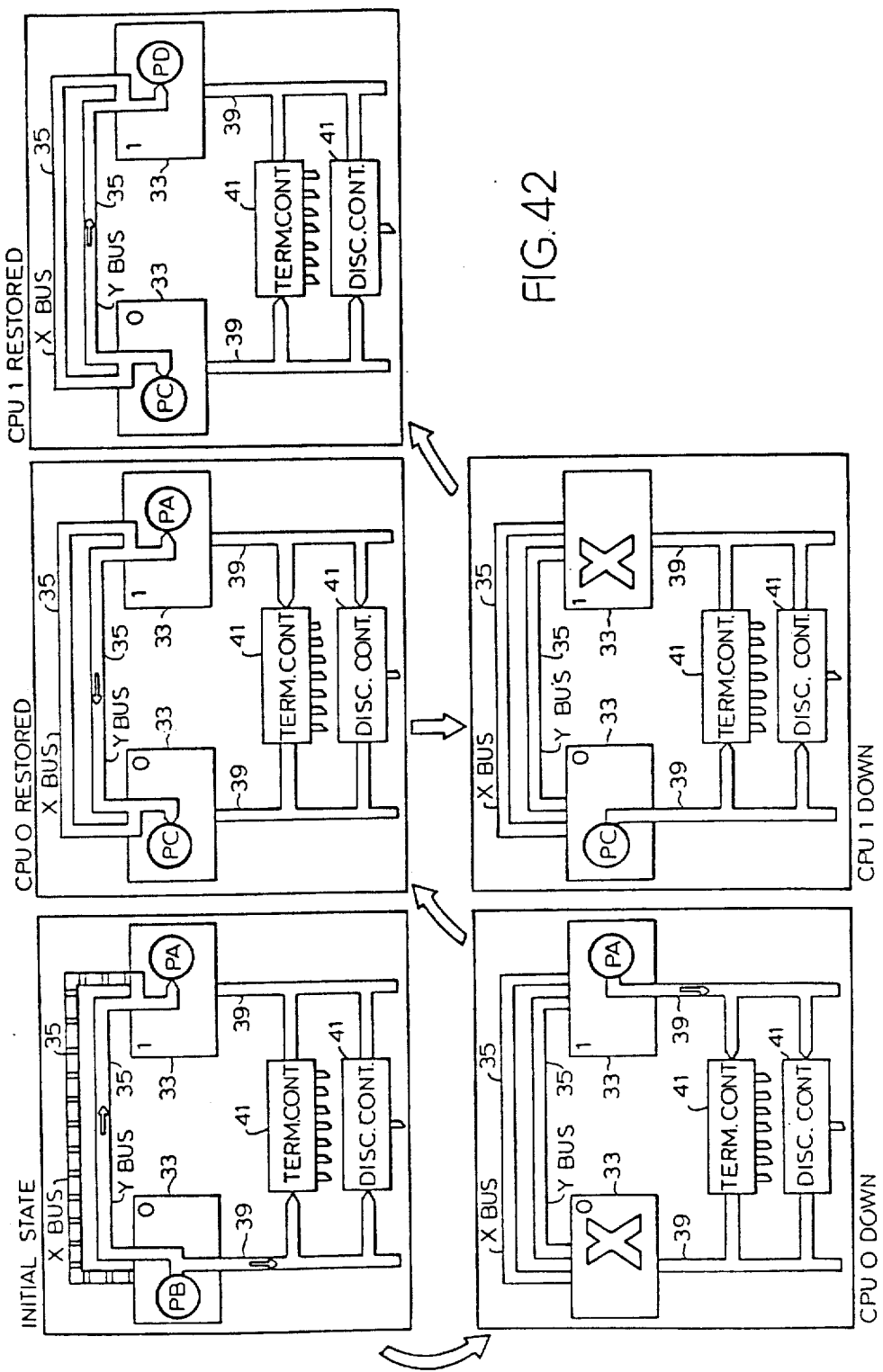
FIG. 42 shows the various states of a two processor system running an application program which is required to be running continuously. The diagrams illustrate the two processors successively failing and being repaired and the application program changing its mode of operation accordingly.

FIG. 42 diagrammatically illustrates how a particular application program can run continuously even though various parts of the multiprocessor system can become inoperative.

Each of the separate views shown in FIG. 42 illustrates a multiprocessor system configuration which consists of two processor modules 33 connected by dual interprocessor buses 35 (indicated as an X bus and a Y bus), a device controller 41 which controls a number of keyboard terminals, and another device controller 41 which controls a disc.

The individual views of FIG. 42 indicate various parts of the multiprocessor system rendered unserviceable and then reintroduced into the multiprocessor system in a serviceable state.

The sequence starts with the upper left hand view and then proceeds in the order indicated by the broad line arrows between the views. The sequence thus goes from the condition indicated as (1) Initial State to (2) CPU 0 Down to (3) CPU 0 Restored to (4) CPU 1 Down to (5) CPU 1 Restored (as indicated by the legends above each individual view).

In the initial state of the multiprocessor system shown in the view entitled "Inititial State" at the upper left hand corner of FIG. 42, one copy (PA) of the application program is active. This copy makes a system call to create the copy PB as a backup to which the application program PA then passes information. All of the I/O is taking place by way of the processor module 0. In this initial state either interprocessor bus 35 may fail or be brought down (as indicated by the bars on the X bus) and can be then reintroduced into the multiprocessor system without producing any effect on the application program PA.

In the next view (the view entitled "CPU 0 Down") the processor module 0 is rendered unserviceable. The multiprocessor system informs the application program PA that this has happened, and the application program PA no longer tries to communicate with the program PB. All of the I/O is switched by the multiprocessor system to take place by way of the processor module 1, and the application program continues to service the terminals nonstop without interruption over the I/O bus 39 connecting the processor module 1 with the device controllers 41 (as indicated by the solid line arrow on the right hand I/O bus 39).

In the next state of operation of the multiprocessor system, as illustrated in the center top view of FIG. 42 and entitled "CPU 0 Restored", the processor module 0 is now brought back into service by way of a console command. The processor module 0 is reloaded with the multiprocessor system from the disc by way of the processor module 1. The application program PA is informed that processor module 0 is now serviceable and the application program PA tells the multiprocessor system to create another copy of the application program in the processor module 0. This other copy is designated as PC. The terminals continue nonstop without interruption.

Next, the processor module 1 is rendered inoperative, as illustrated in the view entitled "CPU 1 Down". The application program PC is informed of this fact by the multiprocessor system and the application program PC takes over the application. The multiprocessor system automatically performs all of the I/O by way of the processor module 0. The terminals continue nonstop without interruption.

Finally, as indicated by the top right hand view of FIG. 42 entitled "CPU 1 Restored", the processor module 1 is rendered operable by way of a console command and is reloaded with the multiprocessor system from the disc by way of the processor module 0. The application program PC is informed that the processor module is now available, and it tells the multiprocessor system to create another copy of itself (application program PD) in the processor module 1. All elements of the multiprocessor system are now operable.

During the whole of this time both interprocessor buses and both processor modules had been rendered unserviceable and reintroduced into the system, but the application program and the terminals continued without a break.

It is an important features of the multiprocessor system that not only can the application program continue while something has failed, but also that the failed component can be repaired and/or replaced while the application program continues. This is true not only for the processor modules and interprocessor buses but also for all elements of the multiprocessor system, such as power supplies, fans in the rack, etc. The multiprocessor system 31 thus is a true nonstop system.

THE INPUT/OUTPUT SYSTEM AND DUAL PORT DEVICE CONTROLLER

The multiprocessor system 31 shown in FIG. 1 includes a input/output (I/O) system and dual port device controller 41 as noted generally above.

The general purpose of the I/O system is to allow transfer of data between a processor module 33 and peripheral devices.

It is an important feature of the present invention that the data transfer can be accomplished over redundant paths to insure fail soft operations so that a failure of a processor module 33 or a failure of a part of a device controller 41 will not inhibit transfer of data to and from a particular peripheral device.

Each device controller 41 has dual ports 43 and related structure which, in association with two related I/O buses 39, permit the redundant access to a peripheral device as will be described in more detail below.

The I/O system of the present invention also has some particularly significant feature in terms of performance. For example, one of the performance features of the I/O system of the present invention is the speed (bandwidth) at which the input/output bus structure operates. The device controllers 41 collect data from peripheral devices which transmit data at relatively slow rates and transmit the collected data to the processor modules in a burst multiplex mode at or near memory speed of the processor modules 33.

As illustrated in FIG. 1, each processor module 33 is attached to and handles a plurality of individual device controllers 41; and this face makes it possible for each device controller 41 to be connected (through dual ports 43) to more than one processor module 33 in a single multiprocessor system.

With reference now to FIG. 12 of the drawings, each processor module 33 includes, in addition to the interprocessor control 55 noted above, a central processor unit (CPU) part 105, a memory part 107 and an input/output (I/O) channel part 109.

As illustrated in FIG. 12 and also in FIG. 1, each device controller 41 controls one or more devices through connecting lines 111 connected to a star pattern, i.e. each device independently connected to the device controller.

In FIG. 12 a disc drive 45 is connected to one device controller 41 and a tape drive 49 is connected to another device controller 41.

With continued reference to FIG. 12, each CPU part 105 includes a microprocessor 113. A microprogram 115 is associated with each microprocessor 113. A part of the microprogram 115 is executed by the microprocessor 113 in performing I/O instructions for the I/O system. The I/O instructions are indicated in FIG. 12 as EIO (execute I/O), IIO (interrogate I/O), HIIO (interrogate high priority I/O); and these instructions are illustrated and described in greater detail below with reference to FIGS. 15, 16 and 17.

The microprocessor 113 has access to the I/O bus 39 by way of the I/O channel 109 by a collection of paths 117 as illustrated in FIG. 12.

With contained reference to FIG. 12, the I/O channel 109 includes a microprocessor 119, and a microprocessor 121 is associated with the microprocessor 119.

The microprogram 121 has a single function in the multiprocessor system, and that function is to perform the reconnect and data transfer sequence illustrated in FIG. 16 (and described in more detail below).

The I/O channel 109 of a processor module 33 also includes (as shown in FIG. 12) data path logic 123.

Figure 13:
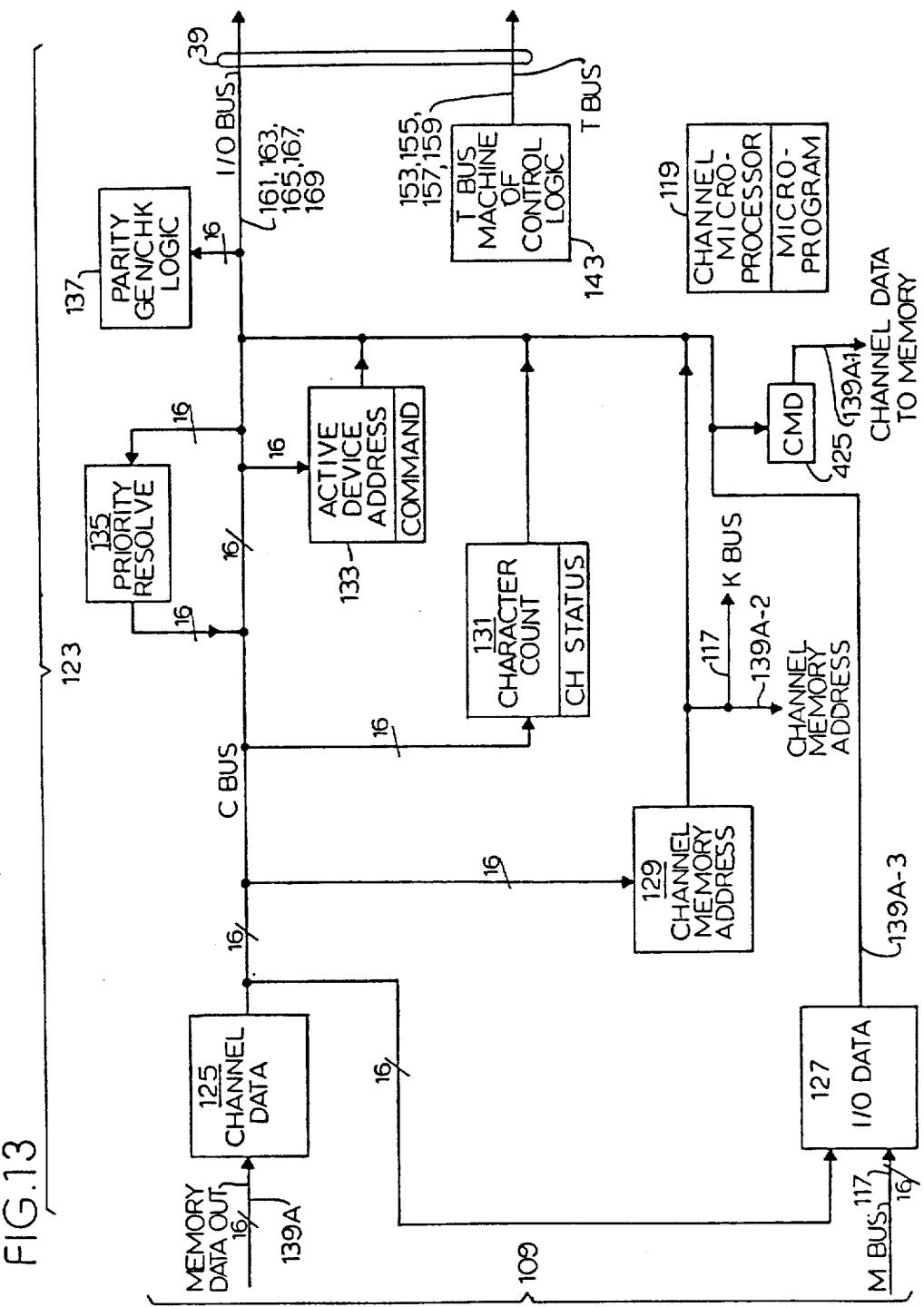
FIG. 13 is a block diagram of the input/output (I/O) channel 109 of a processor module.

As best illustrated in FIG. 13, the data path logic 123 includes a channel memory data register 125, an input/output data register 127, a channel memory address register 129, a character count register 131, an active device address register 133, a priority resolving register 135 and parity generation and check logic 137.

The path 117 shown in FIG. 12 includes two buses indicated as the M bus and the K bus in FIG. 13.

The M bus is an outbus from the microprocessor 113 and transmits data into the input/output data register 127.

The K bus is an inbus which transmits data from the data path logic 123 into the microprocessor 113.

With reference to FIG. 12, a path 139 connects the data path logic 123 and the memory subsystem 107.

This path 139 is illustrated in FIG. 12 as including both a hardware path 139A and two logical paths 139B and 139C in the memory subsystem 107 of a processor module 33.

Logical paths 139B and 139C will be described in greater detail below in connection with the description of FIG. 16.

The hardware path 139A includes three branches as illustrated in FIG. 13.

A first branch 139A-1 transmits from memory into the channel memory data register 125.

A second path 139A-2 transmits from the channel memory address register 129 to memory.

And a third path 139A-3 transmits from the input/output data register 127 to memory.

With reference to FIG. 12, the input/output channel of a processor module 33 includes a control logic section 141.

This control logic section 141 in turn includes a T bus machine 143 (see FIG. 13) and request lines RECONNECT IN (RCI) 145, LOW PRIORITY INTERRUPT REQUEST (LIRQ) 147, HIGH PRIORITY INTERRUPT REQUEST (HIRQ) 149 and RANK 151 (see FIG. 14).

The I/O bus 39 shown in FIG. 14 and FIG. 12 also includes a group of channel function lines 153, 157 and 159. See also FIG. 13. The TAG bus (T bus) 153 consists of four lines which serve as function lines, and there are three lines SERVICE OUT (SVO) 155, SERVICE IN (SVI) 157, and STOP IN (STI) 159 which serve as handshake lines as indicated by the legends in FIG. 14.

As shown in FIG. 14 and FIG. 12, the I/O bus 39 also includes a group of data lines 161, 163, 165, 167 and 169.

The DATA BUS lines 161 and PARITY 163 are bidirectional and serve as data lines and as indicated in FIG. 14, there are sixteen DATA BUS lines 161 and one PARITY line 163 in this group.

The lines END OF TRANSFER (EOT) 165, PAD OUT (PADO) 167 and PAD IN (PADI) 169 serve as data status lines, and indicate special conditions that may occur on the data lines 161 and 163 from time-to-time.

Finally, the I/O bus 39 includes a reset line (IORST) 171 as also shown in FIG. 14 and in FIG. 12.

Each T bus command illustrated in FIG. 18 requires some specific format on the data bus 161 while a T bus command is valid. This specific data bus format is illustrated for the T bus functions load Address and Command (LAC) and Read Device Status (RDST) shown in FIG. 18, for the preferred embodiment.

In the case of the T bus function LAC, the data or field transmitted on lines ∅ to 5 of the data bus 161 specify the operation to be performed; the field transmitted on lines 8 to 12 of the data bus specify the device controller 41 (or more precisely the port 43 of that device controller which is attached to the data bus 161) to which the command is addressed; and the field transmitted on data bus lines 13 to 15 specify which device attached to the device controller is to be operated on by that device controller 41 in response to this command.

In the case of the T bus function RDST, data bus bits ∅, 1, 2 and 3 indicate ownership error, interrupt pending, device busy, and parity error respectively. Bits 4 to 15 return device dependent status.

The functions on the T bus are transmitted in three sequences, shown in FIGS. 15, 16 and 17 and described in detail below.

Each T bus function is asserted by the channel and a handshake sequence is performed between the channel 109 and the device controller 41 using the handshake lines 155, 157 and 159 to acknowledge receipt of the T bus function. Control of the T bus and handshake is the function of the T bus machine 143 in FIG. 13.

Figure 28:
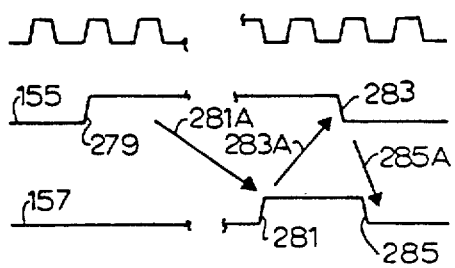
FIG. 28 is a timing diagram showing the operation of the two line handshake between the I/O channel 109 and the ports 43.

FIG. 28 is a timing diagram showing the operation of the handshake between the I/O channel 109 and the ports 43.

As illustrated in FIG. 28, line 155 terminates the service out signal (SVO) and line 157 transmits the service in signal (SVI).

The channel clock cycle is shown in vertical orientation with the SVO and SVI signals.

As illustrated in FIG. 28, the service in (SVI) signal is not synchronized with the channel clock and may be asserted at any time by the device controller in response to a service out signal from the I/O channel 109.

Before asserting service out (SVO), the channel 109 asserts the T bus function and, if required, the data bus.

The channel then asserts a service out signal as indicated by the vertical rise 279 in FIG. 28; and, SVO remains true until the device controller responds with service in (SVI) (218), acknowledging the channel command; SVI remains true until the channel drops SVO.

When the device controller 41 asserts the service in (SVI) signal, the channel 109 removes the service out (SVO) signal (as shown by the vertical drop 283 in FIG. 28) in a time period typically between one and two clock cycles; and in response, the device controller drops service in (SVI) as shown by the vertical drop 285 in FIG. 28.

When the device controller drops the service in (SVI) signal, the channel 109 is free to reassert a service out signal (SVO) for the next transfer; however, the channel will not reassert SVO until SVI has been dropped.

The arrows 281A, 283A and 285A in FIG. 28 indicate the responses to the actions 279, 281, 283 respectively.

The handshake is completed at the trailing edge of the vertical drop 285 as shown in FIG. 28.

On an output transfer, the interface data register 213 of the controller accepts the data at the leading edge of service out (vertical rise 279) and transfers the data to the control part of the device controller 187 at the trailing edge of the service out (the vertical drop 283).

On an input transfer the channel 109 accepts data from the service controller at the trailing edge of service out (the vertical drop 283).

Thus, a two line handshake is used to interlock transfer of information between the channel 109 and its device controller 41, since they act asynchronously.

This is the general handshake condition, indicated as handshake 2L in FIG. 15, 16 and 17.

In addition, two special handshake considerations occur, when appropriate.

First, channel commands used to select a device controller are not handshaken by SVI, since no single device controller is selected during this time.

These commands include (as shown in FIG. 18):
SEL—Select;
LAC—Load Address & Command;
HPOL—Hi Priority Interrupt Poll;
LPOL—Lo Priority Interrupt Poll; and
RPOL—Reconnect Interrupt Poll.

Also, commands used to terminate a sequence are not handshaken by SVI since they cause a selected device controller to deselect itself.

These commands include (as also shown in FIG. 18):
DSEL—De-Select;
ABTI—Abort Instruction (I/O); and
ABTD—Abort Data.

For all of the commands noted above which are not handshaken, the channel asserts SVO (155) for a given period of time (e.g., two clock cycles) and then the channel removes SVO. This type of handshake is referred to as Handshake I1L in FIGS. 15, 16 and 17.

Second, data transfer is handshaken normally except that when a device controller wishes to signal that it does not require further service, it returns stop-in (STI) instead of SVI. When SVO is next dropped by the channel, the port deselects itself. STI otherwise handshakes in the same manner as SVI.

As a further condition on all handshakes, when the channel prepares to assert SVO, it initiates a timer (part of T bus machine 143 in FIG. 13) which times out and posts an error if the next handshake cycle is not initiated and completed within the period of time set by the timer. If the timer times out, an error is posted at the appropriate point in the sequence, and either ABTI (EIO, IIO or HIIO sequence) or ABTD (reconnect sequence) is sent to the device controller 41 (see discussions of FIGS. 15, 16 and 17).

Figure 29:
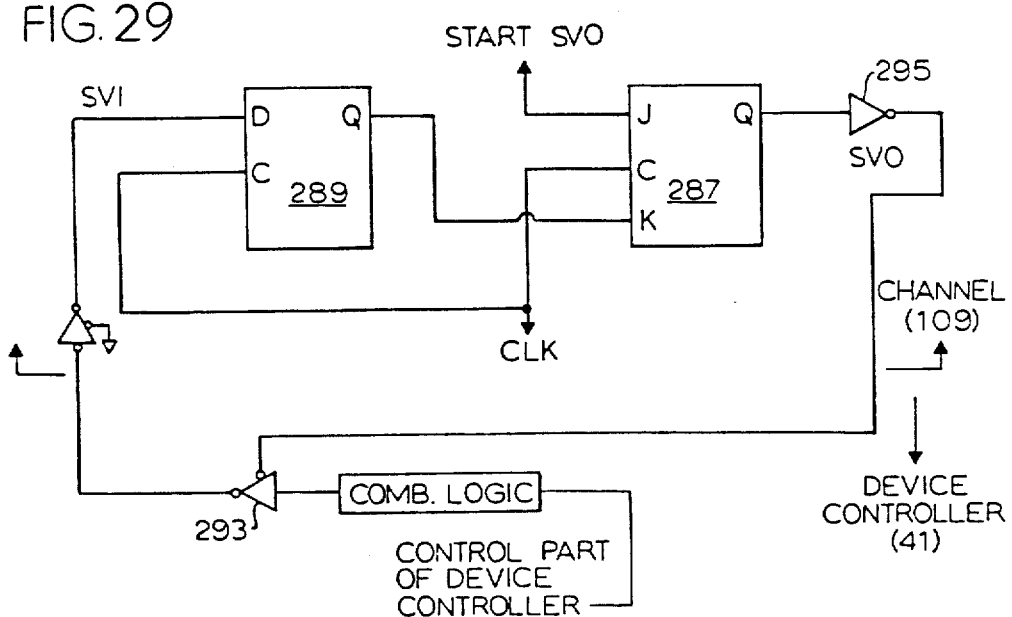
FIG. 29 is a logic diagram showing the logic for the general case of the handshake shown in FIG. 28. The logic shown in FIG. 29 is part of the T bus machine 143 of the input/output channel 109 shown in FIG. 13.

FIG. 29 shows the logic for the handshake shown in FIG. 28. The logic shown in FIG. 29 is part of the T bus machine 143 shown in FIG. 13. The logic shown in FIG. 29 is the logic which is effective for the general handshake condition noted above.

The logic shown in FIG. 29 includes a service out flip-flop 287 and a service in synchronization flip-flop 289. As illustrated by the dividing lines and legends in FIG. 29, the flip-flops 287 and 289 are physically located within the channel 109.

The device controller 41 includes combinational logic 291 and a transmitter 293 which transmits a service in signal (SVI) back to the D input of the flip-flop 289.

The functioning of the logic shown in FIG. 29 is as follows.

The channel 109 asserts service out by turning on the J input of the flip-flop 287; and when the next clock cycle starts, the service out signal is transmitted by a transmitter 295 to the device controller.

When the combination logic 291 in the device controller is ready it enables the transmitter 293 to return the service in signal (SVI) to the flip-flop 289. This completes the handshake.

Turning now to the dual port device controller, as illustrated in FIG. 19, each of the dual ports 43 in a device controller 41 is connected by a physical connection 179 to interface common logic 181 (shown in more detail in FIG. 21) and each of the ports 43 is also associated through a logical connection 183 to the interface common logic 181 as determined by an ownership latch 185.

As shown by the connecting line 180 in FIG. 19, the interface common logic 181 is associated with the control part 187 of the device controller 41. The control part 187 of the device controller includes a buffer 189.

The dual ports 43 shown in block diagram form in FIG. 19 (and in more detail in FIG. 23) are important parts of the multiprocessor system of the present invention because the dual ports provide the failsoft capability for the I/O system.

The ports 43 and related system components are structured in such a way that the two ports 43 of one device controller 41 are logically and physically independent of each other. As a result, no component part of one port 43 is also a component of the other port 43 of a particular device controller 41; and no single component failure (such as an integrated circuit failure) in one port can affect the operation of the other port.

Each port 43 functions to interface (as indicated by the legend in FIG. 19) a processor module 33 with a device controller, and ultimately with a particular device, through the device controller 41. The port 43 is the entity that communicates with the processor module and communicates with the control part of the device controller 187 (conditional on the state of the ownership latch 185).

That is, the port itself makes the connection to a processor module (dependent upon instructions received from the I/O channel 109 as discussed in more detail below) by setting its select bit 173.

Each of the individual ports 43 in a particular device controller 41 can be connected independently to a processor module 33 and at the same time as the other port in that device controller is connected to a different module. However, the ownership latch 185 establishes the logical connection between the control part of the device controller and one of the dual ports 43 so that only one port has control of the device controller at any one point in time.

The decode logic determines what function is being transmitted on the T bus 153 at any particular time.

The control logic combines T bus functions to perform specific port functions, for example, set select bit, clear select bit, read interrupt status.

The functioning of the control logic is illustrated in the logic equations set out in FIG. 27.

When a connection sequence (to be described later in reference to FIGS. 15, 16 and 17) is transmitted over the I/O bus 39, one of the ports 43 (and only the one port 43 in a device controller 41 attached to that I/O bus 39) connects (in a logical sense) to the bus 39 by setting its select bit 173.

This logical connection is determined by part of the data transmitted in that connection sequence. When connected, that particular port 43 subsequently responds to channel protocols in passing information between the channel and the control part of the device controller. The device address comparator 193 is the component part of the port 43 that determines the port's unique address.

The device address comparator 193 determines the unique address for a particular port 43 by comparing the device address field on the data bus 161 during a LAC T bus function, with device address jumpers associated with a particular port 43. When the address transmitted by the channel 109 matches the address determined by the jumpers on a particular port 43, the term ADD-COMP (see FIG. 27) is generated and the select bit 173 for that port is set (assuming that the other conditions set out in FIG. 27 allow the select bit to be set). The port 43 then responds to all T bus operations until the sequence terminates by clearing the select bit.

The abbreviations used in FIG. 27 include the following:
Add Comp—Address Compare (Device Address);
PARKOFF—Parity OK Flip-Flop;
SEL—Select;
OWN—Ownership; and
SELBIT—Select Bit.

The parity check register 177 is related to the parity generator and check logic 137 of FIG. 13 in that on output the parity generator logic 137 generates the parity to be checked by the parity checker 177 of the port 43, and this parity must check or the operation will be aborted by the I/O channel 109 of the processor module 33. On input, the interface common logic 181 generates parity to be checked by the channel parity check logic 137 in a similar fashion.

Figure 24:
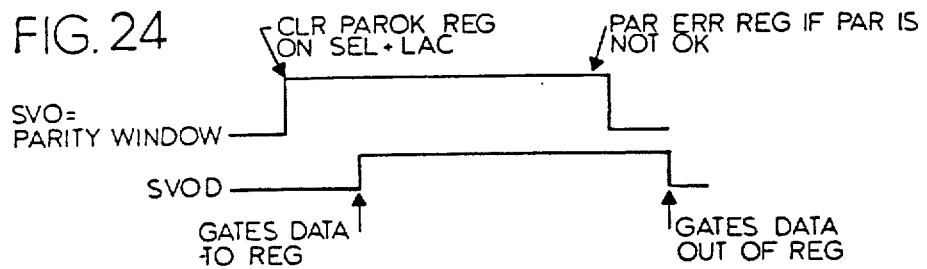
FIG. 24 is a timing diagram illustrating the relationship of SERVICE OUT (SVO) from the channel 109 to the loading of data into the port data register 213 (FIG. 21) and illustrates how the parity check is started before data is loaded into the register and is continued until after the data has been fully loaded into the register.

As shown in FIG. 24, the parity check is started before data is loaded into the register, and the parity check is continued until after the data has been fully loaded into the register. That is, the parity on the D bus is checked by the port parity register whenever the channel asserts SVO with an output T bus function, and the parity is monitored for the duration of SVO to insure that the data on the D bus is stable for the duration of SVO while the port transfers the data into the data register 213.

This parity check occurs on each transaction in a T bus sequence; and if a parity error occurred during any transaction in the sequence, the error is returned as a status bit in response to a T bus function during a sequence. For example, in an EIO sequence (FIG. 18 and 15) the P bit return for RDST indicates that the port determined a parity error during the EIO sequence.

As illustrated in FIG. 18, the parity error bit is a bit number 3 on the D bus in response to a RDST function on the T bus.

If a parity error occurs at some time other than during an EIO sequence, the parity error is reported during the read interrupt status (RIST) T bus function similar to the manner described above for the RDST T bus function.

The parity error is cleared at the beginning of an EIO, IIO, HIIO or reconnect sequence as shown in FIG. 24.

If a parity error is detected during any sequence it is recorded by the parity check register to be returned on the D bus in response to a RDST or RIST T bus function.

With continued reference to FIG. 20, the function of the enable latch 175 in the port 43 is to allow the I/O system to recover from a certain class of errors that would otherwise render inoperative both of the I/O buses 39 attached to a particular device controller 41. The enable latch 175 accomplishes this by not allowing the port 43 to place any signals on the I/O bus 39.

The enable latch 175 is cleared by a specific disable command. This is a load address and command (LAC) T bus function with a specific operation code transmitted on the D bus 161.

Once the enable latch 175 is cleared, this enable latch cannot be programmatically reset.

The port 43 includes a status multiplexer 195. The status multiplexer 195 returns the ownership error mentioned above if the device controller 41 is logically connected to the other port 43 of that device controller, to indicate that the device controller is owned by the other port and commands to this port will be ignored.

The port 43 includes an interface transceiver 197 for each input line (i.e., SVI, STI, Data Bus, Parity, PADI, RCI, LIRQ, HIRQ) of the I/O bus 39 shown in FIG. 14. The transceivers 197 transmit data from the port 43 to the I/O channel 109 when the port select bit 173 is set and the T bus function on the T bus 153 requires that the device controller 41 return information to the channel. The transceivers 197 pass information from the data bus 161 into the port 43 at all times.

It is a feature of the present invention that the power on circuit 182 acts in association with the transceivers 197 to control the behavior of the transceivers as the device controller 41 is powered up or powered down, in a way which prevents erroneous signals from being placed on the I/O bus while power is going up or down. This feature is particularly significant from the standpoint of on line maintenance.

As shown in FIG. 20, each transceiver 197 comprises a receiver 198 and a transmitter 200.

The transmitter is enabled by an enable line 202.

There are several terms which are on the enable line 202. These include the select bit 173, a required input function on the T bus, and a signal from the PON circuit 182.

The signal from the PON circuit, in a particular embodiment of the present invention, is connected in a "wire or" connection to the output of the gate which combines the other terms so that the output of the PON circuit overrides the other terms by pulling down the enable line 202. This insures that the transmitter 200 (in one specific embodiment, and 8T26A or 7438) is placed in a high impedance state until the PON circuit detects that the power is at a sufficient level that the integrated circuits will operate correctly. The PON circuit output stage is designed to take advantage of a property of the specific transceiver integrated circuit used. On this particular type IC if the driver enable line 202 is held below two diode drops above ground potential, the transmitter output transistors are forced into the off state regardless of the level of power applied to the integrated circuit. This ensures that the driver cannot drive the bus.

This particular combination of features provides a mode of operation wherein the output of the integrated circuit is controlled as power comes up or goes down, whereas normally the output of an integrated circuit is undefined when power drops below a certain level.

This same circuit is used on the X and Y buses of the interprocessor bus system to control the transceivers and control signals generated by the interprocessor control 55. As indicated in FIG. 30, each central processor unit (CPU) 105 has a PON circuit 182 which is similar to the PON circuit 182 in the device controller. The PON circuits therefore control the transmitters for all of the device controllers 41 and all of the interprocessor controls 55.

Details of the power-on (PON) circuit are shown in FIG. 25 where the circuit is indicated generally by the reference numeral 182.

The purpose of the PON circuit is to sense two different voltage levels of the five volt supply.

If power is failing, the circuit senses the point at which power drops below a certain level which renders the logic in the device controller or CPU an indeterminate state or condition. At this point the circuit supplies signals to protect the system against the logic which subsequently goes into an undefinable state.

The second voltage level which the PON circuit will sense is a value that is perceived when power is coming up. This second level at which power is sensed will be greater than the first level by roughly 100 millivolts to provide hysteresis for the system to eliminate any conditions of oscillation.

The PON circuit stays in a stable condition after it senses one of the voltage conditions until it senses the other voltage condition, at which point it changes state. The state at which the PON circuit is in at any particular time determines the voltage level at which the transition to the other state will be made.

The power on circuit 182 thus presents a signal establishing an indication that the power is within predetermined, acceptable operating limits for the device controller 41. If the power is not within those predetermined, acceptable operating limits, the signal output of the power-on circuit 182 is used to directly disable the appropriate bus signals of the device controller 41.

The output of the PON circuit 182 is a binary output. If the output is a one, the power is within satisfactory limits. If the output of the PON circuit is a zero, this is an indication that the power is below the acceptable limit.

The power-on circuit 183 shown in FIG. 25 and to be described in detail below is used with the device controller 41 and has seven output driver stages which are used in the application of the power-on circuit 182 to the device controller 41. However, the same power-on circuit 182 is also used with the CPU 105 and the bus controller 37, but in those applications the power-on circuit will have a lesser number of output driver stages.

As illustrated in FIG. 25, the PON circuit 182 comprises a current source 184 and a differential amplifier 186.

The differential amplifier 186 has, as one input, a temperature compensated reference voltage input on a line 188 and has a second input on a line 190 which is an indication of the voltage that is to be sensed by the power-on circuit.

The reference voltage on line 188 is established by a zener diode 192.

The differential amplifier 186 comprises a matched pair of transistors 194 and 196.

The voltage applied on the line 190 is determined by resistors 198, 200 and 202. The resistors 198, 200 and 202 are metal film resistors which provide a high degree of temperature stability in the PON circuit.

The outputs on lines 204 and 206 of the differential amplifier 186 are applied to a three transistor array (the transistors 208, 210 and 212), and this three transistor array in turn controls the main output control transistor 214.

The main output control transistor 214 drives all output drivers that are attached. For example, in the application of the PON circuit 182 for the device controller 41 (as illustrated in FIG. 25), the main output transistor 214 drives output stages 216 through 228. The output stage 216 is used to clear the logic, the output stages 218, 220 and 222 are used in combination with the interface devices of one port 43 of the device controller 41, and the output stages 224, 226 and 228 are used in combination with the interface device of the other port 43 of the device controller 41.

Finally, the PON circuit 182 includes a hysteresis control 230. The hysteresis control 230 includes resistors 232, 234 and a transistor 236.

In operation, assuming that operation is started from a power off state to a power on condition, the power is applied through the current source 182 to the differential amplifier 186 and to the main output control transistor 214. At this time the voltage on the line 190 is less than the voltage on the line 188 so the differential amplifier 186 holds the output of the main output control transistor 214 in the off state. This, in turn, will force the output stages 216 through 228 on.

This asserts the output of the PON circuit 182 in the zero state, the state indicating that power is not within acceptable limits.

As voltage rises, the input voltage on line 190 will increase until it equals the reference voltage on line 188. At this point the differential amplifier 186 drives the main output control transistor 214, turning it on. This removes the base drive from the output stages 216 through 228, forcing these output stages off. The output of the PON circuit 182 is then a one, indicating that the power is within acceptable limits.

At this point the hysteresis control circuit 230 comes into play. While power was coming on, the transistor 236 of the hysteresis control circuit 230 was on. When the transistor 236 is on, the resistance value of the resistor 202 appears to be less than the resistance value of this resistor 202 is when the transistor 236 is off.

The point at which the main output control transistor 214 turns on is the point at which the hysteresis transistor 236 turns off. Turning off the hysteresis transistor 236 causes a slight voltage jump in the line 190 which further latches the differential amplifier 186 into the condition where the differential amplifier 186 sustains the main output transistor 214 in the on state.

The state of the PON circuit will remain stable in this condition with the main output control transistor 214 on and the output drivers 216 through 228 off until the plus five volts drops below a lower threshold point, as determined by the voltage applied on the line 190.

As the voltage on the line 190 decreases below the reference voltage on the line 188, (because the five volts supply is going down in a power failure condition), then the differential amplifier 186 turns off the main output control transistor 214. This, in turn, turns on the output driver stages 216 through 228.

Since the hysteresis transistor 236 was off as power dropped, the voltage applied to the input of the PON circuit 182 must drop somewhat farther than the point at which the PON circuit 182 sensed that power was within the acceptable limits during the power-up phase of operation.

This differential or hysteresis is used to inhibit any noise on the five volt power supply from causing any oscillation in the circuit that would erroneously indicate that power is failing.

The PON circuit 182 shown in FIG. 25 provides very accurate sensing of the two voltages used by the PON circuit to determine its state (whether a one or a zero output of the PON circuit).

In order to sense these two voltages very accurately the PON circuit must have the capability of compensating for initial tolerances of the different components and also the capability to compensate for changes in temperature during operation. In the PON circuit 182, the zener diode 192 is the only critical part that must be compensated for because of its initial tolerance, and this compensation is provided by selecting the resistor 198.

Temperature compensation is achieved because the zener diode 192 is an active zener diode and is not a passive zener diode. Effective temperature compensation is also achieved because the two transistors in the differential amplifier 186 are a matched pair of transistors and the resistors 198, 200 and 202 are metal film resistors.

Each port 43 includes a number of lines which are indicated by the general reference numeral 179 in FIG. 20 and FIG. 19. This group of lines 179 includes the individual lines 201 (sixteen (16) of which make up the Input Bus - I Bus), device address lines 203, Output Bus lines 205 (of which there are sixteen), a take ownership line 207 and general lines 209 which transmit such signals as parity, the T bus, and other similar lines which are required because of the particular hardware implementation.

These particular lines 201, 203, 205, 207 and 209 correspond to the lines with the same numbers in FIG. 21, which is the block diagram of the interface common logic. However, there are two sets of each of these lines in FIG. 21 because the interface common logic 181 is associated with each of the dual ports 43 in a device controller 41.

With references to FIG. 21, the interface common logic 181 includes the ownership latch 185 (see also FIG. 19). This ownership latch determines the logical connection between the interface common logic 181 and a port 43 from which TAKE OWNERSHIP signal has been received over the line 207.

As noted above, the TAKE OWNERSHIP signal is derived by the port hardware from a load address and command (LAC) T bus command (see FIG. 18) with a particular operation code in the command field on the D bus. When the port receives the function LAC on the T bus from the channel, the port logic examines the command field (the top six bits) on the D bus. Then, if the command field contains a code specifying a take ownership command, the port hardware issues a signal to set the ownership latch to connect the port to the interface common logic and thence to the control part of the device controller. If the command field specifies a kill command, the port hardware issues a signal to clear the port's enable latch. This operation happens only if the device address field on the D bus matches the port's device address jumpers, and no parity error is detected during the command. That is, no commands (including the take ownership, kill, etc.) are executed if a parity error is detected on the LAC.

As a consequence, the I/O channel 109 issuing the Take Ownership command gains control of the device controller 41, and the other port 43 is logically disconnected. Take Ownership may also cause a hard clear of the controller's internal state.

The state of the ownership latch 185 determines which port may pass information through the multiplexer 211. Once the ownership latch 185 is set in a given direction, it stays in that state until a Take Ownership command is received by the other port. Assertion of the I/O reset line (IORST) will also cause ownership to be given to the other port after the internal state of the device controller has been cleared.

Control signals are chosen by the state of the ownership register 185 and from the appropriate one of the ports 43 and are transmitted by the multiplexer 211 to the control part 187 of a device controller on a set of control lines 215. Data is selected from an appropriate one of the ports 43 on lines 205 and are loaded into the data register 213 and presented to the controller on an Output Bus (O bus) 217.

Some of the control lines 215 (the lines 215A) are used to control the multiplexer 220 in selecting information from the controller as transmitted on lines 219, to be returned by the input bus (I bus) 201 to the ports 43 (FIG. 20) and then to the channel 109 of a processor module 33. A line 221 returns the device address from the appropriate port 43 to the I bus 201 and thence to the I/O channel 109.

Figure 22:
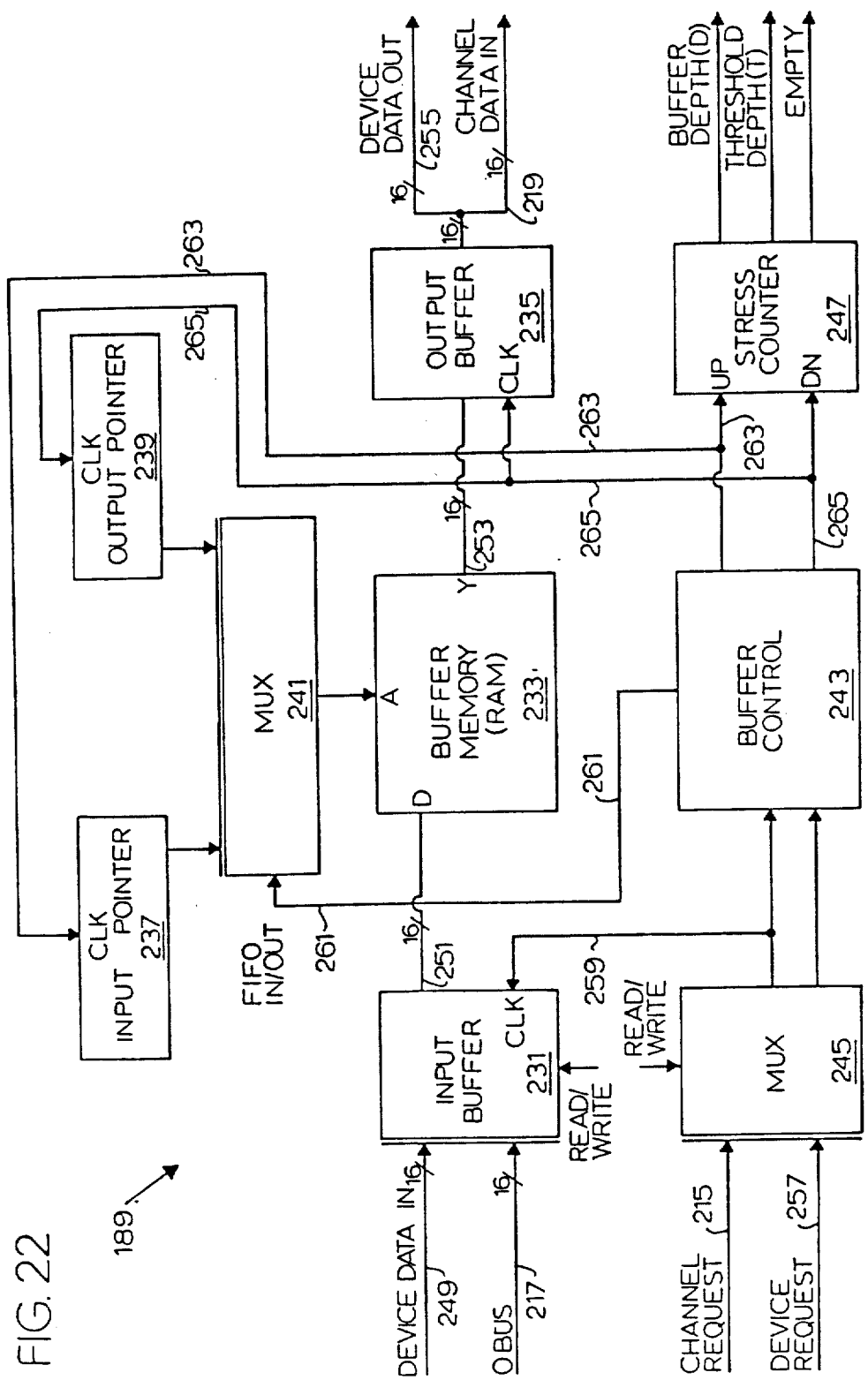
FIG. 22 is a block diagram showing the component parts of a data buffer 189 in the control part of a device controller 41 as illustrated in FIG. 19.

The data buffer 189 shown in FIG. 19 is illustrated in more detail in FIG. 22.

In accordance with the present invention many of the device controllers 41 incorporate a multi-word buffer for receiving information at a relatively slow rate from a peripheral device and then transmitting that information at or near memory speed to the processor module to maximize channel bandwidth utilization.

In the buffer design itself it is important that the device controllers 41 be able to cooperate with each other in gaining access to the channel 109 to avoid error conditions. In order for the device controllers 41 to cooperate properly, the multiword buffers 189 are constructed to follow certain guidelines.

These guidelines include the following:

First of all, when a device controller makes a reconnect request for the channel 109 it must have enough buffer depth left so that all higher priority device controllers 41 and one lower priority device controller 41 may be services and the reconnect latency of the reconnect request can occur without exhausting the remaining depth of the buffer. This is called Buffer Threshold, abbreviated T in FIG. 23.

Secondly, after the buffer has been serviced, it must wait long enough to permit all lower priority device controllers 41 to be serviced before making another reconnect request. This is called Holdoff. The buffer depth (D in FIG. 23) is the sum of the holdoff depth plus the threshold depth.

The holdoff and threshold depths are a function of a number of variables. These include the device rate, the channel rate, the memory speed, the reconnect time, the number of controllers of higher priority on that I/O bus, the number of controllers of lower priority on that I/O bus, and the maximum burst length permissible.

A controller at high priority on an I/O bus has more controllers of lower priority associated with it on the same I/O bus than another controller at lower priority on the same I/O bus, and therefore the higher priority controller requires more holdoff depth than the lower priority controller. Similarly, a controller at low priority on an I/O bus requires more threshold depth than a controller at higher priority. The buffer 189 in a controller is constructed to take advantage of the fact that as holdoff requirement increases the threshold requirement decreases, and as the threshold requirement increases the holdoff requirement decreases. This is accomplished by making the stress at which a reconnect request is made by variable, the actual setting depending on the characteristics of the controllers at higher and lower priority in a particular I/O channel configuration. The buffer depth is therefore the maximum of the worst-case threshold depth or worst-case holdoff depth requirement, rather than the sum of the worst-case threshold depth and worst-case holdoff depth. This allows the buffer depth to be minimized, and shortens the time required to fill or empty the buffer.

Figure 23:
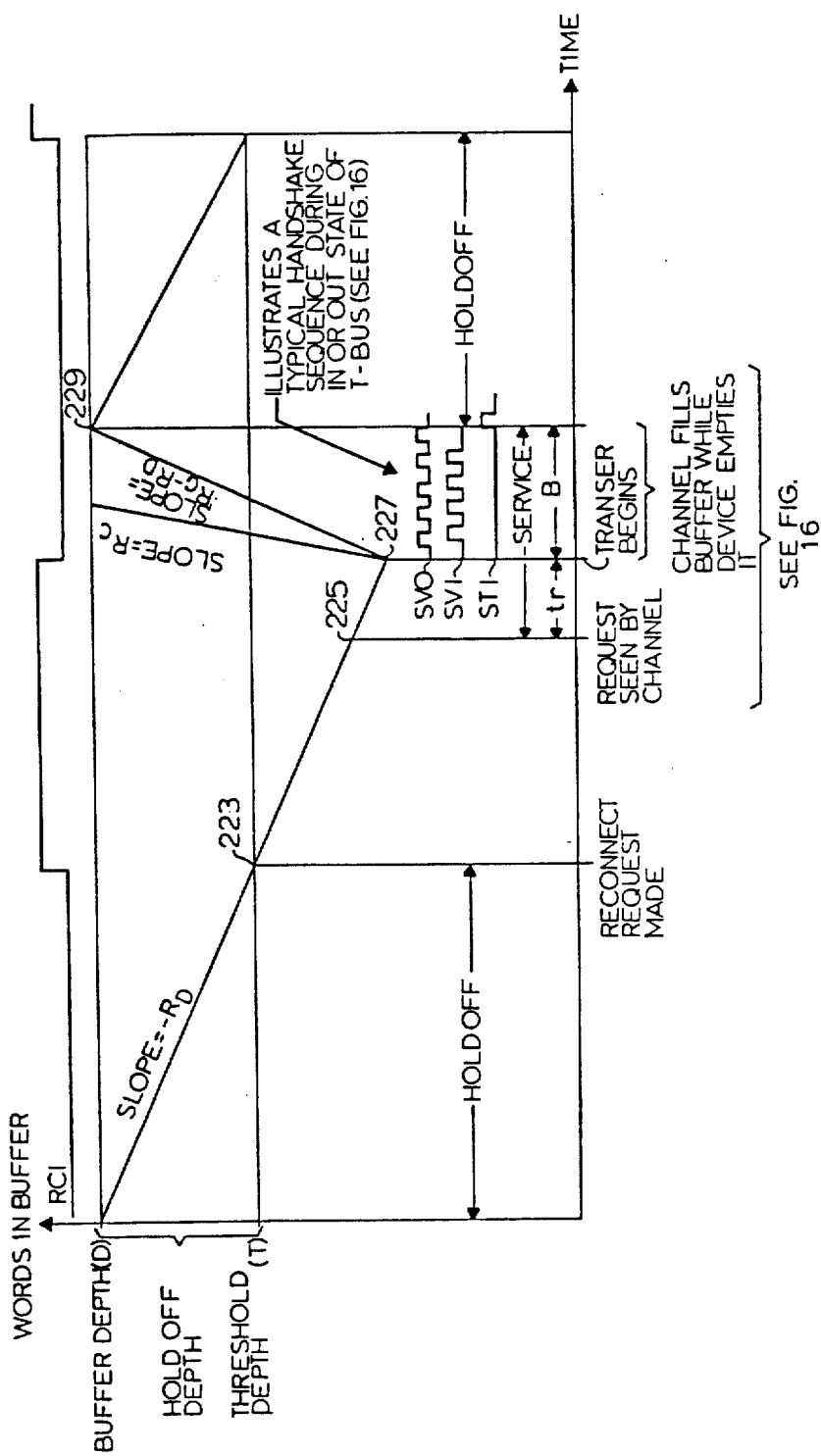
FIG. 23 is a graph illustrating the operation of the data buffer 189 illustrated in FIGS. 22 and FIG. 19.

A number of these parameters are graphically illustrated in FIG. 23. In FIG. 23 time has been plotted on the horizontal axis versus words in the buffer on the vertical axis for an output operation.

Starting at point D on the upper left hand part of FIG. 23 (and assuming a buffer filled to the full buffer depth), data is transferred to a device at a rate indicated by the line of slope $-R_D$ and this data transfer continues without any reconnect signal being generated until the buffer depth decreases to the threshold depth as indicated by the intersection of the line of slope $-R_D$ with the threshold depth line T at point 223.

At this point the reconnect request is made to the channel 109 as indicated by the legend on the horizontal axis in FIG. 23.

The transfer of data continues from the buffer at the rate indicated by the line of slope $-R_D$ and the request is held off by higher priority device controllers 41 until point 225 at which point eh request is honored by the channel 109, and the I/O channel begins its reconnect sequence for this device controller.

At point 227 the first data word has been transmitted by the channel 109 to the device controller buffer 189, and the channel 109 then transfers data words at a rate indicated by the line of slope 31 $R_C$ into the buffer 189.

At the same time the device controller 41 continues to transfer data words out of the buffer at the rate $-R_D$ so that the overall rate of input to the buffer 189 is indicated by the line of slope $R_C-R_D$ until the buffer is again filled at the point 229. At 229 the buffer is full, and the device controller disconnects from the channel 109, and the data transfer continues at the rate indicated by the slope line $-R_C$.

The notation $t_r$ in FIG. 23 indicates the time required for the polling and selection of this device controller and the transfer of the first word. This will be discussed again below in relation to FIG. 16.

The letter B in FIG. 23 indicates the burst time. The burst time is a dynamic parameter. The length of any particular burst is dependent upon the device transfer rate, the channel transfer rate, the number of devices with transfers in progress and the channel reconnect time. The maximum time permitted for a burst is chosen to minimize the amount of buffer depth required while accommodating high device transfer rates and also the number of devices that can transfer concurrently.

FIG. 22 is a block diagram of a particular embodiment of a buffer 189 constructed in accordance with the present invention to accomplish the holdoff and threshold requirements illustrated in FIG. 23.

The buffer 189 shown in FIG. 22 comprises an input buffer 231, a buffer memory 233, an output buffer 235, an input pointer 237, an output pointer 239, a multiplexer 241, buffer control logic 243 (described in more detail in FIG. 26), a multiplexer 245 connected to the buffer control logic 243 and a stress counter 247.

As also illustrated in FIG. 22, two groups of data input lines (lines 217 and 249) are fed into the input buffer 231.

One group of data input lines include sixteen device data input lines 249.

The other group of input lines include sixteen Output Bus lines (0 bus lines) 217.

One or the other of these two groups of input signals is then fed from the input buffer 231 to the buffer memory 233 by a group of lines 251. There are sixteen of the lines 251.

Data is taken from the buffer memory 233 and put into the output buffer 235 by a group of lines 253. There are sixteen of the lines 253.

The output buffer 335 transmits the data back to the interface common logic 181 (see FIG. 19 and FIG. 21) on a group of sixteen lines 219 and to the devices 45, 47 (such as 49, 51, 53 shown in FIG. 1) on a group of sixteen lines 255 as indicated by the legends in FIG. 22.

The input and output pointers 237 and 239 function with the multiplexer 241 as follows.

When data is being transferred from the input buffer 231 to the buffer memory 233, the input pointer 237 is connected to the buffer memory 233 through the multiplexer 241 to determine the location into which the word is written.

When data is being transferred out of the buffer memory 233 into the output buffer 235, the output pointer 239 is connected to the buffer memory 233 through the multiplexer 241 to determine the location from which the word is taken.

The purpose of the buffer control logic 243 illustrated in FIG. 22 and FIG. 26 is to keep track of the stress placed on the buffer 189. In this regard, the degree of the full or empty condition of the buffer in combination with the direction of the transfer with respect to the processor module (whether input or output) determines the degree of stress. Stress increases as the device accesses the buffer and decreases as the channel accesses the buffer.

In the implementation shown in FIGS. 22 and 26 the stress counter measures increasing stress from 0–15 on an input, and decreasing stress from 0–15 on an output.

Another implementation (not shown in the drawings) would add the direction of transfer in the buffer control logic such that two new lines would access the pointers 237 and 239 and the stress counter would always measure increasing stress.

With continued reference to FIG. 22, a channel request line 215 (see also FIG. 21) and a device request line 257 (coming from the control part 187 of the device controller) are asserted to indicate access to the buffer 189.

The multiplexer 245 chooses one of these lines as a request to increase the buffer fullness and chooses the other line as a request to decrease the buffer fullness based on the direction of the transfer (whether input or output) with respect to the processor module.

The line chosen to increase buffer fullness is also used to load data from the appropriate data lines 249 or 217 (see FIG. 22) into the input buffer 231 by means of the line 259.

The channel and the device may access the buffer 189 at the same time, and the buffer control logic 243 services one request at a time. The buffer control logic 243 chooses one of the lines for service and holds the other line off until the buffer control logic 243 has services the first request, then it services the other request.

The servicing of a request by the buffer control logic 243 includes the following.

First of all, it determines the direction of transfer (into or out of) the buffer memory 233, and it asserts line 261 (connected to the multiplexer 241) as appropriate to select the input pointer 237 or the output pointer 239 through the multiplexer 241.

Secondly, on an output request, the buffer control logic 243 asserts line 263 which does three things.

(A) It writes the word from the input buffer 231 into the buffer memory 233 at the location determined by the input pointer 237 and the multiplexer 241.

(B) It increments the stress counter 247.

(C) The buffer control logic 243 increments the input pointer 237.

Thirdly, on an output transfer, the buffer control logic 243 asserts line 265 which accomplishes the following three operations.

(A) The buffer control logic 243 writes the word being read from the buffer memory 233 as determined by the output pointer 239 and multiplexer 241 into the output buffer 235.

(B) The buffer control logic 243 decrements the stress counter 247.

(C) The buffer control logic 243 increments the output pointer 239.

The stress counter 247 determines when the buffer 189 is full (D), or at threshold depth (T) as shown by the output line legends in FIG. 22.

The output of the stress counter is decoded, and any one of the decoded values may be used to specify that the buffer is at threshold depth. In the preferred embodiment, wire jumpers are used to select one of sixteen possible stress values, and a reconnect request is made to the channel 109 when the stress on the buffer 189 reaches that value.

The control part 187 of the device controller uses these three signals (which correspond to the legends in FIG. 23) to make reconnect requests and disconnect requests on respective lines 145 (see FIG. 14 and FIG. 12) and 159 (see FIG. 14 and FIG. 12).

The STI (stop in) signal transmitted on line 159 shown in FIG. 14 and FIG. 12 is related to the buffer depth (D), the full or empty conditions of the buffer and the direction of transfer; and the RCI (reconnect in) signal on line 145 of FIG. 14 and FIG. 12 is related to the threshold depth (T) indication from the stress counter 247 in FIG. 22. Thus, the STI signal is asserted when the buffer 189 reaches a condition of minimum stress (full on output and empty on input). The STI signal signals the channels 109 that the controller 41 wishes to terminate the burst data transfer. When the buffer passes through its threshold, it asserts the RCI signal on line 145 to indicate to the channel 109 that the buffer wishes to transfer a burst of data.

FIG. 26 shows details of the multiplexer 245, the buffer control logic 243 and the stress counter 247 of the buffer 189 shown in FIG. 22.

In FIG. 26 the multiplexer 245 is shown as two sets of gates 245A and 245B, request flip-flops 267A and 267B, a clock flip-flop 269, request synchronization flip-flops 271A and 271B, a priority resolving gate 273 and request execution gates 275A and 275B The stress counter 247 comprises a counter section 247A and a decoder section 247B as indicated by the legends in FIG. 26.

As illustrated in FIG. 26, the two sets of gates 245A and 245B have used the channel request signal (line 215) and the device request signal (line 257) and the read and write signals to determine which of the channel or the device is putting data onto the buffer 189 and which is taking data out of the buffer 189.

The request flip-flops 267A and 267B store the requests until the control logic has services the request.

The clock flip-flop 269 generates a two phase clock used by the request synchronization flip-flops 271A and 271B and the request execution gates 275A and 275B.

The request synchronization flip-flops 271A and 271B synchronize the request to the clock generation flip-flop 269 and stabilize the request for execution.

The priority resolving gate 273 picks one of the requests for execution and causes the other request to be held off.

The request execution gates 275A and 275B execute the requests in dependence on the synchronized request.

Each output signal on the lines 263 and 265 performs the functions described above (incrementing and decrementing the stress counter, updating the buffer memory or output buffer, and updating the input pointer or output pointer).

In addition, each signal clears the appropriate request flip-flop through the lines 277A and 277B illustrated in FIG. 26.

As noted above, FIGS. 15, 16 and 17 show the three sequences of operation of the I/O system.

In the operation of the I/O system, the normal data transfer between a processor module 33 and a particular device, such as a disc 45, includes an EIO sequence to initiate the transfer.

The EIO instruction selects the particular device controller and device and specifies the operation to be performed.

The device controller 41 initiates the I/O between the device controller 41 and the particular device.

The device controller 41 periodically reconnects to the channel 109 and transfers data between the device controller 41 and the channel 109. The periodic reconnection may be for the purpose of either transferring data from the channel to the device or for the purpose of transferring data from the device to the channel.

When the transfer of data is complete the device controller 41 interrupts the CPU 105, which responds by issuing an IIO or an HIIO sequence.

The IIO sequence determines the identity of the interrupting device and conditions under which the transfer completed.

The HIIO sequence is similar to the IIO sequence but is issued in response to a high priority I/O interrupt.

The "Execute I/O" CPU instruction (EIO) is defined by the T bus state changes shown in FIG. 15.

The first state shown in FIG. 15 (the state farthest to the left) is the no-operation (NOP) or idle state. The other states are the same as those listed in FIG. 18 by the corresponding mnemonics—load address and command (LAC), load parameter (LPRM), read device status (RDST), deselect (DSEL) and abort instruction (ABTI).

As in the state changes shown in FIGS. 6, 7 and 8, the solid line arrows indicate a state change, and a dashed line arrow indicates a condition which must occur before a state change can occur.

The EIO instruction and execution shown in FIG. 15 is directly under control of the microprocessor 113 (see FIG. 12) of the CPU 105.

This CPU initiation is shown as transmitted to the state machine in FIG. 15 by the line 117; the initiation signal is accepted only when the T bus is in the idle state.

Once the CPU initiation signal is applied the T bus goes from the NOP (idle) state to the LAC state.

In the LAC state or function a word is taken from the top of the register stack 112 in the CPU 105 (see FIG. 12) and is put on the D bus 161 (see FIG. 14).

As described above, this word is used to select a particular device controller 41 and a particular peripheral device 45, 47, 49, 51 or 53 (see FIG. 1), and the word is also used to specify the operation to be performed.

In the next T bus cycle the T bus goes to the LPRM state.

In the load parameter state (LPRM) the word just below the top of the register stack in the CPU 105 (see FIG. 12) is put on the T bus 161 (see FIG. 14) by the I/O channel 109 and is passed to the device controller 41 selected during the previous LAC state.

At the conclusion of the handshake cycle, as shown by the dashed line arrow in FIG. 15, the T bus goes to the RDST state. In this state the device controller 41 returns the device status (the status of a particular device selected and comprising the set of signals describing the state of that device) from the device controller 41 and places it on the top of the register stack 112 in the CPU 105.

During the load parameter and read device status state several errors may have occurred. These include parity error, handshake time out, and an error indication in the status word. If an error did occur, then the T bus machine 143 (FIG. 13) goes from the RDST state to the abort instruction (ABTI) state.

The ABTI state instructs the device controller 41 to ignore the previous LAC and LPRM information passed to it by the I/O channel 109 and then the T bus (channel) returns to the NOP (idle) state.

If, after the RDST state no error was detected, (as shown by the dashed line arrow 114 in the top branch of FIG. 15), the T bus goes to the deselect state (DSEL).

With the T bus in the deselect state, the device controller 41 clears its select latch 173 and responds to the instruction issued to its (passed to it during the LAC state) and the T bus returns to the NOP (idle) state.

In the operation of the I/O system there are a number of device request signals that can happen asynchronously. For example, a reconnect signal may be generated after an EIO sequence to request that the channel transfer data to the controller. Or the device controller 41 may assert an interrupt request line under a number of different conditions, e.g. to signal the completion of an EIO sequence or to report an unusual condition in a peripheral device.

The device request lines are common to all device controller ports 43 attached to a particular I/O bus 39.

The channel 109 responds to reconnect requests made on the line RCI (145 of FIG. 14), and the CPU 105 responds to requests made on the LIRQ line 147 (see also FIG. 14) with an IIO sequence, and to a request made on the HIRQ line 149 with an HIIO sequence.

The first thing that the channel 109 or CPU 105 does in response to a Device Request signal is to determine the identity of the highest priority device controller 41 asserting a request. That is, there may be several device controllers 41 asserting a request to the channel 109 at one time, and the channel will select a particular device controller in accordance with a predetermined priority scheme.

In a particular embodiment of the present invention up to thirty-two device controllers 41 can be connected to a single channel 109.

The thirty-two device controllers are connected in a star poll using the sixteen bit data bus 161. One additional line 151 is used to divide the thirty-two device controllers into two groups of sixteen each. One group of sixteen device controllers is assigned priority over the other group; and priority is also assigned among the sixteen within each group. The device responding on bit zero of the D bus during a polling sequence has the highest priority within a rank, and the one responding on bit 15 has the lowest priority.

In initial introduction, it may be noted that polling (which will now be described) involves the state description shown in FIG. 16 and 17 up to and including that handshake which occurs during the select (SEL) state in each figure.

With continued general reference to FIGS. 16 and 17, the channel 109 sets the rank line to zero and then presents the T bus function RPOL (FIG. 16) if the response is to a reconnect request, while the CPU 105 presents an LPOL (FIG. 17) T bus function if the CPU is responding with an IIO sequence, or an HPOL T bus function if the CPU is responding with an HIIO sequence. This is the only major point of difference between the showings in FIG. 16 (the channel response) and FIG. 17 (the CPU response) with regard to polling.

Referring specifically to FIG. 16 and the response of the channel 109 to assertion of the RCI line 145 (see FIG. 14), all devices with a reconnect request pending that would respond on rank zero place a one bit response on the D bus. That is, all these devices assert a line of the D bus 161 corresponding to their priority within the rank.

The channel 109 transfers the D bus response into the priority resolve register 135 (see FIG. 13). This priority resolve register 135 output determines which device controller has the highest priority (in accordance with the scheme described above) and asserts the appropriate bit back onto the D bus 161, if there is a bit asserted in rank zero by the attached device controllers.

If there are one or more devices asserting a response to the priority resolve register on rank zero, the output of the priority resolve register is presented to all device controllers attached, along with the select function (SEL) on the T bus, and the device controller whose priority on rank zero matches the output of the priority resolve register sets it select bit 173 (see FIG. 19), and then that port will respond to subsequent states in the sequence. This is the mode of operation indicated by the solid line arrow going from the state indicated by RPOL with a rank equals zero to select (SEL).

If the priority resolving register 135 determines that no device responded when the rank line equalled zero, then the channel 109 sets the rank line to one and reissues the RPOL T bus command. Then, if the priority resolving register determines that a response occurred on rank 1, the channel asserts the T bus select function as before.

However, if the priority resolving register 135 determines that no response was made on rank 1, the channel returns to the idle state indicated by state NOP in FIG. 16.

This latter event is an example of a failure which might occur in one port 43 and which would result in the system 31 accessing that particular device controller 41 through the other port 43.

As noted above, the action of the priority resolving register 135 in response to an IIO or an HIIO sequence initiated by the CPU 105 is the same as the response of the priority resolving register 135 to a reconnect sequence initiated by the channel in response to a reconnect in on the line 145 from a device controller 41.

With continued reference to FIG. 16, the reconnect sequence begins with the poll sequence described above for reconnecting the highest priority device controller 41 making a request.

The next step in the reconnect sequence is to determine the actual device controller number contained in the device address comparator 193. As noted above, the device address comparator 193 includes jumpers to determine a physical device controller number. These are the same jumpers that are used on a LAC T bus function during an EIO sequence to determine a particular port. In the reconnect sequence the address determined by these jumpers is returned to the I/O channel via the D bus during the T bus RAC state to access a table defining the buffer area for this device.

It is also necessary to determine the direction of the transfer (whether an input or output transfer to the processor module). To accomplish this determination of the direction of the requested transfer and the device address, the channel asserts the RAC T bus function and the device controller 41 returns the device controller address and the transfer direction.

The channel uses the device address returned by the device controller 41 to access a two word entry (142) in an I/O control table (IOC) 140 (FIG. 12) which defines a buffer area 138 in the memory 107 for this particular device controller and device.

The format of a two word entry 142 is shown enlarged in FIG. 12 to show details of the fields of the two words.

There is a two word entry 142 in the IOC table 140 for each of the eight possible devices of each of the thirty-two possible device controllers 41 attached to an I/O bus 39 associated with a particular processor module 33, and each processor module 33 has its own IOC table.

Each two word entry describes the buffer location in main memory and remaining length to be transferred at any particular time for a particular data transfer to a particular device. Thus, as indicated by the legends in FIG. 12, the upper word specifies the transfer address to or from which the transfer will be made by a burst; and the lower word specifies the byte count specifying the remaining length of the buffer area and the status of the transfer.

The fields representing the status of the transfer include a protect bit P and a channel error field CH ERR. The channel error field comprises three bits which can be set to indicate any one of up to seven numbered errors.

The transfer address and byte count are updated in the IOC table 140 at the conclusion of each reconnect and data transfer sequence (burst). The transfer address is counted up and the bye count is counted down at the conclusion of each burst. The amount reflects the number of bytes transferred during the burst.

The second word also contains (1) a field in which any error encountered during a reconnect and data transfer sequence may be posted for later analysis, and (2) a protect bit to specify that the buffer area in memory 107 may be read from but not written into.

The protect bit serves to protect the processor memory 107 from a failure in the device controller 41. That is, when the device controller 41 returned the transfer direction to the channel 109 during a read address and command (RAC) T bus function, a failure in the device controller 41 could cause the device controller to erroneously specify an input transfer. Then the channel would go to the IN state and transfer data from the device controller into memory, thus causing data in the buffer 138 to be lost. The protect bit allows the program to specify that the channel may not write into this buffer area; that is, the device may only specify an output transfer.

The transfer address specifies the logical path 139B (see FIG. 12).

The channel places the transfer address in the channel memory address register 129 (see FIG. 13) and places the byte count in the character count register 131 (see FIG. 13).

Depending upon the direction of the transfer, (which the channel retrieved from the device during the RAC state shown in FIG. 16), the channel puts the T bus in either the IN State or OUT state and transfers data between the device controller 41 and memory 107 using the channel memory address register 129 to specify the logical path 139C (see FIG. 12). The channel memory address register 129 and character count register 131 are updated with each word transferred during the burst to reflect the next address in the buffer and the number of characters yet to be transferred. At the conclusion of a burst the contents of the channel memory address register 129 and of the character count register 131 are written into the IOC table 140.

In operation, for each word transferred in from the device on an in transfer, the channel 109 accepts the word by the handshake mechanism described above and places the word in the I/O data register 127 (see FIG. 13) and then transfers the word to the buffer area in memory defined by the logical path 139C (see FIG. 12).

On an out transfer the channel 109 takes a word from the buffer area over logical path 139C and transfers the word to the channel memory data register 125. The channel then transfers the word into the I/O data register 127 (FIG. 13) and handshakes with the device controller which accepts the word into its interface data register 213.

The high speed of the I/O channel is accomplished by pipelining where the word in the I/O data register 127 is handshaken to the device while the channel concurrently requests and accepts the next word in the transfer from memory 107 and places it in the channel memory data register 125. Since it takes just as long to put a word out to the device as it does to accept a word from memory for the device, the two operations can be overlapped.

During the burst, the channel decremented the character count register by two for every word transferred, since there are two bytes in every word.

The burst transfer can terminate in two ways. The burst transfer can terminate normally or the burst transfer can terminate with an error condition.

In the normal case there are two possibilities.

In a first condition of operation, the character count register 131 can reach a count of either one or two bytes remaining to be transferred. In this situation the channel puts up EOT (line 165 as shown in FIG. 14) signifying that the end of transfer has been reached. If the count reaches one, then the channel asserts EOT and PAD OUT (line 167 of FIG. 14) signifying the end of transfer with an odd byte.

If the character count reaches two, the channel puts up EOT, but PAD OUT (PADO on line 167 of FIG. 14) is not required because both bytes on the bus are valid.

In either case, the device controller 41 responds by asserting STOP IN (STI) on line 159 (see FIG. 14), and the device controller 41 also asserts PAD IN (PADI) on line 169 (FIG. 14) if the channel asserted PAD OUT (PADO).

In this first case of normal termination, the transfer as a whole, not just the burst, is terminated by the channel 109.

The other normal completion is when the device controller 41 ends the burst by asserting STOP IN (STI) in response to the channel SERVICE OUT (SVO). This signifies that the buffer 189 (see FIG. 19) has reached a condition of minimum stress (as indicated by [point 229 in FIG. 23).

The STOP IN (STI) can occur on an output transfer or on an input transfer.

On an input transfer, if the device controller 41 wishes to terminate the transfer as well as the burst, the device controller 41 can assert STOP IN (STI); and, to signify an odd byte on the last word, the device controller 41 can also assert PAD IN (PADI).

As shown in FIG. 16, when the transfer is terminated by a non-error condition (STI OR EOT) on either an output transfer or an input transfer (as shown by the balloons OUT and IN in FIG. 16), the channel 109 updates the IOC table entries as noted above, and returns to the idle (NOP) state shown in FIG. 16.

As noted above, the transfer can also be terminated by an error condition.

During the burst several errors may occur as follows.

First, the device controller 41 may request an input transfer into a buffer whose protect bit P is set in the IOC table as mentioned above.

Second, the device controller 41 may not return a PAD IN (PADI) signal in response to a PAD OUT (PADO) signal from the channel 109.

Third, the channel 109 may detect a parity error on the D bus 161.

Fourth, the device controller 41 may not respond to a SERVICE OUT (SVO) signal from the channel 109 within the allotted time as mentioned above in the discussion on handshakes.

Fifth, the buffer area specified by the IOC table entries may cross into a page whose map marks it absent (see the discussion of the mapping scheme in the memory system).

Sixth, a parity error may be detected in accessing the map while accessing the memory during the reconnect in and data transfer sequence. See the description in the memory system relating to the parity error check.

Seventh, the memory system may detect an uncorrectable parity error when the channel 109 accesses the memory. See the description of the memory system for this parity error check.

If any of these error conditions occur, the channel 109 goes to the abort data transfer state (ABTD) as shown in FIG. 16. This instructs the device controller 41 that an error has occurred and that the data transfer should be aborted. The channel 109 then goes back to the idle state which is (NOP) as shown in FIG. 16.

When an error occurs, the channel 109 updates the IOC table entries and puts an error number indicating one of the sever errors noted above in the error field of the second word of the IOC table entry as mentioned above.

Thus, if a single error occurs, the number of that error is entered in the error field of the IOC table entry.

If more than one error occurs, the channel 109 selects the error from which recovery is least likely to occur and enter only the number of that error in the error field of the IOC table entry.

There is one other type of error that can occur. The device controller 41 may try to reconnect to the channel when the count word in the IOC table is zero. In this event, the channel will not let the device controller reconnect and the channel goes through the sequence as described above with reference to FIG. 16, but when the channel determines that the count word in the IOC table is zero, the channel 109 goes directly to the abort (ABTD) state. This is an important feature of the present invention because it protects the processor memory from being overwritten by a failing device.

If the count is zero in the byte count count of the second word of the IOC table entry 142 for a particular device, and if the device controller 41 attempts to reconnect to the channel 109, the channel issues an abort (ABTD) to the device controller 41 as noted above and leaves the channel error field of the two word entry 142 at zero.

In response to an abort data (ABTD) T bus function, the device controller 41 makes an interrupt request on the line HIRQ or LIRQ (lines 149 or 147 as shown in FIG. 14) to the channel 109.

The device controllers 41 may at any time request an interrupt on these two lines.

An interrupt generally indicates that a data transfer has been completed or terminated by an abort from the channel (an ABTD from the channel) or by an error condition within the device controller 41 or attached device, or that a special condition has occurred within the device controller or an attached device. For example, when the power is applied and the PON circuit indicates that power is at an acceptable level, the device controller interrupts the processor module to indicate that its internal state is Reset because power was off or had failed and has been reset by the PON circuit.

In response to an interrupt, the program running within the processor module 33 issues an interrogate I/O instruction (IIO) or an interrogate high priority I/O instruction (HIIO) over the I/O bus 39.

The IIO instruction is issued in response to a low priority I/O interrupt, that is, one issued on the low priority interrupt request (LIRQ) line 147 (see FIG. 14).

The HIIO instruction is issued in response to a high priority I/O interrupt, that is, one requested on a high priority interrupt request (HIRQ) line 149 (see FIG. 14).

The microprocessor 113 (see FIG. 12) executes the EIO, IIO or HIIO instruction by taking control of the channel circuit logic 141 and data path logic 123.

The sequence for these instructions is illustrated in FIG. 17; and, as noted above, the sequence starts with a polling sequence.

The IIO instruction polls in a sequence using the T bus function low priority interrupt poll (LPOL) while the HIIO instruction polls in a sequence using the T bus function high priority interrupt poll (HPOL).

The polling sequence which is also described above completes by selecting the appropriate device controller 41 by using the T bus function select (SEL) as shown in FIG. 17.

The appropriate device controller 41 selected is that device controller which has the highest priority and is making an interrupt request.

The sequence continues with a read interrupt cause (RIC) T bus function as shown in FIG. 17. The device controller 41 responds by returning device dependent status on the D bus 161 (see FIG. 14).

The microprocessor 113 (FIG. 12) reads the status from the D bus 161 and places the status on the top of the register stack 112 (FIG. 12).

The sequence then continues with a read interrupt status (RIST) T bus function as shown in FIG. 17. The device controller 41 responds to this RIST T bus function by returning the device controller number, the unit number and four dedicated status bits on the D bus.

Of the four bit status field, two of the bits indicate respectively, abort (ABTD) and parity error (which parity error may have occurred during a reconnect and data transfer sequence).

The microprocessor 113 copies the content of the D bus—the controller number, the device number and the interrupt status—and places that content on the top of the register stack 112.

If no error occurred during the sequence, then the sequence continues with the deselect (DSEL) state which deselects the device controller 41; and then the sequence goes into the idle (NOP) state as indicated by the line at the top of FIG. 17.

If an error did occur (and the error can be a parity error detected by the channel or a handshake time out), the channel goes from the RIST state to the abort instruction (ABTI) state as shown in FIG. 17. This deselects the device controller 41, and then the channel 109 goes back into the idle (NOP) state as shown by the bottom line in FIG. 17.

As noted above, an I/O operation between a processor module and an I/O device typically consists of a group of sequences, e.g. an EIO followed by some number of reconnect and data transfer sequences, terminating with an IIO sequence. Sequences from several different I/O operations may be interleaved, resulting in apparent simultaneous I/O operation by several devices. Thus, a large number of devices may be accessed concurrently; the exact number depends on the channel bandwidth and the actual bandwidth used by each device.

The I/O system and dual port device controller architecture and operation described above provide a number of important benefits.

These benefits include (a) flexibility to interface a wide variety of devices, (b) a maximum usage of resources, (c) a fail soft environment in which to access peripheral devices in a multiprocessor system, (d) on line maintenance and upgrade of the multiprocessor system capability, and (e) maximum system through put (as opposed to emphasizing processor through put or I/O through put exclusively) in an on line transaction system in which a large number of concurrent transactions must be processed by the I/O system and CPU.

Flexibility to interface a wide variety of devices is achieved because the system of the present invention does not presuppose any inherent characteristics of a device type. Instead, the present invention provides a structure and operation which can accommodate a wide variety of device operations.

The present invention provides for a maximum usage of resources, primarily by making a maximum usage of memory bandwidth. Each device uses a minimum of the memory bandwidth. This allows a relatively large number of devices to be associated with the particular I/O bus. Because of the inherent speed of the I/O bus, and the buffering technique of the present invention, each particular transfer is made at a relatively high speed limited only by memory speed. Because the transfers are in a burst mode, the overhead associated with each transfer is minimized. This maximizes the use of the channel bandwidth and also permits the use of high speed devices.

The present invention provides for failsoft access to peripheral devices. There are redundant paths to each peripheral device, and containment of failure on any particular path. Failure of a particular module in one path does not affect the operation of a module in another path to that device.

There are comprehensive error checks for checking data integrity over a path, sequence failures and timing failures.

Protection features prevent a peripheral device from contaminating its own buffer or the memory of the system. These protection features include a separate count word in each IOC table and a protect bit in the IOC table. The IOC table is accessible by the channel, but not by the device. This is a second level of protection to prevent the device from accessing any memory not assigned to that device.

The present invention requires only a small number of lines in the I/O bus to provide a flexible and powerful I/O system.

The operation of the device controller is well defined as power is turned on or off to protect the I/O bus from erroneous signals during this time and also to permit on line maintenance and system upgrade.

The present invention uses stress to allow the buffers to cooperate without communicating with each other.

An on line transaction system is obtained through overlapped transfers and processing.

Multichannel direct memory access provides interleaved bursts to give overlapped transfers and minimum waits for accesses to a device. Each burst requires a minimum memory overhead and allows the processor to make maximum use of the memory. This combination allows maximum use of the I/O bandwidth and minimal tie up of the processor.

POWER DISTRIBUTION SYSTEM

The multiprocessor system of the present invention incorporates a power distribution system that over comes a number of problems associated with prior art systems.

In many prior art systems it was necessary to stop the processor system in order to perform required maintenance on a component of the system. Also, in many prior art systems, a failure in the power supply could stop the entire processor system.

The power distribution system of the present invention incorporates a plurality of separate and independent power supplies and distributes the power from the power supplies to the processor modules and to the device controllers in a way that permits on-line maintenance and also provides redundancy of power on each device controller.

In this regard "on-line" is used in the sense that when a part of the system is on-line, that part of the system is not only powered on, but it is also functioning with the system to perform useful work.

The term "on-line maintenance" therefore means maintaining a part of the system (including periodic preventative maintenance or repair work) while the remainder of the system is on-line as defined above.

In the present invention any processor module or device controller can be powered down so that on-line maintenance can be performed in a power off condition on that processor module or a device controller while the rest of the multiprocessor system is on-line and functional. The on-line maintenance can be performed while fully meeting Underwriters Laboratory safety requirements.

Also, in the power distribution system of the present invention each device controller is connected for supply of power from two separate power supplies and by a diode switching arrangement that permits the device controller to be supplied with power from both power supplies when both power supplies are operative and to be supplied with power from either one of the power supplies in the event the other power supply fails; and the changeover in the event of failure of one of the power supplies is accomplished smoothly and without any interruption or pulsation in the power supply so that an interrupt to a device controller is never required in the event of a failure of one of its associated power supplies.

A power distribution system for insuring both a primary supply and an alternate power supply for each individual dual port device controller 41 is illustrated in FIG. 30. The power distribution system is indicated generally by the reference numeral 301 in FIG. 30.

The power distribution system 301 insures that each dual port device controller 41 has both a primary power supply and an alternate power supply. Because each device controller does have two separate and independent sources of power supply, a failure of the primary power supply for a particular device controller does not render that device controller (and all of the devices associated with that controller) inoperative. Instead, in the present invention, a switching arrangement provides for an automatic switchover to the alternate power supply so that the device controller can continue in operation. The power distribution system thus coacts with the dual port system of the device controller to provide non-stop operation and access to the devices in the event of a failure of either a single port or a single power supply.

The power distribution system 301 shown in FIG. 30 provides the further advantage that each processor module 33 and associated CPU 105 and memory 107 has a separate and independent power supply which is dedicated to that processor module. With this arrangement, a failure of any one power supply or a manual disconnection of any one power supply for repair or servicing of the power supply or associated processor module is therefore limited in effect to only one particular processor module and cannot affect the operation of any of the processor modules in the multiprocessor system.

The power distribution system 301 shown in FIG. 30 thus works in combination with the individual processor modules and the dual port device controllers to insure that a failure or disconnection of any one power supply does not shut down the overall system or make any of the devices ineffective.

Figures 32, 33:
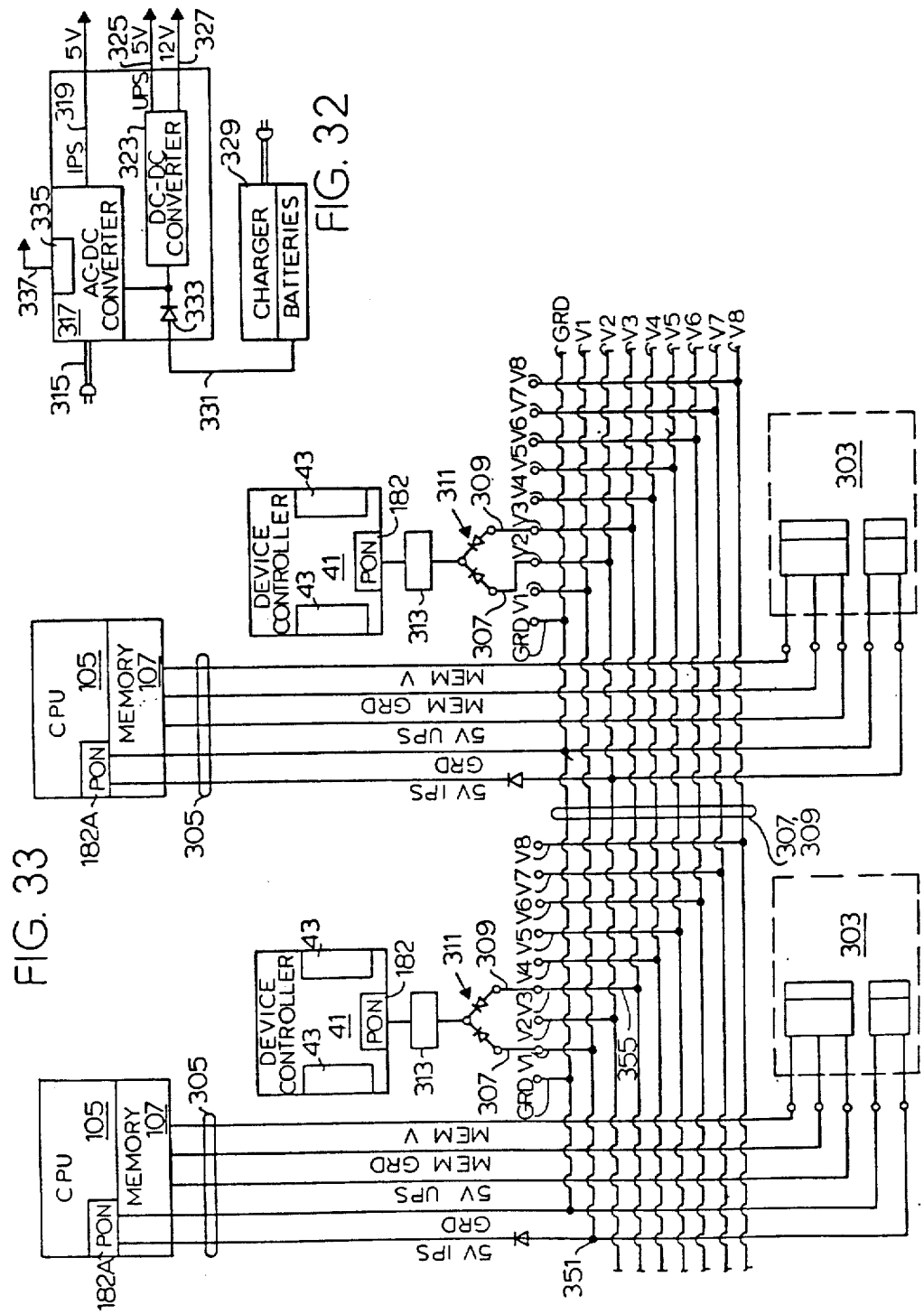
FIG. 32 is a block diagram showing details of one of the separate and independent power supplies 303 illustrated in FIG. 30.
FIG. 33 is a block diagram view showing details of the vertical buses and the horizontal buses for supplying power from the separate power supplies 303 shown in FIG. 30 to the individual device controllers 41. The particular bus arrangement shown in FIG. 33 permits easy selection of any two of the individual power supplies as the primary and the alternate power supply for a particular device controller.

The power distribution system 301 includes a plurality of separate and independent power supplies 303, and each power supply 303 has a line 305 (actually a multi-line bus 305 as shown in FIG. 33) which is dedicated to supplying power to the CPU and memory of a particular, related processor module.

Each device controller 4 is associated with two of the power supplies 303 through a primary line 307 and an alternate line 309 and an automatic switch 311.

A manually operated switch 313 is also associated with each device controller 41 between the device controller and the primary line 307 and the alternate line 309.

Figure 31:
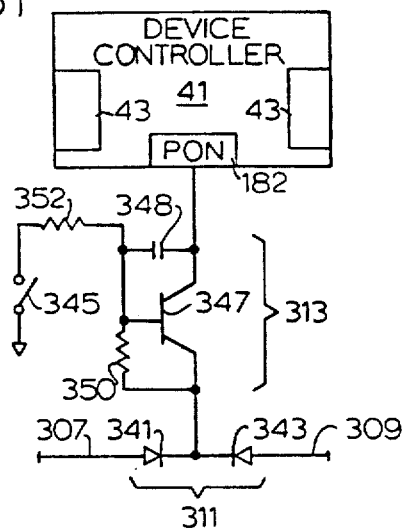
FIG. 31 is an enlarged, detailed view of the switching arrangement for switching between a primary power supply and an alternate supply for a device controller. The switching structure shown in FIG. 31 permits both automatic switching in the event of a failure of the primary power supply and manual switching in three different modes—off, auto and alternate.

The switches 311 and 313 are shown in more detail in FIG. 31.

FIG. 32 shows details of the component construction of a power supply 303.

As shown in FIG. 32, each power supply 303 has an input connector 315 for taking power from the mains. The input 315 is connected to an AC to DC converter 317, and the output of the AC to DC converter provides, on a line 319, a five volt interruptable-power supply (IPS). This five volt interruptable power supply is supplied to the CPU 105, the memory 107 and the device controller 41. See also FIG. 33.

The AC to DC converter 317 also provides on a second output line 321 a sixty volt DC output which is supplied to a DC to DC converter 323. See FIG. 32.

The DC to DC converter in turn provides a five volt output on a line 325 and a twelve volt output on a line 327.

The outputs from the lines 325 and 327 are, in the system of the present invention, uninterruptable power supply (UPS) outputs in that these power supply outputs are connected to the CPU and memory when semiconductor memory is used. The power supply to a semiconductor memory must not be interrupted because a loss of power to a semiconductor memory will cause loss of all data stored in the memory.

The five volt interruptable power supply on line 319 is considered an interruptable power supply because this power is supplied to parts of the multiprocessing system in which an interruption of power can be accepted. Thus, the five volts interruptable power is supplied to parts of the CPU other than semiconductor memory and to only those parts of the memory which are core memory (and for which a loss of power does not cause a loss of memory) and to the device controller (which as will be described in more detail below) is supplied with an alternate source of power in the event of a failure of the primary power supply.

Since the power supply on lines 325 and 327 must be an uninterruptable power supply, the present invention provides a battery back-up for the input to the DC to DC converter 323. This battery back-up includes a battery and charger module 329. The module 329 is connected to the DC to DC converter 323 by a line 331 and a diode 333.

In a particular embodiment of the present invention the battery 323 supplies power at 48 volts to the converter 323, which is within the input range of the converter 323.

The diode 333 insures that power from the battery is supplied to the converter 323 if the voltage on the line 321 drops below 48 volts. The diode 333 also stops the flow of current from the battery and the line 333 when the output of the AC to DC converter on line 321 exceeds 48 volts.

Each power supply 303 also includes a power warning circuitry 335 for detecting a condition in the AC power input on line 315 that would result in insufficient power out on the output lines 319, 325 and 327. The power warning circuit 335 transmits a power failure warning signal on a line 337 to the related CPU 105.

Because of the capacity storage in the power supply 303, there is enough time between the power warning signal and the loss of the five volts interruptable power on line 319 for the CPU to save its state before the power is lost.

However, the uninterruptable power supply on lines 325 and 327 must not be interrupted, even for an instant of time; and the battery back-up provided by the arrangement shown in FIG. 32 insures that there is no interruption in the power supply on lines 325 and 327 in the event of a power failure in the input line 315.

One particular power supply 303 itself can fail for some reason with the other power supplies 303 still operating. In that event, the power distribution system 301 of the present invention limits the effect of the failure of the power supply 303 to the loss of one particular, associated CPU and memory; and the automatic switch 311 provides for an automatic switchover from the failed power supply to the alternate power supply to keep the associated device controller 41 in operation. The device controller 41 which had been connected to the failed power supply therefore continues in operative association with the other processor modules and components of the multiprocessor system, because the required power is automatically switched in from the alternate power supply.

As best illustrated in FIG. 31, each automatic switch 311 includes two diodes—a diode 341 associated with the primary power line 307 and a diode 343 associated with the alternate power line 309.

The function of the diodes 341 and 343 is to permit power to be supplied to a device controller 41 from either the primary power line 307 and a related power supply 303 or the alternate power line and its related power supply 303 while keeping the supplies isolated. This prevents a failed power supply from causing its associated alternate or primary from failing.

In normal operation each diode permits a certain amount of current to flow through the diode so that the power to each device controller 41 is actually being supplied by both the primary and alternate power supplies for that device controller.

In the event that one of the power supplies fails, the full power is supplied by the other power supply, and this transition occurs without any loss of power at all.

Since there is a small voltage drop across the diodes 341 and 343, the voltage on the lines 307 and 309 must be enough higher than five volts to accomodate the voltage drop across the diodes 341 and 343 and still supply exactly five volts to the device controller 41. The lines 305 are in parallel with the lines 307 and 309, and the power actually received at the CPU in memory must also be five volts; so balancing diodes 339 are located in the lines 305 to insure that the voltage after the diodes 339 as supplied to each CPU is exactly five volts.

The manual switch 313 permits a device controller 41 to be disconnected from both the primary and the alternate power sources when the device controller needs to be disconnected for removal and service.

Details of the construction of the switch 313 are shown in FIG. 31. As shown in FIG. 31, the switch 313 includes a manual switch 345, a transistor 347, a capacitor 348 and a resistor 350 and a resistor 352.

The manual switch 345 is closed to turn on the transistor 347 which then supplies power to the device controller 41.

It is important that both the turn on and the turn off of power to the device controller 41 be accomplished in a smooth way and without fluctuations which could trigger the PON circuit 182 more than once. The feedback capacitor 348 acts in conjunction with the resistor 352 to cause the required smooth ramp build-up of power when the switch 345 is closed to turn the transistor 347 on.

When the transistor 347 is turned off by opening the switch 345, the feedback capacitor 348 acts in conjunction with resistor 350 to provide a smooth fall off of power.

In a preferred embodiment of the invention all of diodes 341, 343 and 339 are Schottky diodes which have a very low forward voltage drop, and this reduces power dissipation.

As noted above in the description of the I/O system and dual port device controller 41, each device controller 41 does have a power on circuit (PON) 182 for detecting when the five volt power is below specifications. The PON circuit 182 is shown in more detail in FIG. 25 and resets the device controller 41 to lock everything off of the device controller and holds the device controller itself in a state that is known when the power is turned off by the switch 313. The PON circuit 182 also released the device controller and returns it to operation after the power is turned on by switch 313 and five volt power supply at the proper specification is supplied to the device controller 41.

Further details of the power on circuit 182 shown in FIG. 25 are described above in relation to the I/O and dual port controller system.

With reference to FIG. 33, the power from each power supply 303 is transmitted to a related CPU by the vertical bus 305, and each vertical bus 305 is a laminated bus bar which has five layers of electrical conductors.

As indicated by the legends in FIG. 33, each vertical bus 305 has two different conductors connected to ground.

One conductor provides the ground for both the five volt interruptable power supply (IPS) and the five volt interruptable power supply (UPS).

A separate conductor provides a ground for the memory voltage. This separate ground for the memory voltage insures that the relatively large fluctuations in current to the memory will not have any effect on either the five volt IPS or the five volt UPS supplied to the CPU.

The horizontal bus 305, 307 includes the primary and alternate power supply lines 307 and 309 (as indicated by the reference numerals in FIG. 30). In a particular embodiment of the present invention the bus 305, 307 is actually a nine layer laminated bus which has a single ground and eight voltage layers (V1 through V8 as indicated by the legends and notations in FIG. 33).

Each voltage layer is connected to the five volt interruptable output of a different power supply 303. Thus, the layer V1 is connected at 351 to the five volt IPS power for the power supply 303 and related processor module farthest to the left as viewed in FIG. 33, and the layer V2 is connected at 353 to the five volt IPS power supply 303 for the processor module at the center as viewed in FIG. 33, and so on.

Since there are eight layers (V1 through V8) and a common ground available to each device controller in the horizontal bus, upstanding vertical taps 355 to these eight layers at spaced intervals along the horizontal bus permit each device controller 41 to be associated with any two of the power supplies 303 merely by connecting the primary line 307 and the alternate line 309 to a particular set of taps. By way of example, the device controller 41 on the lefthand side of FIG. 33 is shown connected to the taps V1 and V2 and the device controller 41 on the righthand side of FIG. 33 is shown connected to the taps V2 and V3.

Thus, any device controller 41 can be connected to any two of the power supplies 303 with any one of the power supplies serving as the primary power supply and any one of the other power supplies serving as the alternate power supply.

The power distribution system of the present invention thus provides a number of important benefits.

The power distribution system permits on line maintenance to be performed because one processor module or device controller can be powered down while the rest of the multiprocessor system is on line and functional.

The power distribution system fully meets all Underwriter Laboratory safety requirements for doing on line maintenance of a powered down component while the rest of the multiprocessor system is on line and in operation.

Each device controller is associated with two separate power supplies so that a failure in one of the power supplies does not cause the device controller to stop operation. Instead, the electronic switch arrangement of the present invention provides such a smooth transition of power from the two power supplies to only one of the power supplies that the device controller is maintained in continuous operation without an interrupt.

MEMORY SYSTEM

Each processor module 33 (See FIG. 1) in the multiprocessor system 31 contains a memory.

This memory is indicated by the general reference numeral 107 in FIG. 1 and is shown in greater detail in FIG. 24.

The memory 107 of each processor module 33 is associated with both the CPU 105 and the I/O channel 109 of that module. There is a dual port access to the memory by the CPU and the channel. That is, the CPU 105 (see FIG. 1 and FIG. 34) can access the memory for program or data references, and the I/O channel 109 can also access the memory directly (without having to go through the CPU) for data transfers to and from a device controller 41. This dual access to the memory is illustrated in FIG. 34 and will be described in greater detail below in the description of the FIG. 34 structure and operation.

One benefit of this dual access to the memory is that CPU and channel accesses to the memory can be interleaved in time. There is no need for either the CPU or the channel to wait for access to the memory, except in the case where both the CPU and the channel are trying to access the memory at exactly the same time. As a result, both the CPU and the channel can be performing their separate functions simultaneously, subject to an occasional wait by the CPU or channel if one of these units is accessing the memory at the exact time the other unit need to access the memory.

The dual port access also allows background I/O operations. The PU 105 needs to be involved with the channel 109 only in the initiation and termination of I/O data transfers. The CPU can be performing other functions during the actual I/O data transfer itself.

Figure 34:
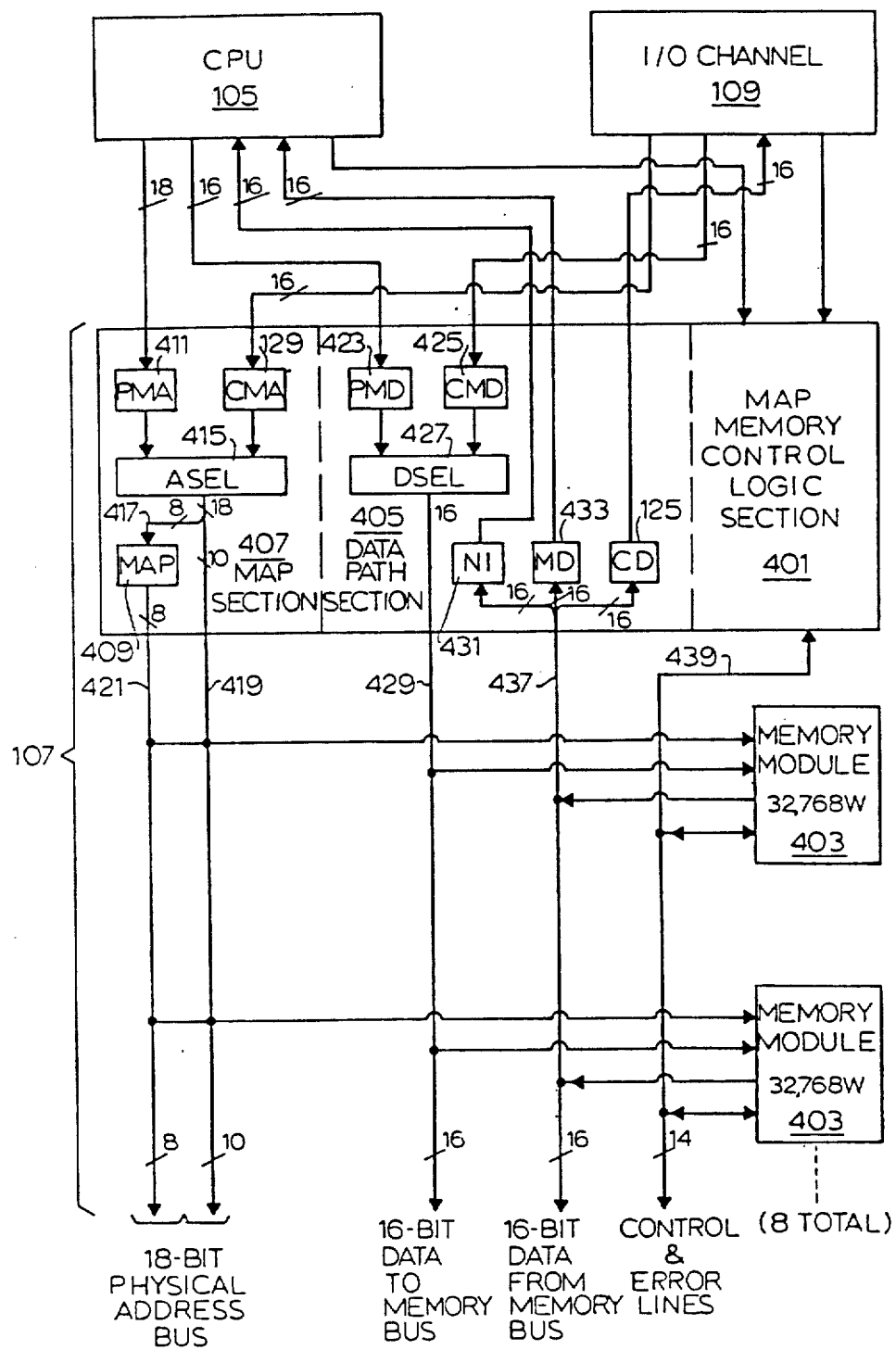
FIG. 34 is a block diagram of the memory system and shows details of the memory 107 of a processor module 33 shown in FIG. 1.

The memory 107 shown in FIG. 34 comprises a physical memory which consists of up to 262,144 words of sixteen data bits each.

In addition to the sixteen data bits, each word in memory has an additional parity bit if the memory is a core memory or six additional error correction bits if the memory is a semiconductor memory.

The parity bit permits detection of single bit errors.

The six error correction bits permit detection and correction of single bit errors and also permit detection of all double bit errors.

The physical memory is conceptually subdivided into contiguous blocks of 1024 words each (which are called pages). The pages in physical memory are numbered consecutively from page zero, starting at physical location zero. The address range of physical memory in one specific embodiment of the present invention, which address range is zero through 262,143, requires eighteen bits of physical address information.

The basic architecture of the present invention is, however, constructed to accommodate and utilize twenty bits of physical address information, as will become more apparent from the description to follow.

In one specific embodiment of the invention the physical memory is physically divided into physical modules of 32,678 words. Thus, eight of these modules provide the 262,143 words noted above.

All accesses to memory are made to one of four logical address areas—user data, system data, user code and system code areas. All CPU instructions deal with these logical (as distinct from physical) addresses exclusively. Thus, a programmer need not be concerned with an actual physical address but can instead write a program based entirely on logical addresses and the logical addresses are translated by the map section of memory system into physical addresses.

The range of addressing in any given logical address area is that of a sixteen bit logical address, zero through 65,535. Thus, each logical address area comprises sixty-four logical pages of 1024 words each.

In the memory system of the present invention there is no required correspondence between a logical page and a physical page. Instead, the various logical pages comprising an operating system program or a user program need not reside in contiguous physical pages. In addition, the logical pages need be in physical main memory but may be in secondary memory, such as on a disc.

This allows implementation of a virtual memory scheme.

Virtual memory has two benefits.

First, virtual memory allows the use of a physical main memory space which is smaller than the logical address areas would require, because the physical memory can be supplemented by a secondary physical memory.

Secondly, virtual memory permits address spaces of a plurality of users (multiprogramming) to share the physical memory, and each user does not have to be concerned with the allocation of physical memory among the operating system, himself, or other users.

The memory system of the present invention provides protection between users in the multiprogramming environment by guaranteeing that one user program cannot read from or write into the memory space of another user program. This is accomplished by the paging and mapping system. When one user program is running, the map for that user program points only to the memory pages (up to sixty-four pages of code and sixty-four pages of data) for that particular user program. That particular user program cannot address outside its own logical address space and therefore cannot write into or read from the memory space of another user program.

The fact that code pages are non-modifiable also prevents a user program from destroying itself.

Thus, there are two levels of protection for user programs operating in a multiprogramming environment—the fact that each user map points only to its own pages in memory and the fact that code pages are non-modifiable. Also, in the present invention, this protection is achieved without protection limit registers or by protection keys as often used in the prior art.

The required translation of a sixteen bit logical address to an eighteen bit physical address is accomplished by a mapping scheme. As part of this mapping scheme, a physical page number is obtained by a look-up operation within a map. This physical page number is then combined with the address within a page to form the complete physical memory address.

Only the page number is translated. The offset or address within a page is never changed in the mapping.

In the present invention there are four map sections. Each map section corresponds to one of the four logical addressing areas (user data, system data, user code and system code).

The separation of the logical address into these four separate and distinct areas provides significant benefits.

The separation provides isolation of programs from data so that programs are never modified. The separation also provides isolation of system programs and data from user programs and data, and this protects the operating system from user errors.

The four map sections are designated as follows:

Map 0—user data map. All addresses to variable user data areas are translated through this user data map.

Map 1—system data map. The system data map is similar to the user data map and in addition, all memory references by either the I/O channel, the interprocessor bus handling microprogram, or the interrupt handling microprogram specifies this map. The system data map provides channel access to all of physical memory via only a sixteen bit address word.

Map 2—user code map. This map defines the active user program. All user instructions and constant data are obtained via this user code map.

Map 3—system code map. This map defines the operating system program. All operating system instructions and constant data are obtained via this system code map.

Each map section has sixty-four entries corresponding to the sixty-four pages possible in each logical address area. Each entry contains the following information.

(1) The physical page number field (which can have a value of zero through 255).

(2) An odd parity bit for the map entry. The parity bit is generated by the map logic whenever a map entry is written.

(3) A reference history field. The reference history field comprises reference bits, and the high order bit of the reference bits is set to a "one" by any use of the page corresponding to that map entry.

(4) A dirty bit. The dirty bit is set to a "one" when a write access is made to the corresponding memory page.

The reference bits and the dirty bit are used by the memory manager function of the operating system to help select a page for overlay. The dirty bit also provides a way to avoid unnecessary swaps of data pages to secondary memory.

(5) An absent bit. The absent bit is initially set to a "one" by the operating system to flag a page as being absent from main memory. An access to a page with this bit set to "one" causes an interrupt to the operating system page fault interrupt handler to activate the operating system virtual memory manager function. The absent bit is also used as a protection mechanism to prevent erroneous access by a program outside its intended logical address area for either code or data.

Three instructions are used by the operating system in connection with the map. These three instructions are: SMAP, RMAP, AMAP.

The SMAP (set map entry) instruction is used by the memory manager function of the operating system to insert data into a map entry. This instruction requires two parameters—the map entry address and the data to be inserted.

The RMAP (read map only) instruction is used by the memory manager function of the operating system to read a map entry. This instruction requires one parameter, the map entry address, and the result returned by the instruction is the map entry content.

The AMAP (age map entry) instruction causes the reference history field of a map entry to be shifted one position to the right. This is used by the memory manager function of the operating system to maintain reference history information as an aid in selecting a page for overlay.

A page fault interrupt provided by the absent bit occurs when a reference is made to a page that does not currently reside in main memory or which is not part of the logical address space of the program or its data. When a page fault is detected, an interrupt through to the operating system page fault interrupt handler occurs.

The page fault interrupt sequence includes the following events:

1. An address reference is made to a page that is absent from physical memory (absent bit="one").

2. The page fault interrupt occurs. The interrupt handler microcode places an interrupt parameter indicating the map number and the logical page number in a memory location known to the operating system. Then the current environment is saved in an interrupt stack marker in memory.

3. The page fault interrupt handler executes. If the page fault occurred because of a reference outside the logical address space of the program, then the program is terminated with the error condition. On the other hand, if a page fault occurred because the logical page was absent from physical main memory (but present in secondary memory), an operating system process executes to read the absent page from the secondary memory (usually disc) to an available page in primary memory. That physical page information and a zero absent bit are inserted into the map entry. When this memory management function completes, the environment that caused the page fault is restored.

4. The instruction previously causing the page fault is reexecuted. Since the absent bit in the map entry of the logical page has now been set to a "zero", a page fault will not occur, the page address is translated to the physical page just brought in from secondary memory, and the instruction completes.

As noted above, the I/O channel has access to the memory through its own port.

Data transfers to and from memory by the I/O channel are via the system data map. That is, the sixteen bit logical addresses provided by the I/O channel are translated to an eighteen bit physical address by Thus, the mapping scheme allows I/O access to more words of physical memory than its address counter would normally allow.

In one specific embodiment of the present invention 262,144 words of physical memory (for an eighteen bit address) can be accessed with only a sixteen bit logical address by going through the ap. The extra address information (the physical page information) is contained in the map and is supplied by the operating system before each I/O transfer is initiated.

As will become more apparent from the detailed description to follow, the present invention is also readily extendible to a twenty bit physical address.

FIG. 34 is a block diagram showing details of the memory 107 of a processor module 33 and showing also connections from the memory 107 to the CPU 105 and the I/O channel 109 of that processor module.

As illustrated in FIG. 34, the memory system 107 provides access ports for both the CPU 105 and the I/O channel 109 to the memory 107, and the I/O channel 109 therefore is not required to access the memory through the CPU 105.

The memory 107 includes map memory control logic 401 which controls initiation and completion of access to physical memory modules 403.

The memory 107 also includes a data path section 405 containing registers (as indicated by the legends in FIG. 34 and described in detail below) which supply data to be written to memory and which hold data read from memory.

The memory 107 also includes a map section 407. The map section 407 includes logical address registers from both the CPU and the channel and a map storage 409 from which physical page numbers are obtained.

The map sections 407 thus contains a processor memory address (PMA) register 411 and a channel memory address (CMA) register 129.

These two registers are connected to an address selector 415.

The address selector 415 is connected to the map 409 by a logical page address bus 417, and the address selector 415 is also connected directly to the memory modules by a page offset bus 419.

As indicated by the numerals 8 and 10 adjacent to the buses 417, 419, the logical page address bus 417 transmits the eight high order bits to the map 409 for translation to a physical page number, and the page offset bus 419 transmits the ten low order bits (of an eighteen page address from the address selector 415) to the memory modules 403.

An output bus 421 supplies the physical page address to the modules 403. This output bus 421 contains the translated eight high order bits for the address of the physical page.

The data path section 405 contains the following registers: A processor memory data (PMD) register 423; a channel memory data (CMD) register 425; a next instruction (NI) register 431; a memory data (MD) register 433; and a channel data (CD) register 125.

The outputs of the PMD and CMD registers are supplied to a data selector 427. This data selector 427 has an output bus 429 which supplies data to be written to memory in the modules 403.

Data read out from one of the memory modules 403 is read into one of the three data register NI, MD and CD over a bus 437.

As illustrated in FIG. 34, the map memory control logic 401 is also connected with each of the memory modules 403 by a bus 439. The bus 439 comprises command lines which initiate read or write operations, completion signals from the memory modules, and error indicators or flags.

Figure 35:
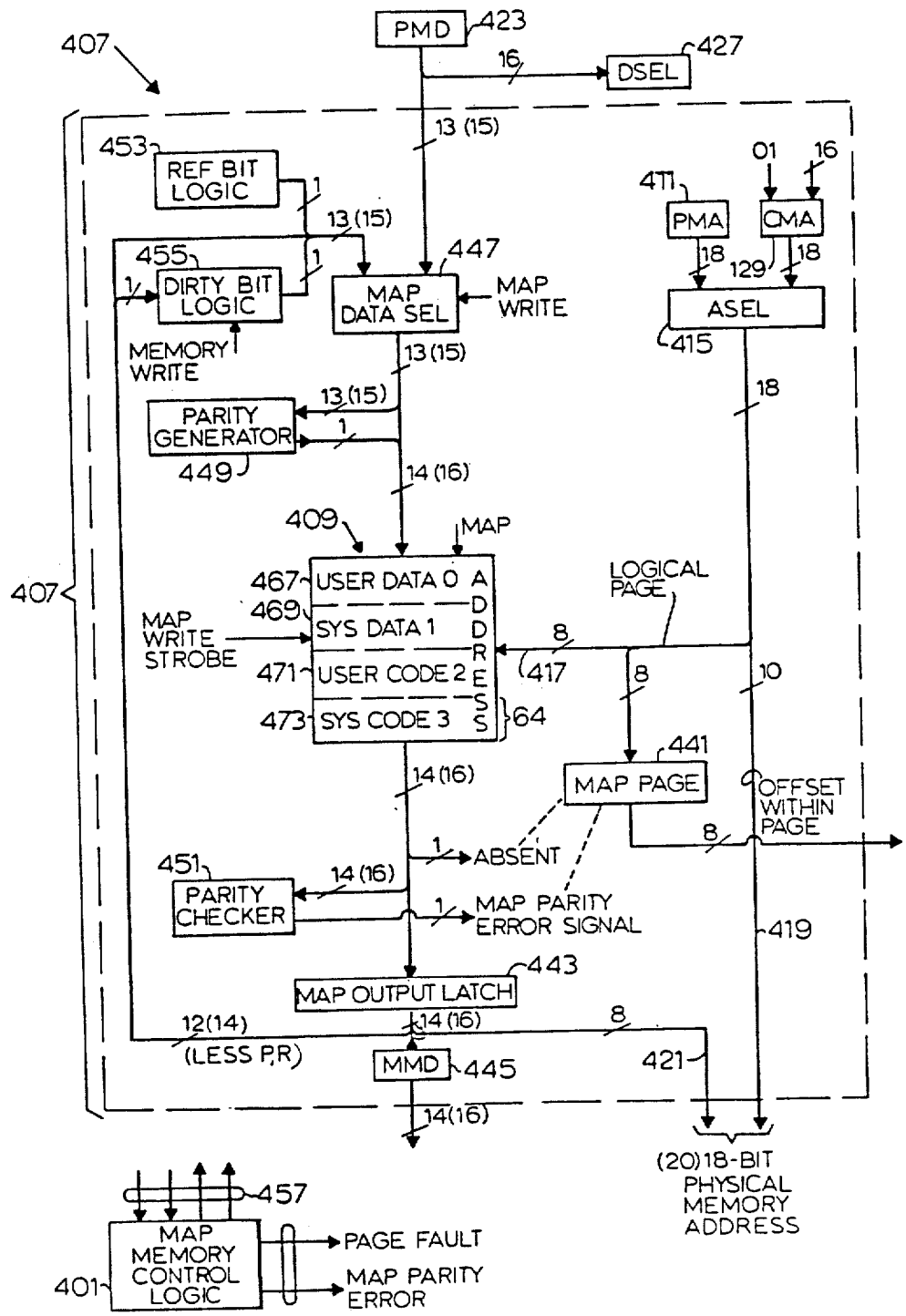
FIG. 35 is a block diagram showing details of the map section 407 of the memory 107 shown in FIG. 34.

With reference now to FIG. 35, the map section 407 includes, in addition to the map 409, a map page register 441, a map output latch 443, a map memory data (MMD) register 445, a map data selector 447, a map parity generator 449, a map parity checker 451, reference bit logic 453, a dirty bit logic 455.

The map memory control logic 401 is shown in FIG. 35 as associated with the map section 407 by control signal lines 457.

The map memory control logic 401 controls the loading of registers and selection of registers by the selectors, controls (in conjunction with map absence and parity error outputs) the initiation of memory modules 403 operations, and provides interrupts to the CPU 105 (as indicated by the page fault and map parity error interrupt signals indicated by the legends in FIG. 35)—all as will be described in more detail below.

In a particular embodiment of the invention the memory system shown in FIGS. 34 and 35 utilizes a physical page address field of eight bits and a page offset of ten bits which combine to give a total eighteen bits. As noted above, the numbers 8, 10, 12, 13, 14 and 18 which are not in parenthesis on certain bus lines in FIG. 34 and FIG. 35 relate to this specific eighteen bit implemented embodiment of the present invention. However, the memory system is easily expandable to a twenty bit implemented embodiment (with a physical page address of ten bits) and this is indicated by the numbers (10), (12), (14), (15), (16) and (20) which are within parenthesis on the same bus lines of FIG. 35.

FIG. 36 illustrates the organization of logical memory in four separate and distinct logical address areas 459, 461, 463 and 465. These four logical address areas are: user data area 459; system data area 461; user code area 463; and system code area 465.

FIG. 36 also illustrates the four map sections corresponding to the logical address areas.

Thus, the user data map section 467 corresponds to the logical user data address area 459, the system data map section 469 corresponds to the logical system data address area 461, the user code map section 471 corresponds to the logical user code address area 463 and the system code map section 473 corresponds to the logical system code address area 465.

As also illustrated in FIG. 36, each map section has sixty-four logical page entries (page zero through page sixty-three), and each map entry comprises sixteen bits (as illustrated by the enlarged single map entry in FIG. 36).

As indicated by the legends associated with the enlarged map entry shown in FIG. 36, each mpa entry comprises a ten bit physical page number field, a single parity bit P, a reference history field comprising three reference bits R, S and T, a single dirty bit D, and a single absent bit A.

The physical page number field provided by the ten high order bits provides the physical page number corresponding to the logical page called for by the program.

The parity bit P is always generated as odd parity to provide a data integrity check on the map entry contents.

The reference history field bits R, S and T are used by the memory manager function of the operating system to maintain reference history information for selecting the least recently used page for overlaying.

The R bit is set to a one by any read or write operation to that logical page.

The S and T bits are storage bits which are manipulated by the AMAP (age a map entry) instruction.

The dirty bit D is set to a one by a write access to that logical page. The operating system uses the dirty bit to determine whether a data page has been modified since it was last brought in from secondary memory.

The absent bit A is set to a one by the operating system to flag a logical page which is absent from main memory but present in secondary memory or to flag a page which is outside the logical address area of that user.

The two high order bits for the map entry shown in FIG. 36 are not used in the specific embodiment of the invention illustrated in the drawings, but these two bits are used when the full twenty bit physical addressing is used.

As noted above, three instructions are used by the operating system in connection with the map. These three instructions are: SMAP, RMAP and AMAP.

The SMAP instruction is used by the memory manager function of the operating system to insert data into a map entry like that illustrated in FIG. 36.

The SMAP instruction is implemented by the microprogram 115 (FIG. 12) in the CPU 105. The microprogram interacts with the map memory control logic 401 (see FIG. 34), first of all, to select (with the first instruction parameter) a location in the map 409 and then, second, to insert in that location the second instruction parameter—the new map entry data.

In operation, and referring to FIG. 35, in the first step in the sequence the microprogram 115 loads the new map entry data into the processor memory data (PMD) register 423.

In the next step in the sequence, the map address, including two high order bits for map selection, are loaded into the processor memory address (PMA) register 411.

At this point the two instruction parameters containing the map entry address and the data to be inserted have been loaded in their respective registers 411 and 423.

Next, the microprogram 115 in the CPU 105 initiates a map write operation sequence of the map memory control logic 401. This map write operation sequence is initiated after any previous memory operations have been completed.

The steps noted above in the operation sequence have all been performed by the microprogram (the firmware).

The remaining actions of the SMAP instruction are performed under the control of the map memory control logic. Thus, the remaining actions are all performed automatically by hardware.

In the map write operation sequence, the map address is transmitted from the PMA register through the address selector 415 over the bus 417 to the map 409. Only the eight high order bits (the map select and map address) are used in this operation.

The two high order bits specify the map selection—whether user data, system data, user code or system code.

The ten low order bits of the logical address bus from the address selector (ASEL) 415 (which bits are the offset within a page for a memory read or write access) are not used in this operation.

As the map is being addressed as described above, the new map data is transmitted from the PMD register 423 through the map data selector 447 to the map parity generator 449 and to the map 409. The map parity generator computes odd parity on the new map data and supplies this parity bit to the map.

Now, at this point, the map memory control logic 401 generates a map write strobe signal (on one of the lines indicated by 457 in FIG. 35) to the map 409 which causes the new data and parity to be written into the selected map section at the specific map entry selected by the logical page address on the bus 417.

This completes the SMAP instruction sequence.

At the end of this SMAP instruction the proper map section has been selected, the particular logical page entry on that map section has been selected, the data and computed odd parity have been supplied to the map, and the map write strobe has caused that data to be written at the desired map entry.

The SMAP instruction (SMAP) is used by the operating system to initialize each logical page entry in each of the four map sections as required.

One use of the set map instruction is therefor to insert a physical page address for a logical page to provide for translation of logical page numbers to physical page numbers after a page has been swapped in from secondary memory.

Another use of the set map instruction is to set on an absent bit for a logical page swapped out to secondary memory.

The read map (RMAP) instruction is used by the memory manager function of the operating system to examine the content of a map entry.

In this RMAP instruction the microprogram 115 in the CPU 105 interacts with the map memory control logic 401 to select (with the instruction parameter) a location in the map 409 and to return to the register stack 112 (see FIG. 12) as a result of the content of that map entry.

In the operation of the read map (RMAP) instruction, referring to FIG. 35, the microprogram 115 loads the map address, including the two high order bits for the map selection, into the PMA register 411. The microprogram 115 then initiates a map read operation sequence of the map memory control logic 401

This sequence is then carried out by the hardware, and in this sequence the map address is transmitted from the PMA register 411 through the address selector 415 to the map 409. Again, only the map select and page address bits are used in this operation.

The content of the selected map entry is transmitted from the map 409 to the map parity checker 451 (see FIG. 35) and to the map output latch 443. The map parity checker 451 compares the parity bit from the map entry with the odd parity computed on the data.

If the parity is incorrect, the map address is loaded into the map page register 411; and the map parity error signal sets an error flag which causes a map parity error interrupt to the CPU 105.

Otherwise, in the case of correct parity, the map entry data is loaded from the map output latch 443 into the map memory data register (MMD) 445.

Finally, the RMAP instruction microprogram returns the data in the map memory data (MMD) register 445 to the register stack 112 (see FIG. 12) as the result of the instruction.

At the end of the read map (RMAP) instruction the proper map section has been selected, the particular logical page entry on that map section has been selected, and the content of that map entry has been read out from the map and returned as an instruction result to the CPU's register stack.

The uses of the RMAP instruction include the following.

The main function of this read map (RMAP) instruction is to allow the operating system to examine the reference history field and dirty bit of a map entry (see the map entry format shown in FIG. 36) to determine a page for overlaying (as will become more apparent from the description of the operation to follow).

The road map (RMAP) instruction is also used in diagnostics to determine whether the map storage is functioning properly.

The age map (AMAP) instruction is used by the memory manager function of the operating system to maintain useful reference history information in the map. This reference history information is maintained in the map by map entries (the R, S and T bits of the map entry format shown in FIG. 36) within a map section which are typically "aged" after each page fault interrupt occurrence in that map section.

This AMAP instruction has just a single parameter which is the map address specifying the map location to be aged.

In the operation of the age map (AMAP) instruction, the microprogram 115 in the CPU 105 selects a map location with the instruction map address parameter. The microprogram 115 loads the map address parameter into the PMA register just as in the RMAP instruction.

At this point a map read operation sequence of the map memory control logic 401 is initiated, and this sequence proceeds identically as in the RMAP instruction described above.

The microprogram 115 (FIG. 12) reads the content of the map entry from the MMD register 445 (FIG. 35) extracts the reference history field (the R, S and T bits 10, 11 and 12 shown in FIG. 36), shifts the field right one position, and reinserts the field to form the new map entry data. Thus, a zero has been entered in the R bit, the R bit has been shifted into the S bit, the S bit has been shifted into the T bit, and the old T bit is lost.

Now the microprogram 115 takes the modified map entry and loads this new data into the PMD register 423 (FIG. 34) and writes the new map entry data back into the selected map entry (similar to the SMAP sequence).

This completes the age map (AMAP) instruction.

As a result of the age map (AMAP) instruction, a map entry has been read from the map, its reference history field has been shifted, and this modified entry has been reinserted into the selected map location.

As previously noted, the R bit is set to one by any memory reference to the corresponding logical page, so that when this bit is a one, it is an indication that this page has been used since the last set map (SMAP) or age map (AMAP) operation instruction.

This setting of the R bit in conjunction with the age map (AMAP) instruction provides a means for maintaining frequency of use information in the reference history field of the map.

The reference history field of all of the map entries in a given map are typically aged after a page fault interrupt. Thus, the value of the three bit reference field in a map entry is an indication of the frequency of access since the previous three page fault interrupts.

For example, a binary value of seven (all three reference bits set at one), indicates accesses in each of the intervals between the proceeding page fault interrupts.

A binary value of four in the reference history field (the R bit set at one and the S and T bits set at zero) indicates an access in the interval since the last page fault interrupt and indicates that there were no accesses in the intervals previous to the most recent page fault interrupt.

As a final example, a binary value of zero for the three bit reference field indicates that that logical page has not been accessed in any of the three intervals since the last three page fault interrupts.

Thus, the higher the binary number represented by the three bit reference history field, the higher the frequency of recent accesses to that logical page.

This reference history information is maintained so that when it is necessary to select a page for overlay, a page which has been infrequently used in the recent past can be identified. A page infrequently accessed in the recent past is likely to continue that behavior, and that page will therefore probably not have to be swapped back into memory after being overlayed.

This frequency of use history is used by the memory manager function of the operating system to select infrequently used pages for overlay so as to minimize swapping from secondary memory to implement an efficient virtual memory system.

As noted above, memory may be accessed by the CPU or by the I/O system.

The action of the memory system and map during a CPU memory access sequence will now be described. The access sequence is similar for the various CPU memory accesses such as writing data, reading data, or reading instructions from memory.

The CPU memory access sequence is started either by the CPU microprogram 115 or by the CPU instruction-fetch logic. In either event, the CPU 105 loads an eighteen bit logical address into the PMA register 411 and initiates a data read, data write, or instruction read operation sequence of the map memory control logic 401.

The eighteen bit logical address also includes, in addition to the two high order logical address select bits, six bits which specify the logical page within the selected map and ten low order bits which specify the offset within the page in the selected map.

In the data read, data write, or instruction read operation sequence of the map memory control logic 401, after any previous map or memory operations have completed, the eighteen bit address in the PMA register 411 (FIG. 35) is transmitted through the address selector 415 to the buses 417 and 419 (see FIGS. 34 and 35).

The bus 419 transmits the page offset portion of the address. This page offset portion of the address is transmitted directly to the physical memory modules 403 (FIG. 403) by the bus 419.

The bus 417 transmits the logical page address portion (which must be translated to a physical page address) to the map 409.

The map entry selected by the logical page address is read out from the map 409 to the map memory control logic 401 (FIG. 34), the map parity checker 451 (FIG. 35), and the map output latch 443.

If the absent bit is a one, the logical page address is loaded into the map page register 441, a page fault interrupt signal is transmitted to the CPU 105, and the map memory control logic 401 terminates the memory access sequence.

Similarly, if the parity checker 451 detects incorrect parity in the map entry, the logical page address is loaded into the map page register 441, a map parity error signal is transmitted to the CPU, and the memory access sequence is terminated.

Otherwise, if there is no error, the physical page address is transmitted from the map output latch 443 over the bus 421 to the physical memory modules (403; and the map memory control logic 401 issues a command over the bus 439 to cause the selected memory module 403 to perform a read or write operation.

In a CPU write operation the data to be written is transmitted from the PMD register 423 through the data selector 427 to the memory module over the bus 420.

While the memory module is performing a read or write operation, the map memory control logic 401 causes the map entry data to be modified and rewritten.

The map entry data, without the parity bit P or the reference bit R, is transmitted from the map output latch 443 to the dirty bit logic 455 (see FIG. 35) and to the map data selector 447.

In this operation the physical page field of a map entry (shown in enlarged detail in the lower righthand part of FIG. 36) and the S and T bits of the reference field and the absent bit are always rewritten without modification.

If a CPU data write operation is being performed, the dirty bit D supplied to the map data selector is set to a one by the dirty bit logic 455. Otherwise, the dirty bit is not modified.

The reference bit R supplied to the map data selector by the reference bit logic 453 is set to a one in either a read or a write operation.

The physical page field and the S, T and A bits are not modified, as noted above.

The map data selector 447 supplies this new map data to the parity generator 449 and to the map 409.

An odd parity bit P is generated from the new data by the parity generator 449 (see FIG. 35).

A map write strobe from the map memory control logic 401 then causes the new data and parity to be written into the map entry selected by the logical page address bus 417.

Thus, the logical page has been translated through the map entry, and the map entry has been rewritten with updated parity, reference, and dirty bits.

When the physical memory module 403 completes its read or write operation, it sends a completion signal to the map memory control logic 401 over the bus 439 (see FIG. 34).

In a read operation the memory module 403 gates the memory data to the bus 437 (FIG. 34).

In a data read operation sequence the data is loaded into the MD register 433 (FIG. 34) for use by the CPU 105.

In an instruction read operation sequence the data is loaded into the NI register 431 (FIG. 34) for subsequent execution by the CPU 105.

The CPU memory accesses of data read, data write and instruction read are thus completed as described above.

An I/O channel access to read or to write data to memory proceeds similar to a CPU memory access as described above except for the following.

The channel memory address (CMA) register 129 (FIG. 34) is used to provide the logical address, and this register always specifies the system data map 469 (see FIG. 35).

The channel memory data (CMD) register 425 (FIG. 34) is used to supply data to memory in a write operation.

The channel data (CD) register 125 (FIG. 34) is used to receive data from memory in a read operation.

In an I/O channel 109 memory access, the access is always a read or write data to memory access, and there is no instruction read access as in the case of a CPU access.

In addition, map parity and absent conditions are transmitted to the I/O channel 109 if they occur in an I/O channel access to memory.

As noted at several points above, either semiconductor memory core memory is used for the memory modules 403.

When the memory is core memory, errors are detected by a parity error detection system. The parity error detection system for core memory modules is effective to detect all single bit errors. Conventional parity error generation and checking techniques are used, and details of the core memory will therefore not be illustrated.

The probability of failures in semiconductor memory is great enough to justify an error detection and correction system, and the present invention provides a detection and correction system which incorporates a six bit check field for each sixteen bit data word. Figs. 37–41 and related Table 1 (set out below) illustrate details of an error detection and correction system used when the memory modules 403 are constructed with semiconductor memory.

The sic bit check field error detection and correction system of the present invention is, as will be described in detail below, capable of detecting and correcting all single bit errors and is also capable of detecting all double bit errors. In addition, most errors of three or more bits are detected.

While the error detection and correction system will be described with reference to a semiconductor memory, it should be noted that the system is not limited or restricted to semiconductor memory but is instead useful for any data storage or transmission application.

An important benefit of the error detection and correction system of the present invention results from the fact that not only are single bit errors corrected but also that any subsequent double bit errors are reliably detected after a single bit has failed.

The multiprocessor system incorporating the error detection and correction system of the present invention is therefore tolerant of single failures and can be operated with single bit failures in semiconductor memory until such time as it is convenient to repair the memory.

Figure 38:
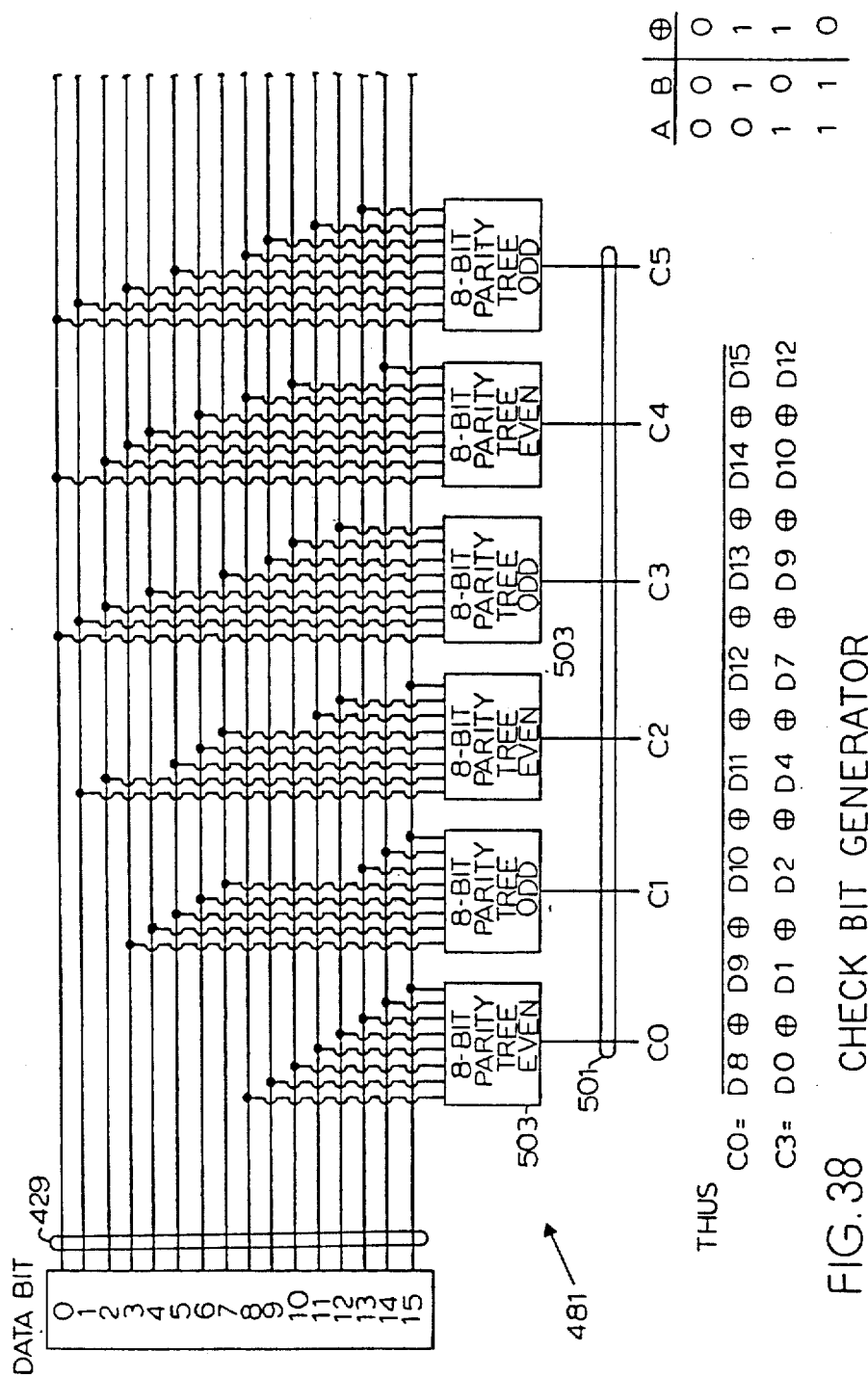
FIG. 38 is a diagram of a check bit generator used in the semiconductor memory module 403 shown in FIG. 37.

The error detection and correction system utilizes a systematic linear binary code of Hamming distance four. In this code each check bit is a linear combination of eight data bits (as shown in FIG. 38). Also, each data bit is a component of exactly three check bits (as also shown in FIG. 38). An advantage of this code is that uniform coverage of the data bits by the check bits is obtained.

The error correction and detection system embodies a syndrome decoder which provides the combination of fast logic speed and low parts count.

In initial summary, the error detection and correction system of the present invention operates to add six check bits to each data word written into storage. When a data word is subsequently read out of memory, the check field portion of the storage word is used to identify or to detect the loss of information in that word since the time it was stored.

In semiconductor memory there are two possible mechanisms for loss of information (error). One is hard failure of a memory device which makes that device permanently unable to retain information, and the other is soft failure in which electrical noise can cause a transient loss of information.

The detection of errors is accomplished by a check bit comparator which produces a six bit syndrome. The syndrome is the difference between the check field obtained from the stored word and the check field which would normally correspond to the data field obtained from the stored word.

This syndrome is then analyzed (decoded) to determine whether an error has occurred and, if an error has occurred, to determine what type of correction is required.

In the case of single data bit errors, the syndrome decoder output causes a data bit complementer to invert the bit that was in error; and this corrected data is supplied as the output of that memory module.

If the syndrome decoder indicates a multiple error, then the fact of the multiple error is communicated to the map memory control section by means of one of the control and error lines to cause an interrupt to the CPU.

With reference now to FIG. 37, the memory module 403 includes a timing and control logic section 475 and a semiconductor storage array 477. The storage array 477 provides storage for 32,768 words of twenty-two bits each. Each word has (as illustrated in FIG. 37) a sixteen bit data field and a six bit check field.

Each semiconductor memory module 403 also has, as illustrated in FIG. 37, an output latch 479, a check bit generator 481, a check bit comparator 483, a syndrome decoder 485 and a data bit complementer 487.

The memory module 403 interfaces to the rest of the system through the signal and data paths illustrated in FIG. 37. These paths include: 429 (data to memory bus), 438 (control and error lines to the map memory control section 401), 419 and 421 (physical address bus), and 437 (data from memory bus). These signal and data paths are also shown in FIG. 34.

With continued reference to FIG. 37, the content of the output latch 479 is transmitted on a bus 489 to both the check bit comparator 483 and the data bit comparator 487.

The output of the check bit comparator 483 is transmitted on a syndrome bus 491 to both the syndrome decoder 485 and the timing and control logic section 475.

The output of the syndrome decoder 485 is transmitted on a bus 493 to the data bit complementer 487.

Other outputs of the syndrome decoder 485 are transmitted on lines 495 and 497 to the timing and control logic section 475. The line 495 transmits a SINGLE ERROR (correctable error) signal, and the line 497 transmits a MULTIPLE ERROR (uncorrectable error) signal.

The timing and control logic 475 provides control signals on a control bus 499 to the semi-conductor storage array 477 and also to the output latch 479.

The output of the check bit generator 481 is transmitted to the storage array 477 by a bus 501.

With reference to FIG. 38, the check bit generator 481 includes six separate eight-bit parity trees 503.

Figure 39:
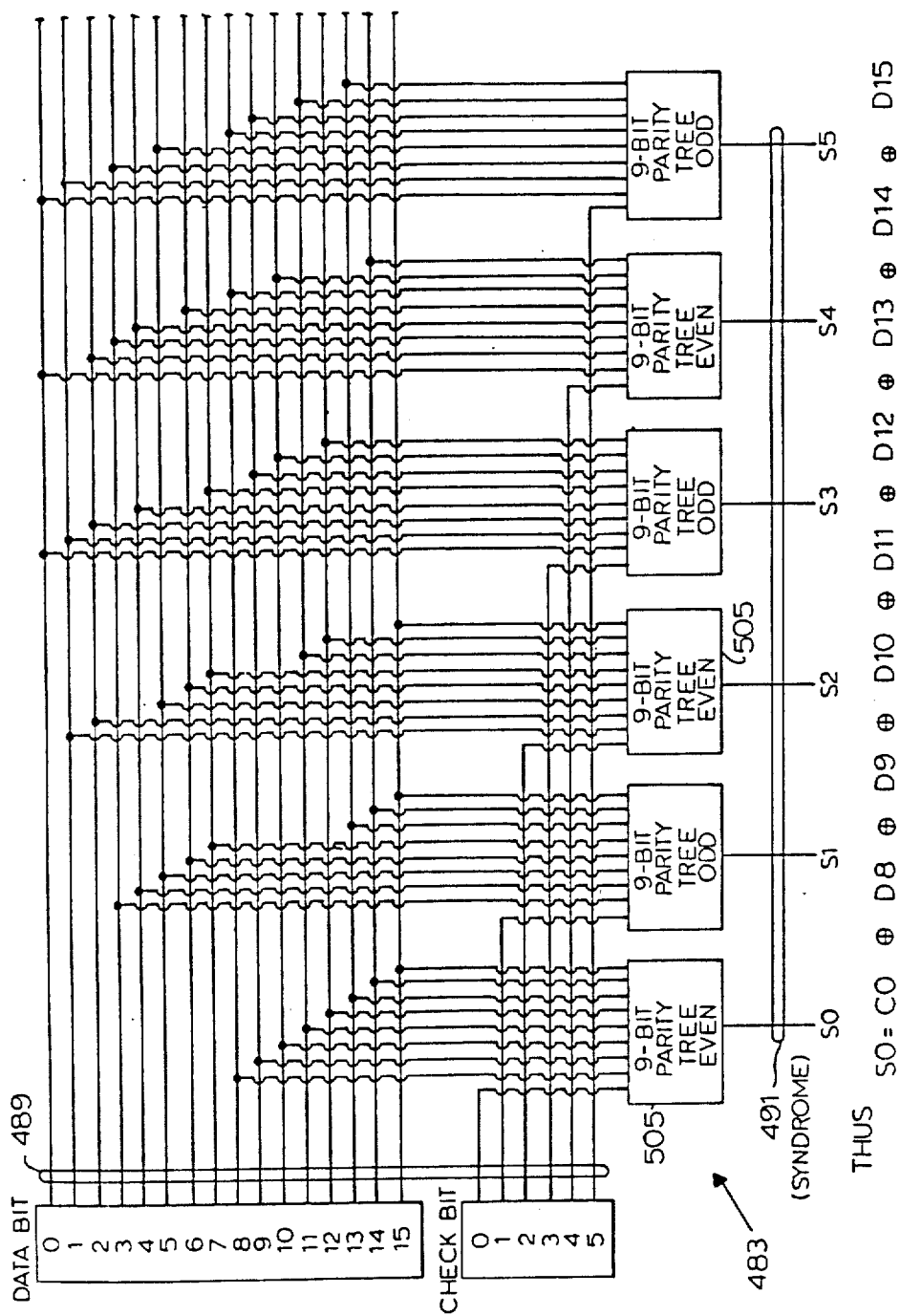
FIG. 39 is a diagram of a check bit comparator used in the semiconductor memory module 403 shown in FIG. 37.

As shown in FIG. 39, the check bit comparator 483 includes six separate nine-bit parity trees 505.

Figure 40:
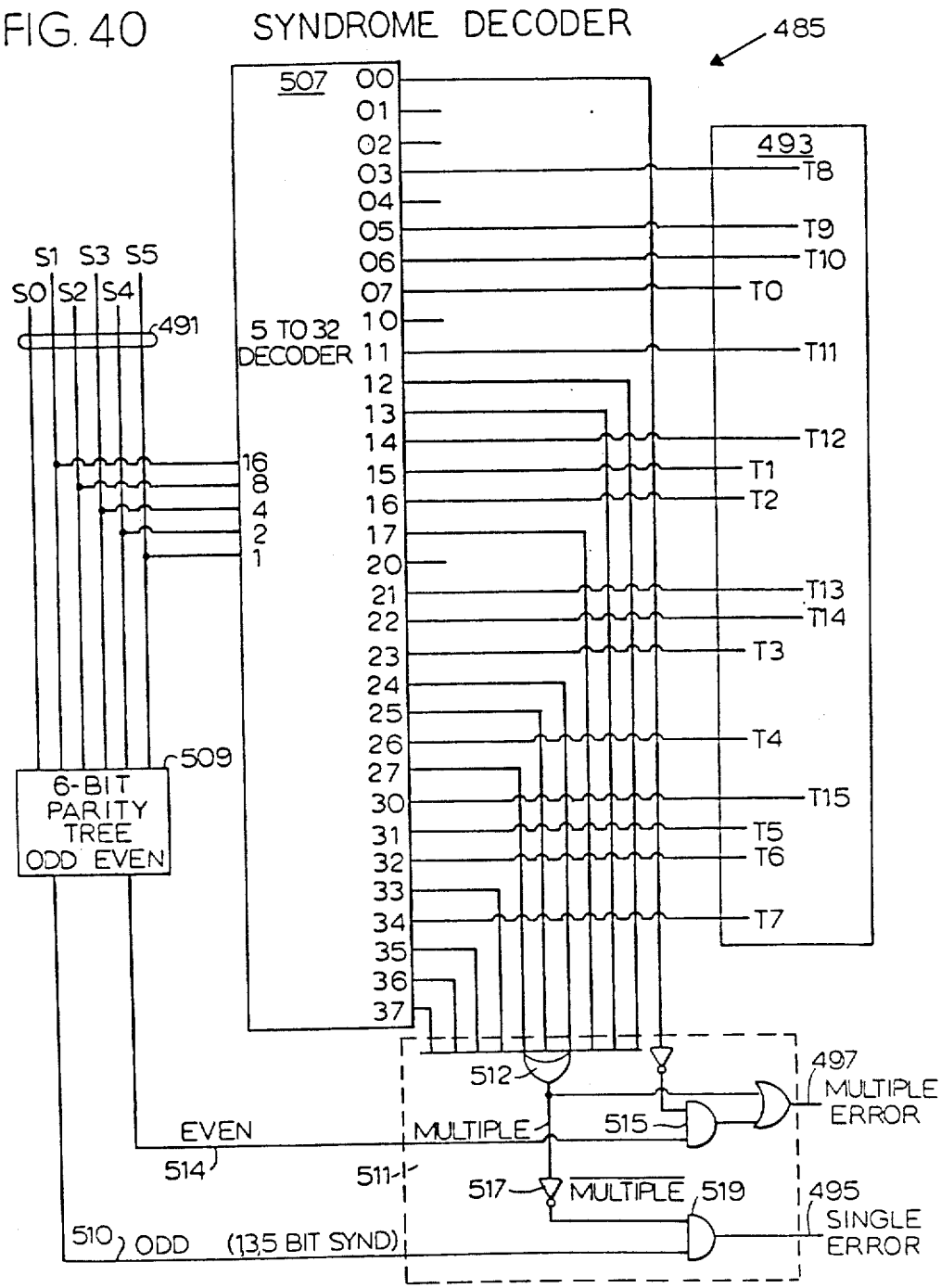
FIG. 40 is a diagram of a syndrome decoder used in the semiconductor memory module 403 shown in FIG. 37.

As shown in FIG. 40, the syndrome decoder 485 includes a decoder section 507 and a six-bit parity tree 509.

With continued reference to FIG. 40, the outputs of the decoder section 507 and six-bit parity tree 509 are combined in error identification logic indicated generally by the reference numeral 511.

Figure 41:
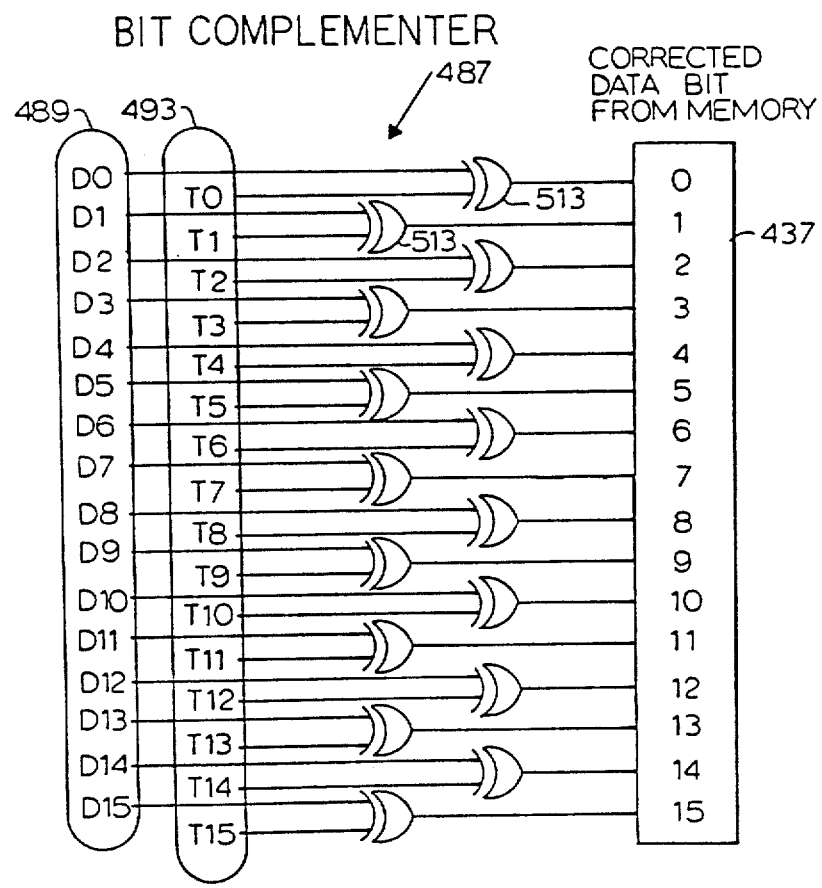
FIG. 41 is a logic diagram of a bit complementer used in the semiconductor memory module 403 shown in FIG. 37.

As illustrated in FIG. 41, the bit complementer 437 comprises sixteen exclusive-or gates 513.

In operation the sixteen bit data words is supplied by the bus 429 to the storage array 477 and also to the check bit generator 481 (see FIG. 37).

The check bit generator 481, as best illustrated in FIG. 38, generates six check bits C0 through C5 by means of the six eight-bit parity trees 503.

As also illustrated in FIG. 38, the eight-bit parity tree 503 farthest to the left generates check bit zero (C0) as specified by the logic equation for C0 as set out at the lower part of FIG. 38. Check bit zero (C0) is therefore the complement of the modulotwo sum of data bits 8 through 15.

By way of further example, the check bit C3 is generated by an eight bit parity tree 503 as specified by the logic equation for C3 set out at the lower part of FIG. 38. Check bit three (C3) is the modulo-two sum of data bits 0, ', 1, 4, 7, 9, 10 and 12 as shown by the logic equation and as also illustrated by the connections between the eight bit parity tree and the corresponding data bit lines in the logic diagram in the upper part of FIG. 38.

Similarly, each of the other check bits is generated by a modulo-two addition of eight data bits as illustrated in the logic diagram in the top part of FIG. 38.

To accomplish a memory write operation, these six check bits, as thus generated by the check bit generator 481, and the sixteen data bits, as transmitted on the data bus 429, are entered in a particular location in the storage array 477. As illustrated in FIG. 37, the six check bits and the sixteen data bits are entered in the storage array 477 under the control of the timing and control logic 475 and the physical address information on the physical address bus 419, 421.

Every word stored in the storage array 477 has a six bit check field generated for that word in a similar manner. This check field is retained with the stored word in the storage array 477 until the time when that location in the storage array is subsequently accessed for a read operation.

When a particular word is to be read out of the storage array 477, the timing and control logic 475 and the address on the physical address bus 419, 421 causes the content of the selected storage location to be loaded into the output latch 479. The output latch is twenty-two bits wide to accommodate the sixteen data bits and the six bit check field.

From the output latch 479 the sixteen data bits and the six bit check field are transmitted by a bus 489 to the check bit comparator 483.

As illustrated in FIG. 39, the check bit comparator 483 forms six syndrome bits S0 through S5.

Each syndrome bit is the output of a nine-bit parity tree 505 whose inputs are eight data bits and one check bit. Each syndrome bit is related to a correspondingly numbered check bit. Thus, check bit zero is used only for computing syndrome bit zero, check bit one is used only for computing syndrome bit one, and so forth.

As an example, syndrome bit zero (S0) is the complement of the modulo-two sum of check bit zero and data bits 8 through 15 (as shown in the logic equation at the bottom of FIG. 39).

Similarly, each of syndrome bits S 1 through S 5 is. generated from the modulo two sum of a corresponding check bit and eight of the data bits, as shown by the connections to the particular data bit lines for each syndrome bit in the logic diagram part of FIG. 39.

The presence or absence of errors and the types of errors, if any, are identified by interpreting the value of the six syndrome bits on the bus 491.

Table 1 enumerates the sixty-four possible values of the six bit syndrome code and gives the interpretation for reach possible value.

TABLE 1

| SYNDROME CODES | | | | | | | | | | | | | |
|---|---|---|---|---|---|---|---|---|---|---|---|---|---|
| S0 | S1 | S2 | S3 | S4 | S5 | ERROR IN | S0 | S1 | S2 | S3 | S4 | S5 | ERROR IN |
| 0 | 0 | 0 | 0 | 0 | 0 | (No Error) | 1 | 0 | 0 | 0 | 0 | 0 | C0 |
| 0 | 0 | 0 | 0 | 0 | 1 | C5 |   | 0 |   | 0 | 0 | 1 | (Double) |
|   | 0 |   | 0 | 1 | 0 | C4 |   | 0 |   | 0 | 1 | 0 | (Double) |

TABLE 1-continued
SYNDROME CODES

| S0 | S1 | S2 | S3 | S4 | S5 | ERROR IN | S0 | S1 | S2 | S3 | S4 | S5 | ERROR IN |
|----|----|----|----|----|----|----------|----|----|----|----|----|----|----------|
|    |    | 0  | 0  | 1  | 1  | (Double) |    |    | 0  | 0  | 1  | 1  | D8       |
|    |    | 0  | 1  | 0  | 0  | C3       |    |    | 0  | 1  | 0  | 0  | (Double) |
|    |    | 0  | 1  | 0  | 1  | (Double) |    |    | 0  | 1  | 0  | 1  | D9       |
|    |    | 0  | 1  | 1  | 0  | (Double) |    |    | 0  | 1  | 1  | 0  | D10      |
| 0  | 0  | 0  | 1  | 1  | 1  | D0       |    |    | 0  | 1  | 1  | 1  | (Double) |
| 0  | 0  | 1  | 0  | 0  | 0  | C2       | 1  | 0  | 1  | 0  | 0  | 0  | (Double) |
|    |    | 0  | 0  | 0  | 1  | (Double) |    |    | 0  | 0  | 0  | 1  | D11      |
|    |    | 0  | 0  | 1  | 0  | (Double) |    |    | 0  | 0  | 1  | 0  | (Multi-All 0's) |
|    |    | 0  | 0  | 1  | 1  | (Multi)  |    |    | 0  | 0  | 1  | 1  | (Double) |
|    |    | 0  | 1  | 0  | 0  | (Double) |    |    | 0  | 1  | 0  | 0  | D12      |
|    |    | 0  | 1  | 0  | 1  | D1       |    |    | 0  | 1  | 0  | 1  | (Double) |
|    |    | 0  | 1  | 1  | 0  | D2       |    |    | 0  | 1  | 1  | 0  | (Double) |
|    |    | 0  | 1  | 1  | 1  | (Double) |    |    | 0  | 1  | 1  | 1  | (Multi)  |
| 0  | 1  | 0  | 0  | 0  | 0  | C1       | 1  | 1  | 0  | 0  | 0  | 0  | (Double) |
|    |    | 0  | 0  | 0  | 1  | (Double) |    |    | 0  | 0  | 0  | 1  | D13      |
|    |    | 0  | 0  | 1  | 0  | (Double) |    |    | 0  | 0  | 1  | 0  | D14      |
|    |    | 0  | 0  | 1  | 1  | D3       |    |    | 0  | 0  | 1  | 1  | (Double) |
|    |    | 0  | 1  | 0  | 0  | (Double) |    |    | 0  | 1  | 0  | 0  | (Multi)  |
|    |    | 0  | 1  | 0  | 1  | (Multi-All 1's) |    |    | 0  | 1  | 0  | 1  | (Double) |
|    |    | 0  | 1  | 1  | 0  | D4       |    |    | 0  | 1  | 1  | 0  | (Double) |
|    |    | 0  | 1  | 1  | 1  | (Double) |    |    | 0  | 1  | 1  | 1  | (Multi)  |
| 0  | 1  | 1  | 0  | 0  | 0  | (Double) | 1  | 1  | 1  | 0  | 0  | 0  | D15      |
|    |    | 0  | 0  | 0  | 1  | D5       |    |    | 0  | 0  | 0  | 1  | (Double) |
|    |    | 0  | 0  | 1  | 0  | D6       |    |    | 0  | 0  | 1  | 0  | (Double) |
|    |    | 0  | 0  | 1  | 1  | (Double) |    |    | 0  | 0  | 1  | 1  | (Multi)  |
|    |    | 0  | 1  | 0  | 0  | D7       |    |    | 0  | 1  | 0  | 0  | (Double) |
|    |    | 0  | 1  | 0  | 1  | (Double) |    |    | 0  | 1  | 0  | 1  | (Multi)  |
|    |    | 0  | 1  | 1  | 0  | (Double) |    |    | 0  | 1  | 1  | 0  | (Multi)  |
|    |    | 0  | 1  | 1  | 1  | (Multi)  |    |    | 0  | 1  | 1  | 1  | (Double) |

THUS (NUMBER OF 1's IN SYNDROME)
0 BITS - NO ERROR
1 BIT - CHECK BIT ERROR
2 BITS - DOUBLE
3 BITS - DATA BIT OF MULTI
4 BITS - DOUBLE
5 BITS - MULTI
6 BITS - DOUBLE

For example, if all of the syndrome bits S 0 through S 5 are zero, there is no error in either the data field or the check field. This is the condition illustrated at the upper left of Table 1.

The presence or absence of errors and the type of error is summarized at the bottom of Table 1.

In this summarization, when all six syndrome bits are zero, there is no error, as noted above.

If only one of the six syndrome bits is on, this indicates an error in the corresponding check bit. It should be noted at this point that check bit errors are single bit errors which do not require correction of the data word.

As also illustrated in the summary at the bottom of Table 1, when two bits are on there is a double bit error; and the two errors could be (a) one error in a data bit and one error in a check bit or (b) two errors in the data bits or (c) two errors in the check bits.

When three bits are on in the six bit syndrome code, that condition can correspond to either a single data bit error or a multiple error.

As an example of a single bit error in a data bit, see the syndrome code 111,000 indicating a single bit error in data bit D-15 in the lower right hand part of Table 1. As will be described in more detail below, the syndrome decoder 485 (FIG. 37 and FIG. 40) will cause the incorrect value of data bit 15 to be inverted (corrected).

The syndrome decoder 485 provides two functions.

First the syndrome decoder 485 provides an input to the data bit complementer 487 (see FIG. 37) by way of the bus 493 in the case of single data bit errors, which input causes the erroneous bit to be inverted within the data bit complementer 487.

Secondly, the syndrome decoder 485 provides one of two error signals in the event of an error.

A single data or check bit error is transmitted on the SINGLE ERROR line 495 to the timing and control logic 475.

A multiple error indication is transmitted on the MULTIPLE ERROR line 497 to the timing and control logic 475.

A MULTIPLE ERROR signal is generated in the case of all double bit errors and most three or more bit errors. This MULTIPLE ERROR Signal, as noted above, causes an interrupt to the CPU 105 (see FIG. 34).

The construction of the syndrome decoder 485 is shown in detail in FIG. 40. The syndrome decoder 485 comprises a decoder 507, a six bit parity tree 509 and error identification logic 511.

The decoder 507 decodes five of the six syndrome bits (bits S1 through S5) to provide sufficient information (thirty-two outputs) to generate both the error types (whether single errors or double or multiple errors) and the sixteen output lines required for inversion of data bit errors in the sixteen data bits. These sixteen output lines required for inversion of data bit errors are indicated generally by the bus 493 and are identified individually by T0 through T15 in FIG. 40.

The decoder 507 outputs which are not connected to the OR gate 512 correspond to errors in the six check bits. Errors in the six check bits do not need to be corrected (since the errors are not data bit errors), and these outputs of the decoder are therefore not used.

The remaining outputs (the outputs connected to the OR gate 512) represent double or multiple errors and are so indicated by the legends in FIG. 40. All of these cases are collected by the OR gate 512 and are one component of the multiple error signal on the line 497 at the output of the error identification logic 511.

As also illustrated in FIG. 40, the syndrome decoder 45 includes a parity tree 509 which forms the modulo-two sum of syndrome bits S0 through S5.

The resulting even or odd output of the parity tree 509 corresponds to the error classes shown at the bottom of Table 1.

Thus, the EVEN output 514 corresponds to syndromes containing no bits on, two bits on, four bits on, or six bits on.

The EVEN syndrome corresponding to no bits on (no error) is excluded from the MULTIPLE ERROR output signal 497 by an AND gate 515 which excludes the zero syndrome case (the other input from decoder 507 to the gate 515).

Syndromes containing two bits on, four bits on or six bits on are thus the only remaining EVEN syndromes which in combination with the MULTIPLE signal constitute multiple errors as transmitted on the output line MULTIPLE ERROR (497).

An output is desired on the SINGLE ERROR indicator line 495 only for single bit errors. Since the odd output on the line 510 of the parity tree 509 corresponds to one bit on (check bit error), three bits on (data bit error or multibit errors), or five bits on (multibit errors) in the six-bit syndrome (as indicated in the summary at the bottom of Table 1), the odd output on line 510 must be qualified so that only single bit errors are transmitted through the logic 511 to the line 495. Those three-bit syndrome codes corresponding to multibit errors and all of the five-bit syndrome codes must therefore be excluded so that only the single bit errors are transmitted on the line 495. This is accomplished by an inverter 517 and an AND gate 519.

A SINGLE ERROR output is generated on the line 495 for syndrome codes containing a single one bit (check bit errors) and also for those syndrome codes containing three one bits corresponding to data bit errors. As noted above, the odd output of the parity tree 509 indicates syndromes containing one, three or five bits on. The inverter 517 and the AND gate 519 exclude multiple error three bit syndrome and all five bit syndromes. Thus, the SINGLE ERROR output 495 includes only single check bit errors and single data bit errors. Single check bit errors do not need to be corrected, and single data bit errors are corrected by the bit complementer 487.

The logic equations for MULTIPLE ERROR and for SINGLE ERROR listed on the bottom of FIG. 40 represent the operation described above.

There are some errors of three or more bits which are not identified as multiple errors and in fact can be incorrectly identified as no errors or as single bit errors (correctable errors). However, the normal pattern of error generation is such that the deterioration of storage is normally detected before three bit errors occur. For example, the normal pattern of deterioration of memory storage would first involve a single bit error from noise or component failure, then would later involve a double bit error from additional failure, etc.; and the double bit errors would be detected before the three or more bit errors could develop.

The function of the data bit complementer 487 (see FIG. 37) is to invert data bit errors as detected by the syndrome decoder 485.

FIG. 41 shows details of the construction of the bit complementer 487. As illustrated in FIG. 41, the bit complementer 487 is implemented by exclusive-or gates 513. Each of these gates 513 inverts a given data bit on a line 489 when a corresponding decoder output on a line 493 is asserted.

The corrected output is then transmitted on an output line 437 of the bit complementer 487 as the output of that physical memory module.

This completes the description of the error detection and correction system.

The memory system of the present invention provides a number of significant features.

First of all, the memory map provides four separate and distinct logical address spaces—system code, system date, user code and user data—and provides for a translation of logical addresses within these address spaces to physical addresses.

The division of logical memory into four address spaces isolates the system programs from the actions of the user programs and protects the system programs from any user errors. The division into four logical address areas also provides for a separation of code and data for both user code and data and system code and data. This provides the benefits of non-modifiable programs.

There are specific fields within each map entry for this page address translation and for other specific conditions.

One field permits translation of logical page addresses to physical page addresses.

Another field provides an absence indication. This field is an absence bit which allows implementation of a virtual memory scheme where logical pages may reside in a secondary memory.

Another field is a reference history field. This reference history field allows frequency of use information to be maintained for use by the memory manager function of the operating system to make the virtual memory scheme an efficient scheme. Frequently accessed pages are retained in primary memory, and infrequently used pages are selected for necessary overlapping.

A dirty bit field is maintained in each entry of the system data map and the user data map so that unmodified data pages can be identified. The unmodified data pages so identified are not swapped out to secondary memory because a valid copy of that data page is already present in secondary memory.

The memory system includes map memory control logic which automatically maintains the reference and dirty bit information as CPU and I/O channel accesses are made to memory.

The memory system of the present invention provides for three CPU instructions—SMAP, RMAP and AMAP—which are used by the operating system's memory manager function to maintain and to utilize information in the map.

The memory system of the present invention includes a dual port access to the memory. The memory can be accessed separately by the CPU and by the I/O channel. Accesses to memory by the I/O channel do not need to involve the CPU, and the CPU can be performing other functions during the time that an I/O data transfer is being made into or out of memory.

The operation of the dual port access to the memory also involves arbitration by the map memory control logic in the event that the CPU and the I/O channel attempt a simultaneous access to the memory. In the case of simultaneous access, the I/O channel is given priority and the CPU waits until that particular I/O channel access has completed.

Physical memory is expandible by the modular addition of physical memory modules.

The physical memory modules incorporate, in the case of semiconductor memory, error detection and correction under certain conditions. Single errors are detected and corrected so that operation of the CPU and I/O channel can be continued even in the event of a transient or permanent failure within the physical memory module. The error detection and correction system comprises a twenty-two bit word within the storage medium. Sixteen bits represent the data and six bits provide an error detection and correction check field. The six bit check field allows the detection and correction of all single errors and the detection of all double errors.

The core memory includes parity for the detection of single errors.

In the overall multiprocessor system of the present invention each processor module incorporates its own primary memory system.

Since each processor module has its own memory system, problems of shared memory in a multiprocessing system are avoided.

The problems of shared memory in a multiprocessing system include reduced memory bandwidth available to a particular processor because of contention, and this reduction of available memory bandwidth becomes more severe as additional CPU's are combined with a single shared memory.

The problems of interlocks relating to the communication between CPU's by means of areas within a shared memory are avoided by the present invention which does not include shared memory and which does, instead, provide for communication between processor modules by an interprocessor bus communication system.

An additional problem of shared memory is that a failure in the shared memory can result in simultaneous failure of some or all of the CPU's in the system. That is, in a shared memory system, a single memory failure can stop all or part of the system; but a memory failure will not stop the multiprocessor system of the present invention.

The dual port access by the CPU and the I/O channel to the memory utilizes and is permitted because of separate address registers and separate data registers to and from memory.

The CPU has a specific register (the NI register) specifically for receiving instructions from memory. This separate and specific register allows overlapped fetching of the next instruction during execution of the current instruction (which may involve the reading of data from memory). As a result, at the end of a current instruction, the next instruction can be initiated immediately without waiting for an instruction fetch.

The map is constructed to provide significantly faster access than the access to physical main memory. This provides a number of benefits in the translation of addresses through the map.

As one result, in the memory system of the present invention, the map can be rewritten in the time that the physical memory access is being accomplished.

Because the rewriting is so fast, the rewriting of the map does not increase memory cycle time.

Also, the high speed at which the map can be accessed reduces the overall time including page translation required for a memory access.

Parity is maintained and checked in the actual map storage itself. This provides immediate indication of any failure in the map storage before resulting incorrect operation in the processor module can occur.

While we have illustrated and described the preferred embodiments of our invention, it is to be understood that these are capable of variation and modification and we therefore do not wish to be limited to the precise details set forth, but desire to avail ourselves of such changes and alterations as fall within the purview of the following claims.

We claim:

1. A multiprocessor system, comprising:
   at least three separate processor modules, each processor module including a central processing unit, a main memory and an input/output channel;
   at least two interprocessor buses, each bus coupling the separate processor modules to one another to transfer signals and data between the processor modules;
   at least two device controllers operable to control data transfer between the processor modules and at least one related peripheral device connected to each device controller, each device controller including at least two separate ports;
   a plurality of input/output buses separated from the interprocessor buses, each input/output bus being disposed between the input/output channel of a corresponding processor module and a one of the ports of the device controller so as to connect each device controller with at least two of the processor modules;
   means in each processor module for transferring through a one of the interprocessor buses to an associated processor module information associated with an application program resident in the processor modules;
   means in each processor module for sending a predetermined control signal to each other processor module through a one of the interprocessor buses;
   means in each processor module for detecting when the predetermined control signal has not been received from the other processor module within a predetermined period and determining therefrom that the other processor module has failed;
   means in each processor module responsive to the detection of the failure of receipt of the predetermined control signal within the predetermined period for initiating execution of a copy of said application program in the detecting processor module to thereby cause the detecting processor module to take over the work of the determined failed processor module; and
   means in each processor module for controlling the related device controller through the input/output bus to control the related peripheral device so as to provide each of the peripheral devices with simultaneous operations.

2. A multiprocessor system comprising:
   at least two separate processor modules, each processor module including a central processing unit, a main memory and an input/output channel;
   interprocessor bus means connecting the separate processor modules to transfer signals and data therebetween;

at least one device controller between the processor modules and peripheral devices to control data transfer between each processor module and a related peripheral device, the device controller including at least two separate ports;

a plurality of input/output buses, separate from the interprocessor bus means, each input/output bus being disposed between the input/output channel of a processor module and a respective port of the device controller so as to connect one device controller with at least two processor modules;

means in at least first and second processor modules for transferring information from the first processor module to the second processor module through the interprocessor bus means, which information is associated with a program resident in the first processor module;

means in the first processor module for sending a predetermined control signal to the second processor module through the interprocessor bus means;

means in the second processor module for receiving the predetermined control signal from the first processor module, and for detecting, when the predetermined control signal has not been received from the first processor module within a predetermined period, that the first processor module has failed; and means in the second processor module responsive to detection of the failure of the first processor module to initiate execution of a copy of said program, utilizing the transferred information, and to cause the second process module to take over the work of the first processor module.

3. A multiprocessor system as in claim 2, wherein said program is an application program.

4. A multiprocessor system comprising a first and at least a second separate processor module, each processor module comprising a central processing unit, a main memory and an input/output channel;

interprocessor bus means connected to the separate processor modules to transfer information between the processor modules;

at least one device controller adapted to be connected to peripheral devices to control data transfer between each processor module and the peripheral devices the device controller including at least two separate ports, each port being adapted for connection to a processor module;

a plurality of input/output buses separate from the interprocessor bus means, each input/output bus being disposed between the input/output channel of a corresponding processor module and an associated one of the ports of the device controller so as to connect one device controller with at least two processor modules;

means in the first and second processor modules for transferring information from the first processor module to the second processor module through the interprocessor bus means, which information is associated with a program resident in the first processor module;

means in the first and second processor modules for sending a predetermined control signal from the one processor module to the other processor module through the interprocessor bus means;

means in each of the first and second processor modules for receiving the predetermined control signal from the other processor module and for detecting, when the predetermined control signal has not been received from the other processor module within a predetermined period, that the other processor module has failed; and means in each of the first and second processor modules responsive to detection of the failure of the other processor module to initiate execution of a copy of said program, utilizing the transferred information, and to take over the work of the failed other processor module.

5. A multiprocessor system, comprising:

a first and at least a second separate processor module, each processor module including a central processing unit;

interprocessor bus means connected to the separate processor modules to transfer information between the processor modules;

means in the first and second processor modules for transferring information from the first processor module to the second processor module through the interprocessor bus means, which information is associated with an active program resident in the first and a copy of said active program that is resident in at least the second processor module;

means in the first and second processor modules for sending through the interprocessor bus means, at intervals, from each processor module to each other processor module, a predetermined control signal indicative of continued operation of the sending processor;

means in each of the first and second processor modules for receiving the predetermined control signal from the sending processor module and for detecting, when the predetermined control signal has not been received from the sending processor module within a predetermine period that the sending processor module has failed; and means in the first and second processor modules responsive to detection of the failure of the sending processor module for informing said copy of said active program that the sending processor module has failed, and to initiate execution of said copy of said active program, utilizing the transferred information, and to take over the work of the failed sending processor module.

6. The multiprocessor system of claim 5, wherein the predetermined control signal is in the form of a control message, the sending means in the first and second processor modules including means for periodically constructing and sending the control message through the interprocessor bus means.

7. A method for providing fault tolerant operation of a multiprocessor computer system wherein the multiprocessor computer system comprises a first and at least a second separate processor module and each processor module includes a central processing unit, comprising the steps of:

connecting together the separate processor modules to transfer information between the processor modules;

transferring information from the first to the second processor module, which information is associated with an active program resident in the first and an inactive copy of said active program that is resident in at least the second processor module;

sending, at intervals, from each processor module to each other processor module, a predetermined control signal indicative of continued operation of the sending processor module;

receiving at each of the first and second processor modules, the predetermined control signal from the other processor module;

detecting, when the predetermined control signal has not been received from the first processor module within a predetermined period, that the first processor module has failed; and initiating, responsive to detection of the failure of the first processor module, execution of said inactive copy of said active program in the second processor module utilizing the transferred information to thereby cause the second processor module to take over the work of the failed first processor module.

8. The method of claim 7, wherein the predetermined control signal is in the form of a control message constructed and sent by the sending processor module.

9. A multiprocessor system comprising at least three separate processor modules, each processor module including a central processing unit, a main memory and an input/output channel, at least two interprocessor buses, each bus connected to the separate processor modules to transfer signals and data between the processor modules;

at least two device controllers between the processor modules and peripheral devices to control data transfer between a processor module and a related peripheral device, each device controller including at least two separate ports each coupled to corresponding ones of the processor modules separately;

a plurality of input/output buses, separate from the interprocessor buses, each input/output bus being disposed between the input/output channel of a processor module and a respective port of a device controller so as to connect each device controller with at least two processor modules;

means in at least first and second processor modules for transferring information from the first processor module to the second processor module through one of the interprocessor buses which information is associated with a program resident in a first and a copy of said program resident in at least a second processor module;

means in each processor module for sending a predetermined control signal from each processor module to the other processor modules through an interprocessor bus;

means in at least two of the processor modules for receiving the predetermined control signal from each other and for detecting, when the predetermined control signal has not been received from the first processor module of the two within a predetermined period, that the first processor module of the two has failed; and means in the at least two of the processor modules responsive to detection of the failure of the first processor module of the two for informing said copy of said program in the second processor module of the two that the first has failed, thereby to initiate execution of said copy of said program by the second processor module of the two, utilizing the transferred information and to cause the second to take over the work of the failed first processor module.

10. A multiprocessor system, comprising:

a plurality of separate processor modules, each processor module including means for formulating messages;

interprocessor bus means connected to the separate processor modules to transfer the messages between the processor modules;

means in each of the processor modules for transferring certain ones of the messages from such processor module to at least another of the processor modules through the interprocessor bus means, which certain ones of the messages contain information associated with an active program being executed in such processor module for an inactive copy of said active program that is resident in the another of the processor modules;

means in each of the processor modules for sending through the interprocessor bus means, at intervals, from each processor module to each other processor module, a control message containing information indicative of continued operation of the sending processor;

means in each of the processor modules for receiving the control message from the sending processor module and for detecting, when the control message has not been received from the sending processor module within a predetermined period that the sending processor module has failed; and means in each of the processor modules responsive to detection of the failure of the sending processor module for informing said inactive copy of said active program that the sending processor module has failed, and utilizing the transferred information to initiate execution of said inactive copy of said active program to take over the work of the failed sending processor module.

11. A multiprocessor system, comprising:

a first and at least a second separate processor module, each processor module including a central processing unit;

interprocessor bus means connecting the separate processor modules to one another for transferring information therebetween in the form of messages;

means in the first and second processor modules for transferring messages of a first type from the first processor module to the second processor module through the interprocessor bus means, which first type messages contain information associated with an active program being executed in the first processor module for an inactive copy of said active program that is resident in at least the second processor module;

means in the first and second processor modules for sending through the interprocessor bus means, at intervals, from each processor module to each other processor module, a message of a second type that is indicative of continued operation of the sending processor;

means in each of the first and second processor modules for receiving the second type message from the sending processor module and for detecting, when the second type message has not been received from the sending processor module within a predetermined period, that the sending processor module has failed; and means in each of the first and second processor modules responsive to detection of the failure of the sending processor module for initiating execution of said inactive copy of said active program, utilizing the transferred information to take over the work of the failed sending processor module.

* * * * *